(12) United States Patent
Breiling et al.

(10) Patent No.: US 10,574,488 B2
(45) Date of Patent: Feb. 25, 2020

(54) TRANSCEIVER, A SUDAC, A METHOD FOR SIGNAL PROCESSING IN A TRANSCEIVER, AND METHODS FOR SIGNAL PROCESSING IN A SUDAC

(71) Applicant: Fraunhofer-Gesellschaft zur Foerderung der angewandten Forschung e.V., Munich (DE)

(72) Inventors: Marco Breiling, Erlangen (DE); Frank Burkhardt, Fuerth (DE); Christian Rohde, Erlangen (DE); Wing Kwan Ng, Erlangen (DE); Robert Schober, Dietenhofen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/435,804

(22) Filed: Feb. 17, 2017

(65) Prior Publication Data
US 2017/0163452 A1    Jun. 8, 2017

Related U.S. Application Data

(63) Continuation of application No. PCT/EP2015/069251, filed on Aug. 21, 2015.

(30) Foreign Application Priority Data

Aug. 27, 2014  (EP) ..................... 14182552
Dec. 16, 2014  (EP) ..................... 14198339

(51) Int. Cl.
H04L 25/03   (2006.01)
H04W 88/04   (2009.01)
H04L 25/02   (2006.01)

(52) U.S. Cl.
CPC .... H04L 25/03159 (2013.01); H04L 25/0204 (2013.01); H04L 25/0224 (2013.01);
(Continued)

(58) Field of Classification Search
CPC .................. H04W 88/04; H04W 84/047; H04B 7/15507; H04L 25/03159; H04L 25/0204;
(Continued)

(56) References Cited

U.S. PATENT DOCUMENTS 3,180,938 A   4/1965  Walter et al.
5,592,507 A   1/1997  Kobayashi
(Continued)

FOREIGN PATENT DOCUMENTS

CN    102281129 A   12/2011
CN    102546127 A   7/2012
(Continued)

OTHER PUBLICATIONS

Gao, Feifei et al., "On Channel Estimation and Optimal Training Design for Amplify and Forward Relay Networks", IEEE Transactions on Wireless Communications, vol. 7, No. 5, May 2008.
(Continued)

Primary Examiner — Sung S Ahn
(74) Attorney, Agent, or Firm — Perkins Coie LLP; Michael A. Glenn

(57) ABSTRACT

A transceiver of a user equipment includes a receiving stage, a frontend channel estimator, a frontend channel equalizer, a backend channel estimator, and a backend channel equalizer. The receiving stage is configured to receive an inbound signal from a SUDAC, which enables a relay communication including a frontend communication using extremely-high frequencies and a backend communication using ultra-high frequencies. The inbound signal includes a data portion, a backend control portion and a frontend control
(Continued)

portion, the frontend control portion including a frontend evaluation signal and a configuration signal. The frontend and the backend channel estimators are configured to perform channel estimations based on the frontend evaluation signal and the backend control portion, respectively, wherein the frontend and backend channel equalizers are configured to equalize distortions, caused by using the extremely-high and ultra-high frequencies, respectively, based on the channel estimation of the frontend and backend channel estimators, respectively.

12 Claims, 31 Drawing Sheets

(52) U.S. Cl.
CPC .. *H04L 25/03343* (2013.01); *H04L 25/03891* (2013.01); *H04W 88/04* (2013.01); *H04L 2025/03426* (2013.01)

(58) Field of Classification Search
CPC ........... H04L 25/0224; H04L 25/03343; H04L 25/03891; H04L 2025/03426
See application file for complete search history.

(56) References Cited

U.S. PATENT DOCUMENTS

| | | |
|---|---|---|
| 6,404,775 B1 | 6/2002 | Leslie et al. |
| 6,850,504 B1 | 2/2005 | Cao et al. |
| 2003/0152170 A1 | 8/2003 | Yousef |
| 2004/0121780 A1 | 6/2004 | Nasshan |
| 2005/0025085 A1 | 2/2005 | King et al. |
| 2007/0160014 A1 | 7/2007 | Larsson |
| 2008/0045148 A1* | 2/2008 | Okuda ............... H04B 7/15542 455/18 |
| 2008/0165720 A1 | 7/2008 | Hu et al. |
| 2008/0274692 A1 | 11/2008 | Larsson |
| 2009/0088069 A1* | 4/2009 | Rofougaran ....... H04B 7/15535 455/7 |
| 2011/0032912 A1 | 2/2011 | Cordeiro et al. |
| 2011/0053495 A1 | 3/2011 | Hara et al. |
| 2011/0249681 A1 | 10/2011 | Ayyar et al. |
| 2012/0014417 A1 | 1/2012 | Heath, Jr. et al. |
| 2012/0170507 A1 | 7/2012 | Sawai |
| 2012/0300816 A1 | 11/2012 | Sheu et al. |
| 2014/0169486 A1 | 6/2014 | Mccormack et al. |

FOREIGN PATENT DOCUMENTS

| | | |
|---|---|---|
| CN | 102833193 A | 12/2012 |
| EP | 0777341 A1 | 6/1997 |
| EP | 1109332 A2 | 6/2001 |
| EP | 1755354 A1 | 2/2007 |
| EP | 2161853 A2 | 3/2010 |
| GB | 698018 A | 10/1953 |
| JP | H11215549 A | 8/1999 |
| JP | 2008530946 A | 8/2008 |
| JP | 2009077355 A | 4/2009 |
| JP | 2009517918 A | 4/2009 |
| JP | 2011071706 A | 4/2011 |
| JP | 2011519221 A | 6/2011 |
| JP | 2011227658 A | 11/2011 |
| JP | 2015119261 A | 6/2015 |
| RU | 2510599 C2 | 3/2014 |
| WO | 2004064298 A2 | 7/2004 |
| WO | 2005025085 A1 | 3/2005 |
| WO | 2007064252 A1 | 6/2007 |
| WO | 2008004099 A2 | 1/2008 |
| WO | 2008069555 A1 | 6/2008 |
| WO | 2009154279 A1 | 12/2009 |
| WO | 2011018892 A1 | 2/2011 |

OTHER PUBLICATIONS

Hanzo, L. et al., "OFDM and MC-CDMA for Broadband Multi-User Communications, WLANs and Broadcasting", John Wiley & Sons Ltd.—IEEE Press, West Sussex, England, 2003.
Jiang, Jing et al., "Energy Efficiency and Optimal Power Allocation in Virtual-MIMO Systems", 2012.
Ma, Jun et al., "Pilot Matrix Design for Estimating Cascaded Channels in Two-Hop MIMO Amplify-and-Forward Relay Systems", IEEE Transactions on Wireless Communications, vol. 10, No. 6, Jun. 2011.
Mengali, D'Andrea, "Synchronization Techniques for Digital Receivers", Plenum Press, New York, USA, 1997.
Patel, Chirag S. et al., "Channel Estimation for Amplify and Forward Relay Based Cooperation Diversity Systems", IEEE Transactions on Wireless Communications, vol. 6, No. 6, Jun. 2007.
Proakis, J. G, "Digital Communication", 5th Edition, McGraw-Hill Inc., New York, USA, 2008.
Rappaport, T S. et al., "State of the Art in 60-GHz Integrated Circuits and Systems for Wireless Communications", Proceedings of the IEEE (vol. 99, Issue 8), Aug. 2011, pp. 1390-1436.
Rappaport, T S., "Wireless Communications: Principles and Practice", 2nd Edition, Prentice Hall, Upper Saddle River, USA, 2002.
Ratajczak, Karolina et al., "Two-way Relaying for 5G Systems—Comparison of Network Coding and MIMO Techniques", IEEE Wireless Communications and Networks Conference, WCNC, 2014.
Brieling, Marco et al., "Resource Allocation for Outdoor-to-Indoor Multicarrier Transmission with Shared UE-Side Distributed Antenna Systems", VTC Spring 2015, IEEE (Article on SUDAC by the inventor), May 2015, 8 Pages.
Brieling, Marco et al., "Resource Allocation for Outdoor-to-Indoor Multicarrier Transmission with Shared UE-Side Distributed Antenna Systems", VTC Spring 2015, IEEE (Article on SUDAC by the inventor), May 2015, 8 Pages.

\* cited by examiner

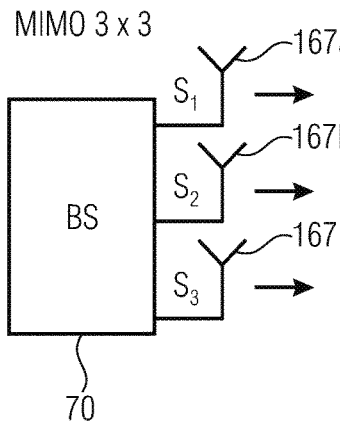 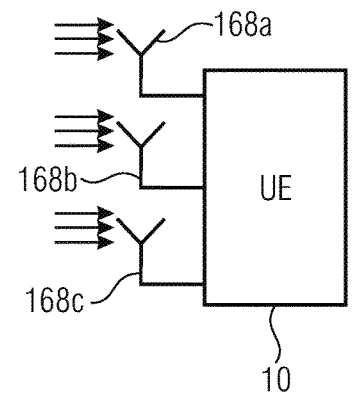
FIG 12A
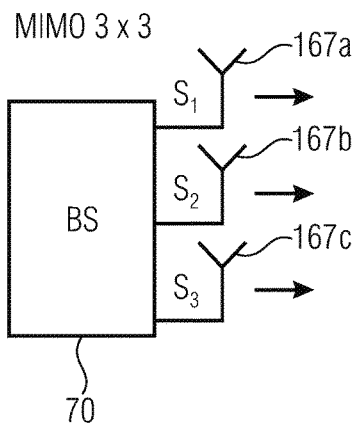 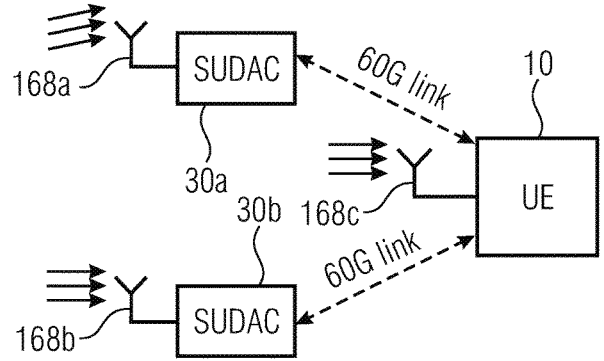
FIG 12B
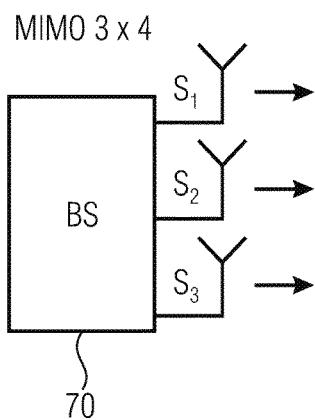 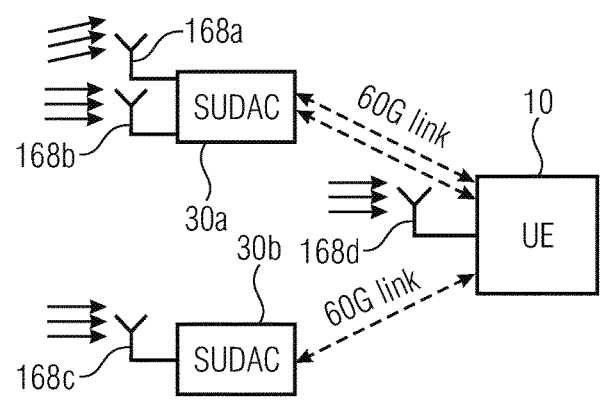
FIG 12C

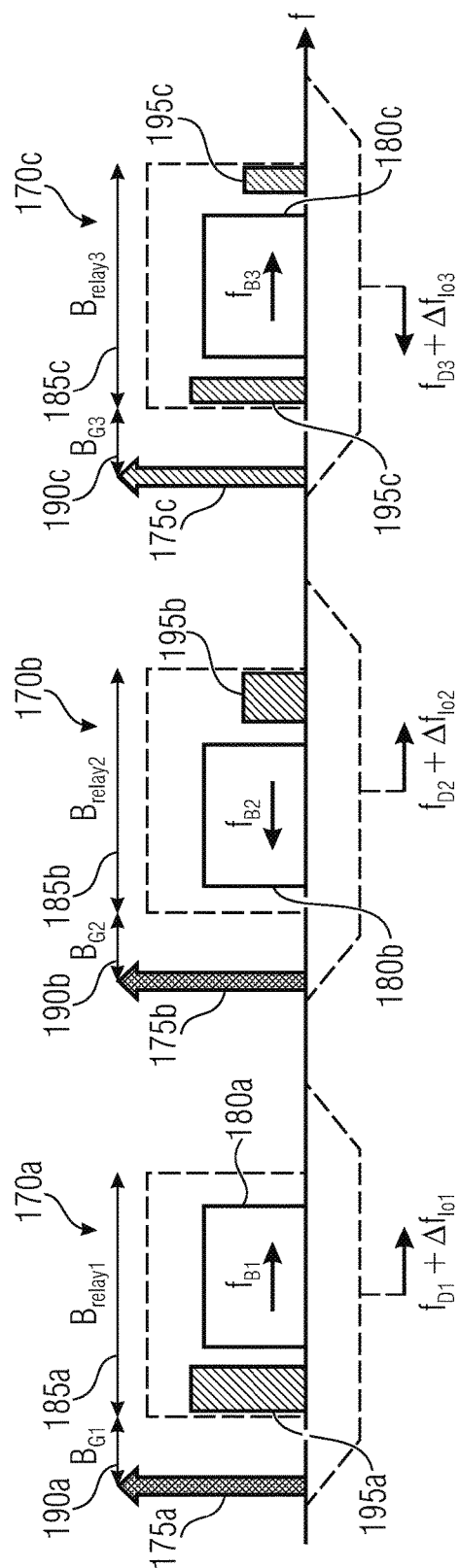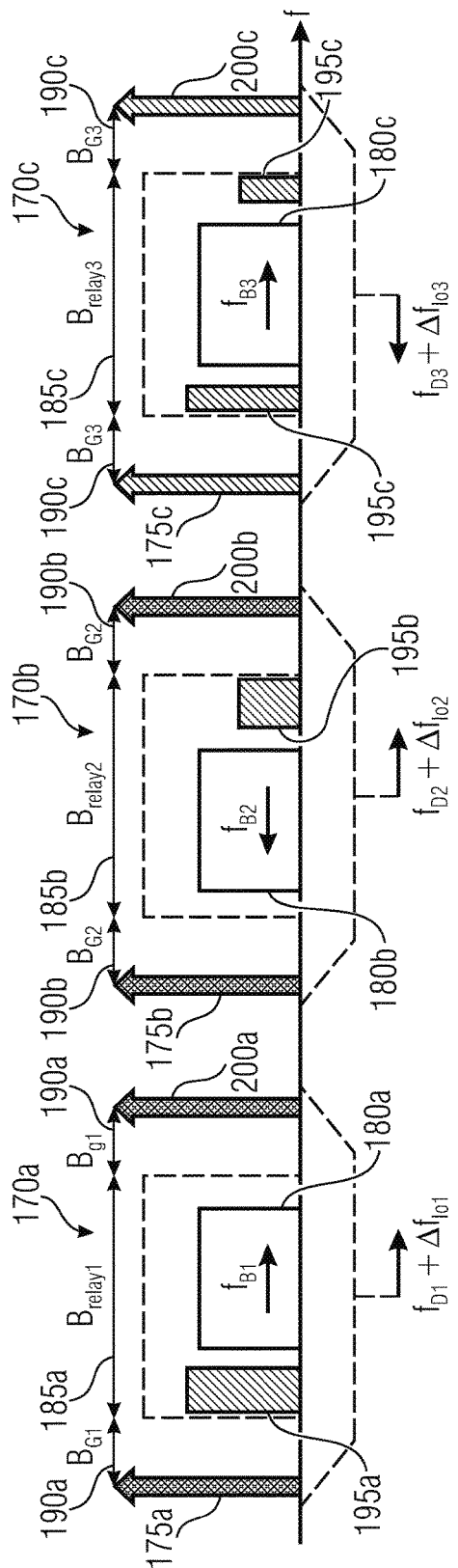
FIG 13A
FIG 13B

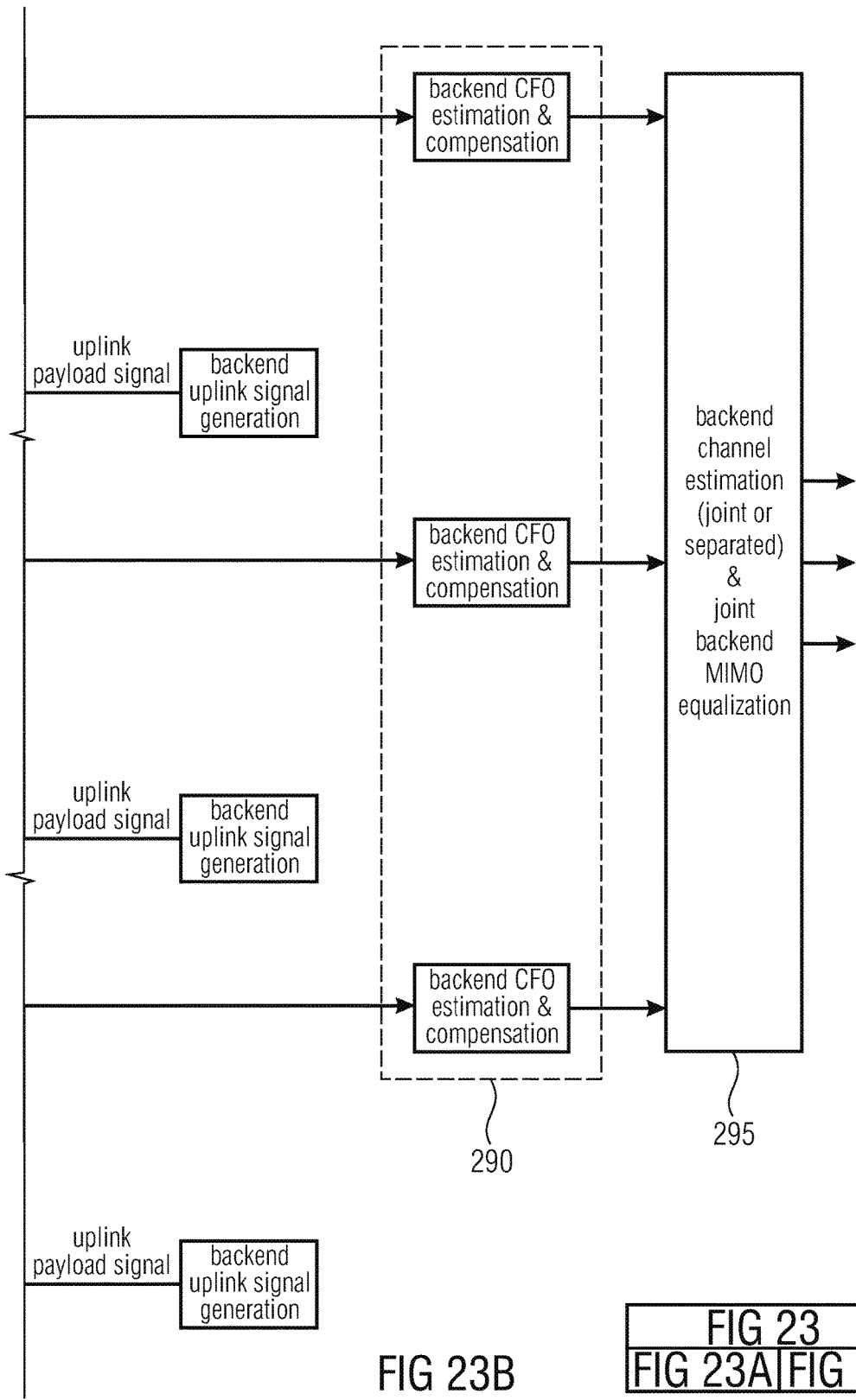

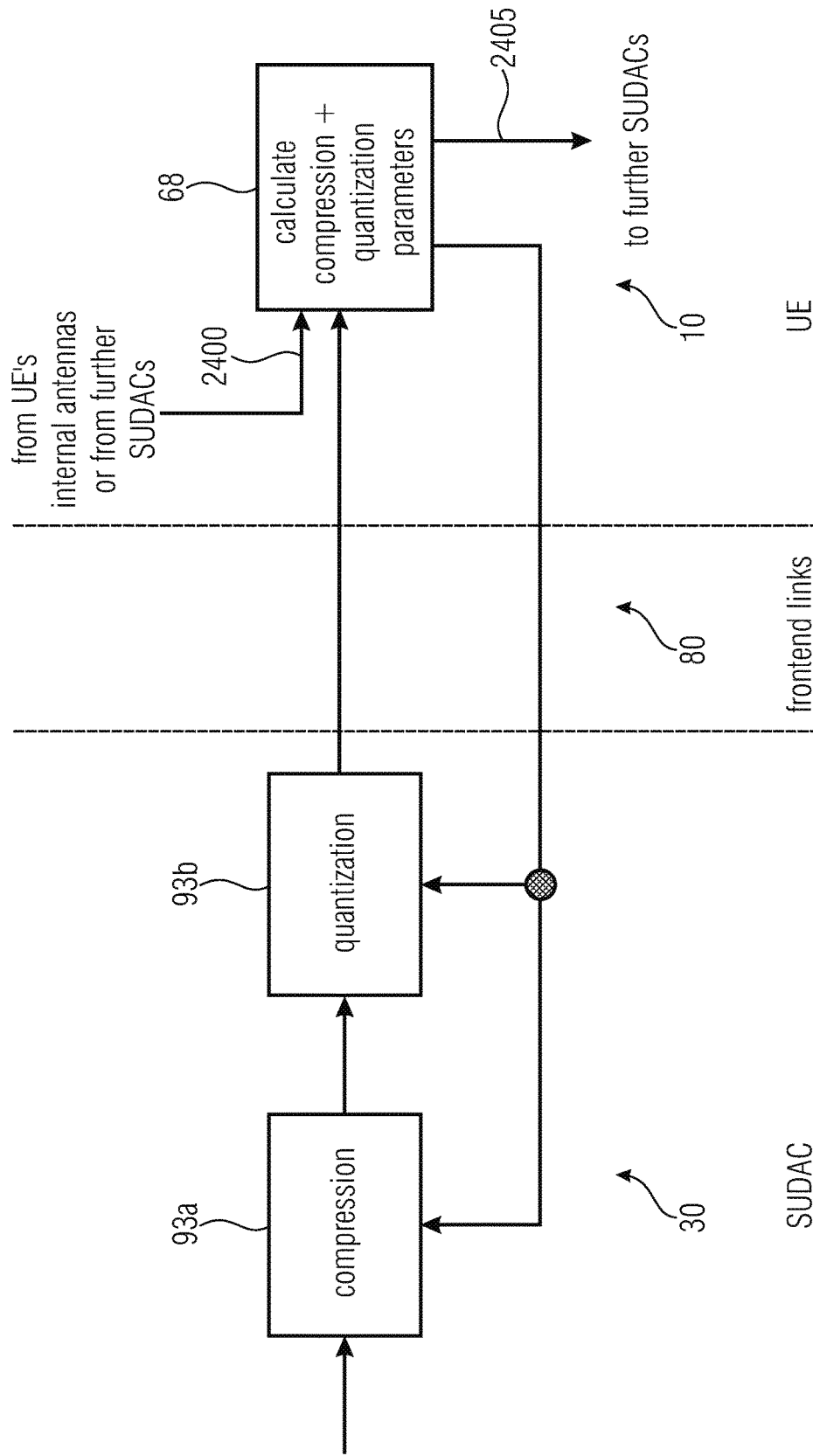

TRANSCEIVER, A SUDAC, A METHOD FOR SIGNAL PROCESSING IN A TRANSCEIVER, AND METHODS FOR SIGNAL PROCESSING IN A SUDAC

CROSS-REFERENCE TO RELATED APPLICATIONS

This application is a continuation of copending International Application No. PCT/EP2015/069251, filed Aug. 21, 2015, which is incorporated herein by reference in its entirety, and additionally claims priority from European Applications Nos. EP 14182552.1, filed Aug. 27, 2014, and EP 14198339.5, filed Dec. 16, 2014, both of which are incorporated herein by reference in their entirety.

Embodiments of the present invention relate to a transceiver, a SUDAC (also referred to as Shared User Equipment-Side Distributed Antenna Component) and a system comprising the transceiver and the SUDAC. Further embodiments relate to methods for signal processing in the transceiver or in the SUDAC. Advantageous embodiments relate to a synchronization concept for a SUDAS (Shared User Equipment-Side Distributed Antenna System).

BACKGROUND OF THE INVENTION

A SUDAS is a system comprising at least one relay. In conventional amplify and forward (AF) relay networks, the relayed signal (transmitted from the relay node) is normally located in the same carrier frequency band as the original signal (transmitted from the source node). Orthogonal channels are assumed for relays, where time division multiplexing (TDM), frequency division multiplexing (FDM) or a code division multiplexing (CDM) is assumed. Pilot data (also called training data or reference data) provided within the payload data is commonly sufficient for synchronization and general estimation in the used carrier frequency band and related subbands. Due to consideration of the same frequency band for transmission, the pilot structure (transmitted by the source node) can be optimized for AF relay systems w.r.t. the worst case channel conditions and the applied channel estimation techniques at the destination node, cf. [9], [10]. This does not hold for a significant frequency conversion during signal transmission and forwarding.

For example, a pilot matrix design is proposed in [8], where the cascaded channel from source node to relay node and relay node to destination node is identified for an AF relay system. However, the same slowly time-variant characteristics of both channels are assumed due to transmission in the same frequency band. This is why a set of different pilot matrices (=unitary subcarrier permutation matrices applied at the relay node) can be applied assuming both channels to be quasi constant. The destination node exploits the knowledge of this set to estimate both channels.

Given a signal structure, where pilot data fields are included, methods to estimate the transmission channel or (carrier) frequency offset from these pilot fields are widely known and applied, cf. [3] and [6]. These estimates hold for the time-frequency-code-space (t-f-c-s) resource, where the pilot fields are located. Furthermore, the fact of having reciprocity of the wireless channel is widely known and often exploited, e.g. in [7], where perfect channel state information is assumed.

In [11], synchronization and channel estimation schemes in OFDM/OFDMA relay systems are considered, where difference is made between transparent and cooperative relay systems supporting an OFDM-based mobile network system. A transparent relay means that the user equipment cannot determine whether the user equipment received the signal from the base station or from the relay. However, cooperative relays interact with base station and user equipment, where special emphasis is given here to the space-time (block) coding and space-frequency (block) coding.

In [11], the pilot data within the relay payload signal can directly be used for channel estimation and synchronization. Furthermore, [11] uses a propagation delay estimation between different transmission links, e.g. between direct link and two relay links as well a compensation of the different delays for a more accurate channel estimation. Although not stated in [11], this works only as long as the delays are within the cyclic prefix of the OFDM symbol in order to avoid inter-symbol interference (ISI) and inter-carrier interference (ICI).

[11] further uses stored carrier offsets and timing offsets from earlier estimation, wherefore an identification of the transmitter device is proposed for correct table-look-up and offset compensation. This table may be kept updated. This is very essential for the cooperative system in [11], because all devices (base station, relays, user equipments) share the same t-f-c-s resources.

In [12], a special channel estimation method is disclosed, called compressed sensing, for a two-way relay network. Based on a very specific training sequence, a Gaussian random training sequence, which is transmitted by each user terminal, iterative channel estimation is done. Thus, this method performs well only in connection with applying the Gaussian random training sequence.

[13] shows an exchange of channel estimation errors in the MIMO two-way relay system using an iterative algorithm, wherein the further delay is produced by exchanging the channel estimation errors.

In [14], a MIMO processing relay node is considered, i.e. with multiple input and output antennas, while the source and destination nodes only have a single antenna. In this one-way relay system, source nodes and the relay nodes transmit training sequences to the relay node and destination node (receives training sequence from source node and relay), which is a straight forward way to measure all present links. The relay node does channel estimation as well as calculation of the relay MIMO signal processing matrix and the receiving matrix for the destination nodes by means of an iterative algorithm. The approach of [14] cannot solve the stated problem of a rapidly time-varying channel due to the heavy delay introduced by convergence time of a derivative algorithm and due to degradations of very likely outdated feedback of channel estimates from the destination nodes.

All of the above mentioned concepts have in common that effects like Doppler shift or other channel distortions are magnified due to using relay stations and are assumed to show similar characteristics. This is because a significant frequency conversion, which changes the characteristics, is not considered in these concepts.

Therefore, there is the need for an improved approach.

SUMMARY

According to an embodiment, a Shared User Equipment-Side Distributed Antenna Component may have: a backend transceiver, a frontend transceiver, and an evaluation signal generator; wherein the backend transceiver is configured to receive an inbound signal from at least one base station using ultra-high frequencies and to output the inbound signal at intermediate frequencies; wherein the evaluation signal generator is configured to create a frontend control portion including the frontend evaluation signal; wherein the frontend transceiver is configured to generate an outbound signal using extremely high frequencies including the inbound signal using a relay bandwidth and further including the frontend control portion arranged below and another frontend control portion arranged above the relay bandwidth and to transmit the outbound signal including the frontend control portions to a user equipment.

According to another embodiment, a transceiver of a user equipment may have: a receiving stage; a frontend channel estimator; a frontend channel equalizer; a backend channel estimator; and a backend channel equalizer; wherein the receiving stage is configured to receive an inbound signal from a Shared User Equipment-Side Distributed Antenna Component, wherein the Shared User Equipment-Side Distributed Antenna Component enables a relay communication having a frontend communication using extremely-high frequencies and a backend communication using ultra-high frequencies, wherein the inbound signal has a data portion, a backend control portion and a frontend control portion, the frontend control portion having a frontend evaluation signal and a configuration signal; wherein the frontend channel estimator is configured to perform a channel estimation based on the frontend evaluation signal; wherein the frontend channel equalizer is configured to equalize distortions, caused by using the extremely-high frequencies, based on the channel estimation of the frontend channel estimator; wherein the backend channel estimator is configured to perform a channel estimation based on the backend control portion; and wherein the backend channel equalizer is configured to equalize distortions, caused by using the ultra-high frequencies, based on the channel estimation of the backend channel estimator.

According to another embodiment, a Shared User Equipment-Side Distributed Antenna Component may have: a backend transceiver; a backend channel equalizer; and a frontend transceiver; wherein the backend transceiver is configured to receive an inbound signal from a base station using ultra-high frequencies; wherein the backend transceiver is configured to output the inbound signal at intermediate frequencies; wherein the backend channel equalizer is configured to reduce the inbound signal from distortions caused by using the ultra-high frequencies, using a configuration signal received from a backend channel estimator of a user equipment via the frontend transceiver; wherein the frontend transceiver is configured to output the inbound signal using extremely-high frequencies in order to generate an outbound signal and to transmit the outbound signal to the user equipment; or wherein the frontend transceiver is configured to receive a configuration signal from the user equipment and to forward the configuration signal to the backend channel equalizer.

According to another embodiment, a system may have: a transceiver of a user equipment, said transceiver including: a receiving stage; a frontend channel estimator; a frontend channel equalizer; a backend channel estimator; and a backend channel equalizer; wherein the receiving stage is configured to receive an inbound signal from a Shared User Equipment-Side Distributed Antenna Component, wherein the Shared User Equipment-Side Distributed Antenna Component enables a relay communication including a frontend communication using extremely-high frequencies and a backend communication using ultra-high frequencies, wherein the inbound signal includes a data portion, a backend control portion and a frontend control portion, the frontend control portion including a frontend evaluation signal and a configuration signal; wherein the frontend channel estimator is configured to perform a channel estimation based on the frontend evaluation signal; wherein the frontend channel equalizer is configured to equalize distortions, caused by using the extremely-high frequencies, based on the channel estimation of the frontend channel estimator; wherein the backend channel estimator is configured to perform a channel estimation based on the backend control portion; and wherein the backend channel equalizer is configured to equalize distortions, caused by using the ultra-high frequencies, based on the channel estimation of the backend channel estimator; and a Shared User Equipment-Side Distributed Antenna Component including: a backend transceiver, a frontend transceiver, and an evaluation signal generator; wherein the backend transceiver is configured to receive an inbound signal from at least one base station using ultra-high frequencies and to output the inbound signal at intermediate frequencies; wherein the evaluation signal generator is configured to create a frontend control portion including the frontend evaluation signal; wherein the frontend transceiver is configured to generate an outbound signal using extremely high frequencies including the inbound signal using a relay bandwidth and further including the frontend control portion arranged below and another frontend control portion arranged above the relay bandwidth and to transmit the outbound signal including the frontend control portions to a user equipment, or a Shared User Equipment-Side Distributed Antenna Component including: a backend transceiver; a backend channel equalizer; and a frontend transceiver; wherein the backend transceiver is configured to receive an inbound signal from a base station using ultra-high frequencies; wherein the backend transceiver is configured to output the inbound signal at intermediate frequencies; wherein the backend channel equalizer is configured to reduce the inbound signal from distortions caused by using the ultra-high frequencies, using a configuration signal received from a backend channel estimator of a user equipment via the frontend transceiver; wherein the frontend transceiver is configured to output the inbound signal using extremely-high frequencies in order to generate an outbound signal and to transmit the outbound signal to the user equipment; or wherein the frontend transceiver is configured to receive a configuration signal from the user equipment and to forward the configuration signal to the backend channel equalizer, wherein the Shared User Equipment-Side Distributed Antenna Component and the transceiver establish a communication link using the receiving and transmitting stages of the transceiver and the frontend transceiver of the Shared User Equipment-Side Distributed Antenna Component; and wherein the Shared User Equipment-Side Distributed Antenna Component and/or the transceiver are configured to perform a time synchronization based on an external, common time reference or based on a signal sent by the transceiver including a current time reference.

According to another embodiment, a method for signal processing in a transceiver may have the steps of: receiving an inbound signal from a Shared User Equipment-Side Distributed Antenna Component with a receiving stage, wherein the Shared User Equipment-Side Distributed Antenna Component enables a relay communication including a frontend communication using extremely-high frequencies and a backend communication using ultra-high frequencies, wherein the inbound signal includes a data portion, a backend control portion and a frontend control portion, the frontend control portion including a frontend evaluation signal and a configuration signal; and performing a channel estimation with a frontend channel estimator based on the frontend evaluation signal; equalizing distortions, caused by using the extremely-high frequencies, with a frontend channel equalizer based on the channel estimation of the frontend channel estimator; performing a channel estimation with a backend channel estimator based on the control portion; and equalizing distortions, caused by using the ultra-high frequencies, with a backend channel equalizer based on the channel estimation of the backend channel estimator.

According to another embodiment, a method for signal processing in a Shared User Equipment-Side Distributed Antenna Component may have the steps of: receiving an inbound signal from at least one base station with a backend transceiver using ultra-high frequencies and to output the inbound signal at intermediate frequencies; creating a frontend control portion with an evaluation signal generator including the frontend evaluation signal; generating an outbound signal with a frontend transceiver using extremely high frequencies including the inbound signal using a relay bandwidth and further including the frontend control portion arranged below and another frontend control portion arranged above the relay bandwidth and to transmit the outbound signal including the frontend control portions to a user equipment.

According to another embodiment, a method for signal processing in a Shared User Equipment-Side Distributed Antenna Component may have the steps of: receiving an inbound signal from a base station with a backend transceiver using ultra-high frequencies; outputting the inbound signal at intermediate frequencies with a backend transceiver; reducing the inbound signal from distortions caused by using the ultra-high frequencies with a backend channel equalizer, using the configuration signal received from a backend channel estimator of the user equipment; and/or outputting the inbound signal with a frontend transceiver using extremely-high frequencies in order to generate an outbound signal and to transmit the outbound signal to a user equipment.

According to another embodiment, a non-transitory digital storage medium may have computer-readable code stored thereon to perform any of the inventive methods.

According to a first embodiment, a transceiver of a user equipment has a receiving stage, a frontend channel estimator, a frontend channel equalizer, a backend channel estimator, and a backend channel equalizer. The receiving stage is configured to receive an inbound signal from a SUDAC, which enables a relay communication comprising a frontend communication using extremely-high frequencies and a backend communication using ultra-high frequencies. The inbound signal comprises a data portion, a backend control portion and a frontend control portion, the frontend control portion comprising a frontend evaluation signal and a configuration signal The frontend channel estimator is configured to perform a channel estimation based on the frontend evaluation signal wherein the frontend channel equalizer is configured to equalize distortions, caused by using the extremely-high frequencies, based on the channel estimation of the frontend channel estimator. The backend channel estimator is configured to perform a channel estimation based on the backend control portion wherein the backend channel equalizer is configured to equalize distortions, caused by using the ultra-high frequencies, based on the channel estimation of the backend channel estimator.

Teachings disclosed herein are based on the fundamental idea that a system, using two air interfaces coupled in series for transmitting data, comprises means for compensating the distortion effects caused by the first and the second air interface. Thus, embodiments of the present invention comprise a two-stage approach in order to detect/estimate and/or compensate the distortions caused at the first and second air interface, e.g., a two-stage approach for channel estimation or a two-stage approach for frequency offset estimation. The term evaluation signal may refer to training data for explicit/direct evaluation and it may refer to information/payload data for implicit/indirect evaluation by means of exploiting properties of the information/payload data. These two evaluation cases are denoted in literature as data-aided and non-data-aided estimation. And evaluation may comprise deducing estimates and parameters to enhance the synchronization and therefore signal quality. E.g., the channel estimation feeds an equalizer with channel estimates in order to reduce the distortions of the transmission channel. Note further that using ultra-high frequencies or extremely-high frequencies may refer to carrier frequencies.

According to further embodiments, the transceiver comprises a transmitting stage, a frontend channel pre-estimator, and a backend channel pre-estimator. The frontend channel pre-estimator is configured to calculate frontend channel coefficients in order to perform a channel pre-estimation in order to pre-compensate distortions which will be caused by using the extremely-high frequencies based on the frontend evaluation signal. The backend channel pre-estimator is configured to calculate backend channel coefficients in order to perform a channel estimation based on the backend control portion in order to reduce distortions which will be caused by using the ultra-high frequencies. Exploiting these (pre-) estimates, embodiments show the transmitting stage being configured to transmit the frontend and/or backend channel characteristics and/or frontend and/or backend channel related parameters and/or frontend and/or backend signal processing related parameters to a the SUDAC in order to remotely control the signal processing in the SUDAC. This embodiment may be suitable for TDD (time division duplex) mobile communication networks, where the same backend carrier frequency is used for uplink and downlink. In other words, channel reciprocity may be beneficial for this embodiment.

Embodiments show the transceiver comprising a direct receiving stage configured to receive directly a signal from the base station, wherein the common backend channel estimator is configured to perform a combined channel estimation based on the plurality of backend control portions and the signal received directly from the base station. This is advantageous since, additionally, the transceiver is able to receive a signal directly from the base station not being relayed by a SUDAC.

Further embodiments show a SUDAC comprising a backend transceiver, a frontend transceiver, and an evaluation signal generator. The backend transceiver is configured to receive an inbound signal from a base station using ultra-high frequencies wherein the backend transceiver is configured to output the inbound signal at intermediate frequencies. The evaluation signal generator is configured to generate a frontend control portion comprising a frontend evaluation signal and a control signal. Furthermore, the frontend transceiver is configured to generate an outbound signal using extremely high frequencies comprising the inbound signal and the frontend control portion and to transmit the outbound signal and the frontend control portion signal to a user equipment. This embodiment may refer to a SUDAC with signal relaying including a frequency conversion.

Further embodiments show a SUDAC comprising a frontend transceiver, a backend transceiver, and a backend channel equalizer. The backend transceiver is configured to receive an inbound signal from a base station using ultra-high frequencies and is configured to output the inbound signal at intermediate frequencies. The backend channel equalizer is configured to reduce the inbound signal from distortions caused by using the ultra-high frequencies, using the configuration signal received from a backend channel estimator of the user equipment via the frontend transceiver. The frontend transceiver is configured to output the inbound signal using extremely-high frequencies in order to generate an outbound signal and to transmit the outbound signal to a user equipment. Additionally or alternatively, the frontend transceiver is configured to receive a configuration signal from the user equipment and to forward the configuration signal to the backend channel equalizer.

A further embodiment shows a SUDAC comprising a frontend channel pre-equalizer which is configured to pre-equalize the outbound signal to reduce the distortions, which will be caused by using the extremely-high frequencies, based on the configuration signal received from a frontend channel estimator of the user equipment.

Other embodiments show the frontend transceiver of the SUDAC comprising a frontend frequency estimator configured to perform a frontend frequency estimation based on the frontend control portion. The frontend frequency compensator is configured to perform a frontend frequency offset compensation of the frontend inbound and/or the outbound signal based on the estimation. Additionally or alternatively, the backend transceiver comprises a backend frequency estimator configured to perform a backend frequency estimation based on backend control portion. The backend frequency compensator is configured to perform a backend frequency offset compensation of the backend inbound and/or outbound signal based on the estimation.

Further embodiments show the SUDAC comprising a frontend channel estimator and a frontend channel equalizer, wherein the frontend channel estimator is configured to perform a channel estimation based on the frontend evaluation signal and wherein the frontend channel equalizer is configured to equalize distortions, caused by using the extremely-high frequencies, based on the channel estimation of the frontend channel estimator.

According to further embodiments, a system comprising a transceiver and a SUDAC is provided, wherein the SUDAC and the transceiver establish a communication link using the receiving and transmitting stages of the transceiver and the frontend transceiver of the SUDAC. Furthermore, the SUDAC and the transceiver establish a hardware and/or environment adaptive time synchronization, wherein the time synchronization comprises at least one reference of synchronization using an external, common time reference or a synchronization wherein the transceiver sends its current clock reference using the frontend or backend synchronization signal.

According to further embodiments, methods for signal processing in the transceiver and the SUDAC are provided. The methods are performed by using a user equipment and/or a SUDAC. According to an embodiment, a computer program for this method is provided.

BRIEF DESCRIPTION OF THE DRAWINGS

Embodiments of the present invention will be detailed subsequently referring to the appended drawings, in which:

FIG. 12a shows a schematic diagram of the base station and the user equipment, each having three antennas describing a common MIMO 3×3 communication;

FIG. 12b shows a schematic diagram of the base station, two SUDACs and a user equipment in a 3×3 communication mode;

FIG. 12c shows a schematic diagram of the base station, the SUDAC comprising two receive antennas the SUDAC comprising one receive antenna and the user equipment comprising one receive antenna in a 3×4 communication mode.

FIG. 13a shows schematic transmit spectra of three SUDACs that are visualized versus frequency f;

FIG. 13b shows exemplary transmit spectra of an unsynchronized double-beacon transmission in the 60G band by three SUDACs;

FIG. 23a-b shows a schematic block diagram of signal processing blocks at the user equipment to communicate with three SUDACs.

FIG. 24b shows a schematic block diagram of signal processing blocks for compressed signal processing at the user equipment and the SUDAC;

DETAILED DESCRIPTION OF THE INVENTION

Below, embodiments of the present invention will be discussed in detail, wherein identical reference numbers are provided to objects having identical or similar functions, so that the description thereof is interchangeable or mutually applicable.

Basic Embodiments

In a Shared User Equipment-Side Distributed Antenna System (SUDAS) as proposed in [1], the relayed payload signal in the 60 GHz (mm-wave) frequency band (60G) has insufficient means for adequate channel estimation and synchronization, since the payload signal waveform is designed for a transmission in the sub-6 GHz frequency band (s6G). The payload signal is a relayed signal via SUDAS from base station to user equipment or vice versa, meaning downlink or uplink, respectively. Therefore, a novel channel estimation and synchronization concept is proposed for a SUDAS, which is suitable to cope with the fast changing channel characteristics or channel conditions and potentially large frequency offsets in the 60 GHz band, which also impair the relayed payload signal. The later described scheme ensures reliable transmission of the relayed payload signals and the SUDAS status/control signals.

It is envisioned to install a system of autonomous relaying antennas (SUDAS) that act as satellites or relays to a user equipment (UE). A such formed distributed antenna system, which consists of one or more Shared User Equipment-Side Distributed Antenna Components (SUDACs), is the key for employing MIMO techniques which unlock the gate to ultrafast data transmissions between a user equipment (UE) and the base station (BS) of a mobile communication system. In other words, a relay network in the sense of a virtual antenna array comprising a conversion of an inbound signal into an outbound frequency with a higher or lower frequency is build, further comprising a channel estimation and synchronization for both transmission channel parts. It may be thought of stationary and mobile SUDAS, wherein stationary SUDACs can be mounted in house and mobile SUDACs mounted e.g. in a car or public transportation (e.g. bus/train). In the following, FIGS. 1-8 show the hardware components, FIGS. 9-11 methods for signal processing in the hardware components, FIG. 12a-c introduce MIMO processing schemes for the communication, and starting with FIG. 13 signal generation and processing schemes will be described.

The base station (as source node) could transmit also a pilot structure suitable for frequency band 1 (e. g. s6G) and band 2 (e. g. 60G), which would be relayed together with the payload. However, the overhead in the s6G frequency band would be too huge so that it will not be adopted in any new mobile communication standard. Furthermore, it is not intended to modify the pilot structure of the s6G payload signal at the SUDAC, because the standardization of the mobile communication networks might have already been finished or as well as in embodiments, the SUDAC is not aware of the s6G payload signal structure.

Figure 1:
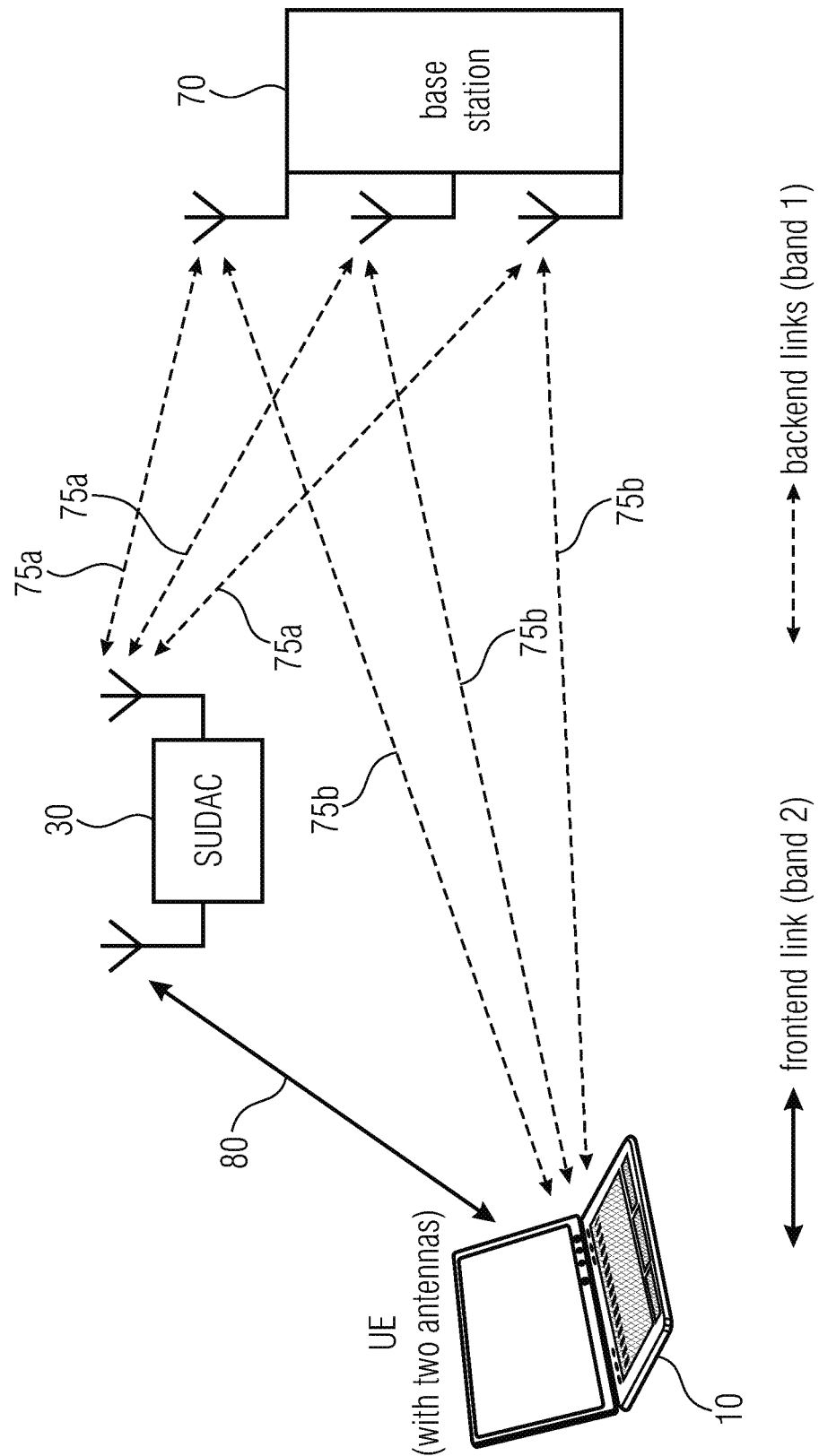
FIG. 1 shows a schematic overview of links between the SUDAC, the user equipment and a base station.

FIG. 1 shows a schematic overview of links between the SUDAC 30, the user equipment 10 and a base station 70. According to an embodiment, a considered communication framework is described in [1].

As depicted in FIG. 1, the link between the SUDAC 30 and the base station 70 is called the backend link 75a comprising the backend communication. The backend link uses frequency band 1, which for current mobile systems is operating in the frequency range below 6 GHz (s6G). Another backend link 75b is a link between the user equipment 10 and the base station 70. This backend link 75b may be the normally used communication path between the user equipment 10 and the base station 70. This backend link 75b will be supported or extended by using the relayed transmission via the backend link 75a and the frontend link 80 in order to enhance transmission robustness or accuracy and/or to enhance the data rate. The frontend link 80 is called the transmission between the user equipment 10 and the SUDAC 30, which is transmitted in the millimeter wave frequency band (band 2) to allow high data rates for short range, mostly line of sight (LOS) transmissions. The frontend link 80 comprises the frontend transmission. From the system point of view both links are bidirectional and as a pair build up a single relay link. A single SUDAC 30 incorporates one or multiple independent relaying links. The link direction from user equipment 10 to the SUDAC 30 and from the SUDAC 30 to base station 70 is labelled uplink, the other direction is labelled downlink.

Figure 2:
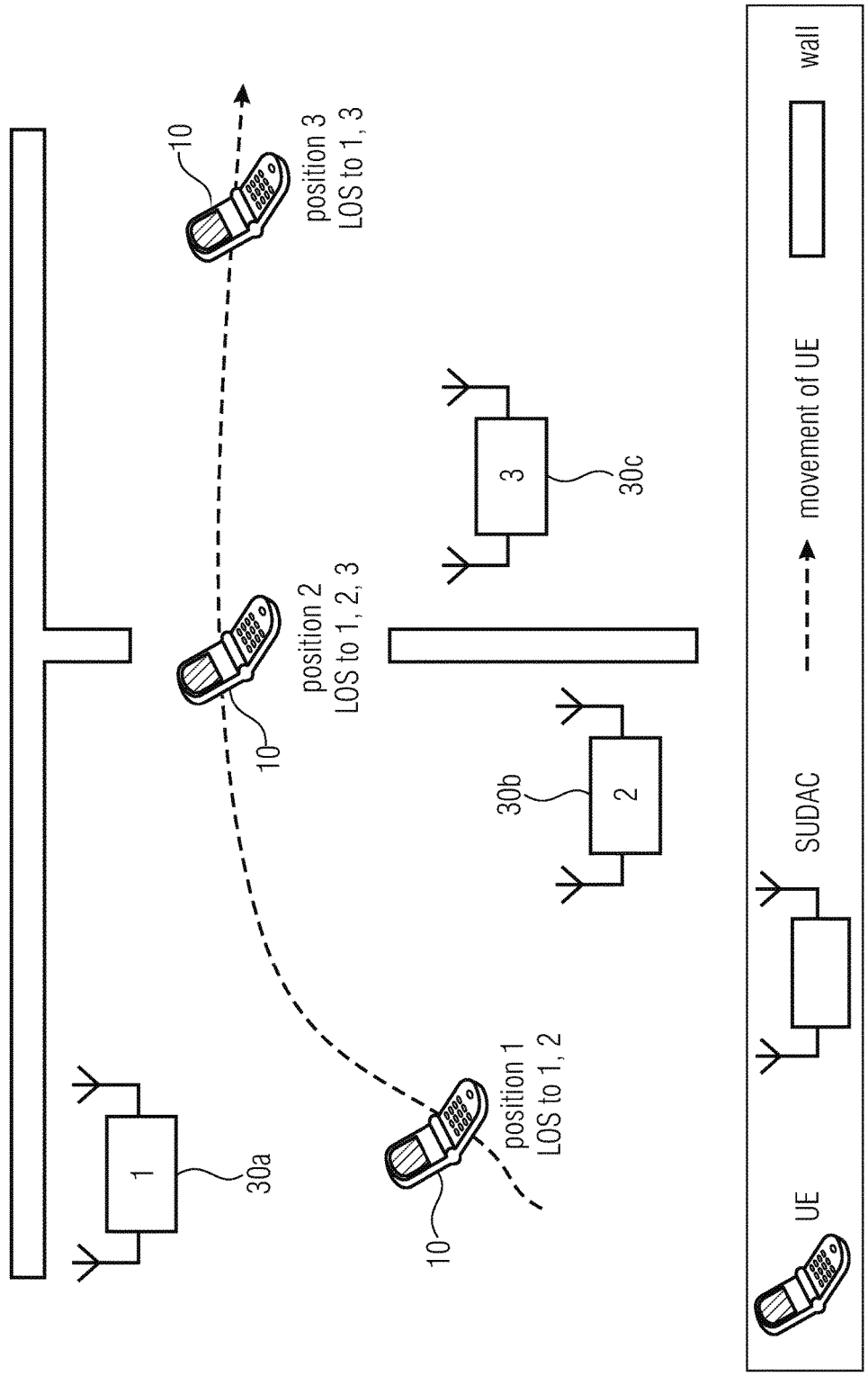
FIG. 2 shows a schematic overview of a moving user equipment with respect to three SUDACs.

FIG. 2 shows a schematic overview of a moving user equipment 10 with respect to three SUDACs 30a, 30b, 30c. The movement of the user equipment 10 is evaluated at three positions, where at position 1 the user equipment 10 has a line of sight connection to the SUDACs 30a and 30b, at position 2 the user equipment 10 has a line of sight connection to the SUDACs 30a, 30b and 30c, and at position 3 the user equipment 10 has a line of sight connection to the SUDACs 30a and 30c. At position 1 and position 3 either SUDAC 30b or 30c is hidden behind a wall.

As the system relies on LOS-transmissions in the frontend link, it is evident that the network layout may not be static for a handheld user equipment 10. When moving, the user equipment constantly discovers new SUDACs 30a-c while losing sight of other SUDACs as shown in FIG. 2. Even if there is no change in the number of accessible SUDACs, the transmission channel might change. Thus, for this dual band transmission and reception (of user equipments 10 and SUDACs 30) it is beneficial to apply a new channel estimation and synchronization scheme e. g. using suitable beacon and pilot data structures. In general, the backend link is the most restricted resource and is shared between different base stations and other user equipments, whereas the frontend link is shared between different user equipments 10 and SUDACs 30. The SUDACs 30 are relaying between the bands and will be described in detail in the following section.

Figure 3:
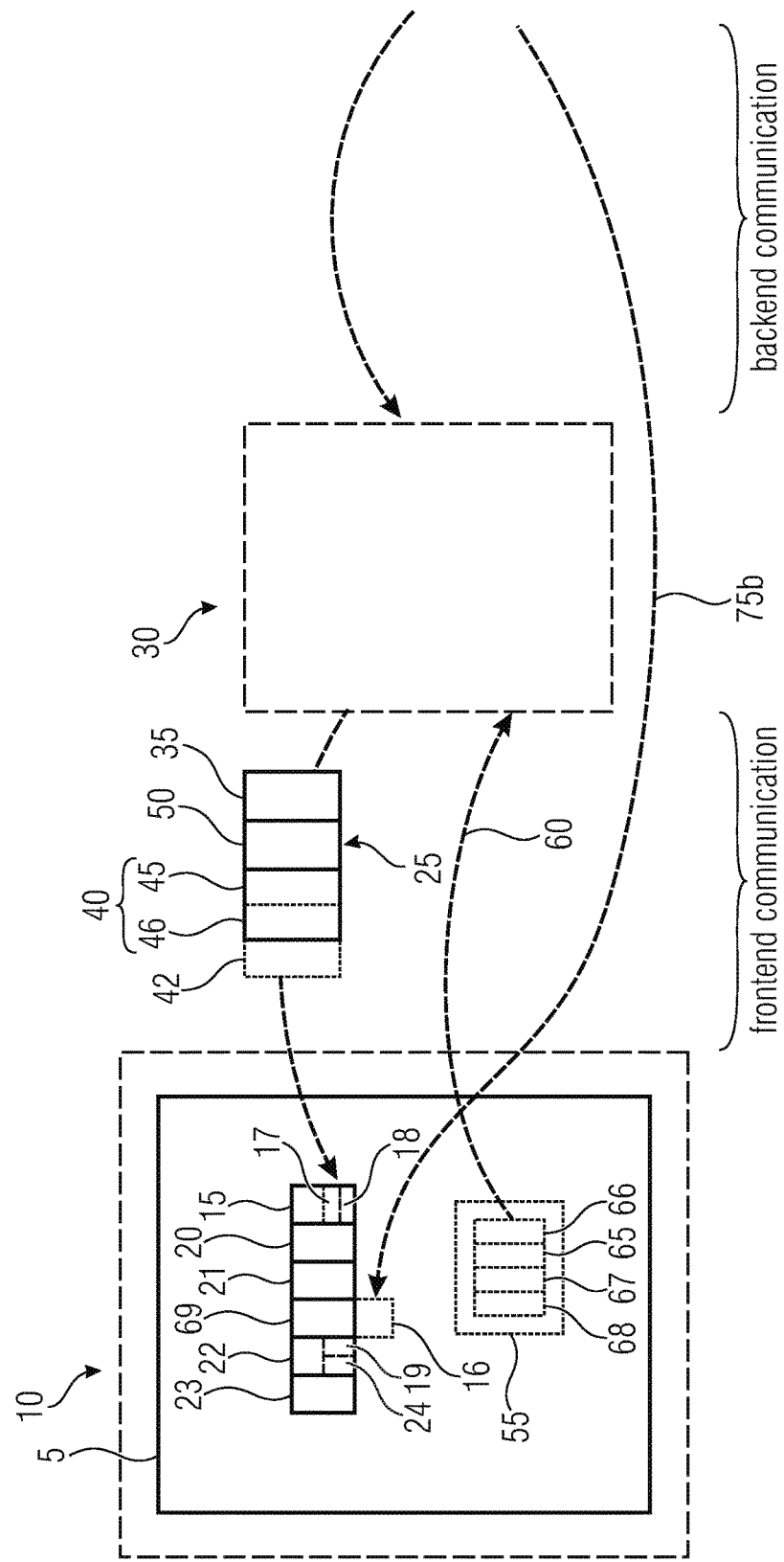
FIG. 3 shows a schematic overview of a transceiver of a user equipment and its communication links.
Figure 22:
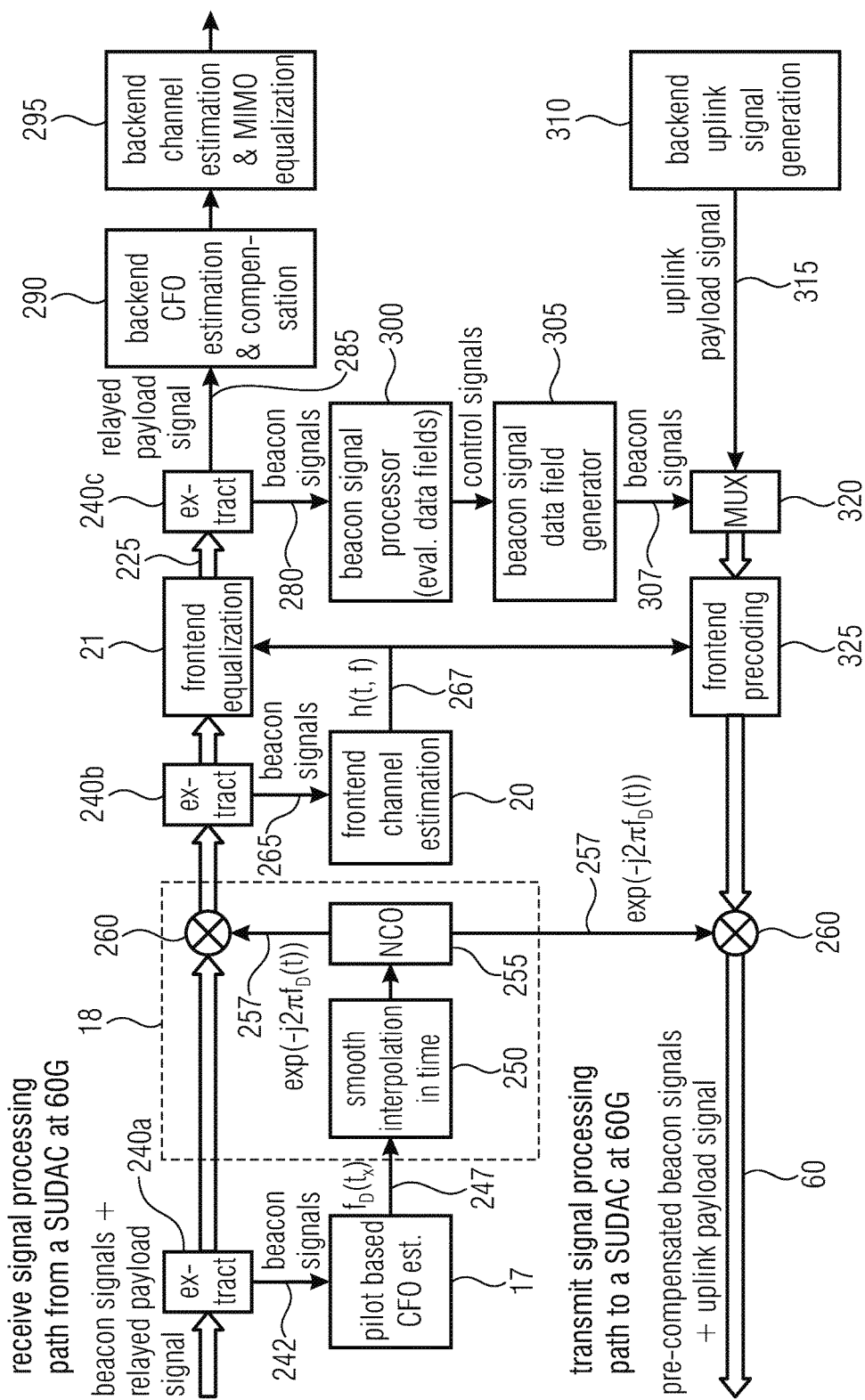
FIG. 22 shows a schematic block diagram of signal processing blocks at the user equipment to communicate with SUDACs.
Figure 23A:
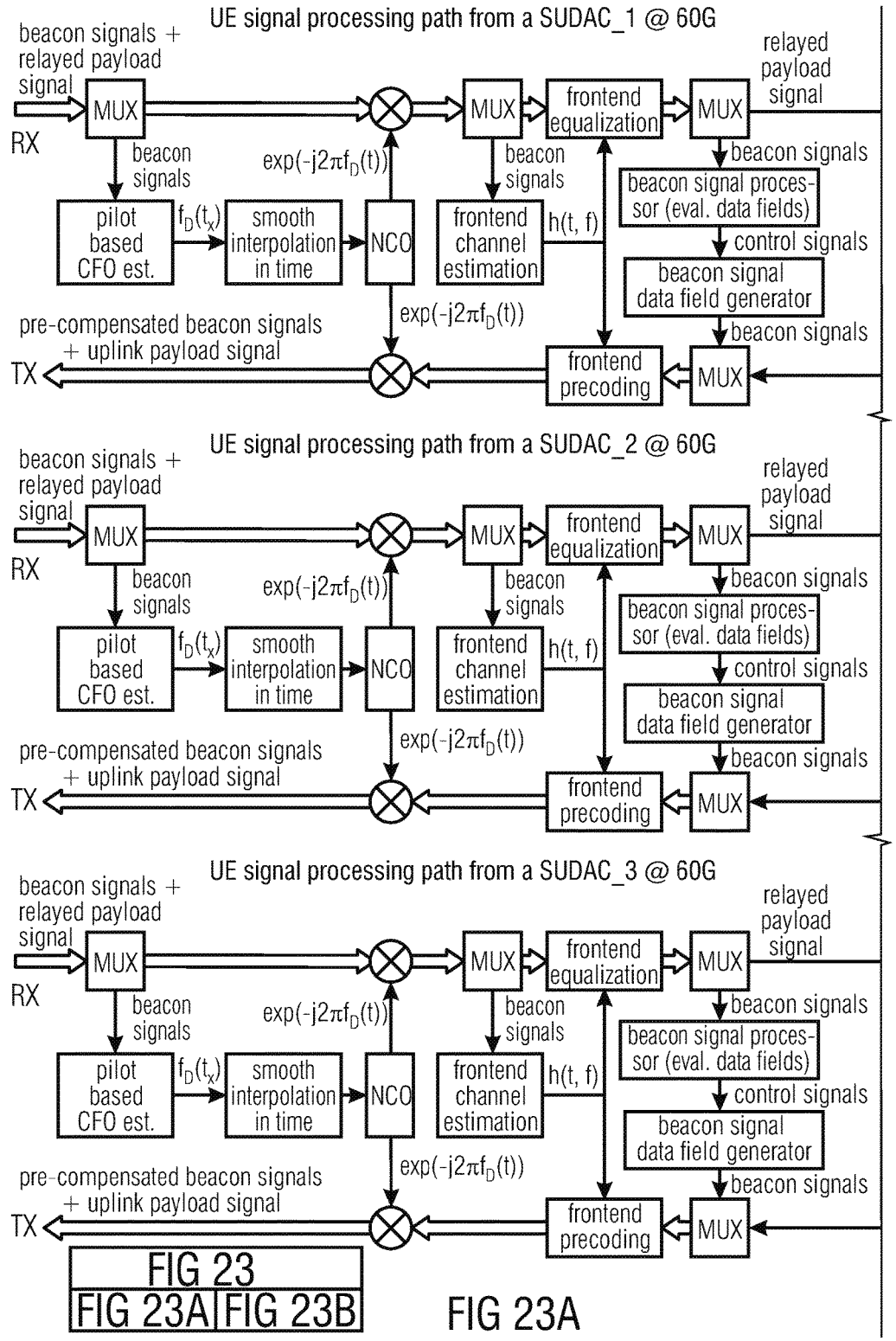

FIG. 3 shows a basic transceiver 5 of a user equipment 10. A more sophisticated approach is shown in FIGS. 22 and 23. The user equipment 10 is e. g. a mobile phone, a computer, or a device of an "Internet-of-Things". The transceiver 5 comprises a receiving stage 15, a frontend channel estimator 20, a frontend channel equalizer 21, a backend channel estimator 22, and a backend channel equalizer 23. The receiving stage 15 is configured to receive an inbound signal 25 from a SUDAC 30, which enables a relay communication comprising a frontend communication using extremely-high frequencies (e. g. in the 60 GHz band) and a backend communication using ultra-high frequencies (e. g. in the s6G band). The ultra-high frequencies may be in a sub-6 GHz band (s6G), whereas the extremely-high frequencies may be in a 60 GHz band (60G). The inbound signal 25 comprises a data portion 35, a backend control portion 50, and a frontend control portion 40, the frontend control portion comprising a frontend evaluation signal 45 and a configuration signal 46. The data portion 35 of the inbound signal 25 may be a payload signal or part of a payload signal and the frontend control portion 40 can be a beacon signal comprising one or more pilot data fields (frontend evaluation signal 45) and one or more configuration signal fields 46. The beacon is typically a control channel in the 60G band hosting information about SUDAS, its configuration, and pilot data (also referred to as pilots or reference data). The backend control portion 50 may comprise one or more pilot data fields according to the applied backend communication waveform, e. g. specified in a mobile communication network standard, e. g. a portion of the payload signal, comprising known data used for channel estimation in the backend communication, e. g. using a common control channel. Note that frontend and backend control portions (40 and 50) may comprise in this embodiment explicit pilot data (meant for data-aided synchronization). However, signal properties of control data 46 as well as the data portion 35 can also be evaluated for (non-data-aided) synchronization. For the sake of clearness, the following description refers to the first case without excluding the second case of potentially extended evaluation.

The frontend channel estimator 20 is configured to perform a channel estimation based on the frontend evaluation signal 45 in order to reduce distortions caused by using the extremely-high frequencies. The frontend channel equalizer 21 is configured to equalize distortions, caused by using the extremely-high frequencies, based on the channel estimation of the frontend channel estimator 20. Furthermore, the backend channel estimator 22 is configured to perform a channel estimation based on the backend control portion 50 in order to reduce distortions caused by using the ultra-high frequencies. The backend channel equalizer 23 is configured to equalize distortions, caused by using the ultra-high frequencies, based on the channel estimation of the backend channel estimator 22.

The transceiver 5 may additionally comprise a two-stage frequency offset estimation and compensation, e. g. to calculate and compensate Doppler shifts. The channel estimation will be discussed in detail in FIG. 4. The actual signal processing schemes will be described in further sections.

Figure 4:
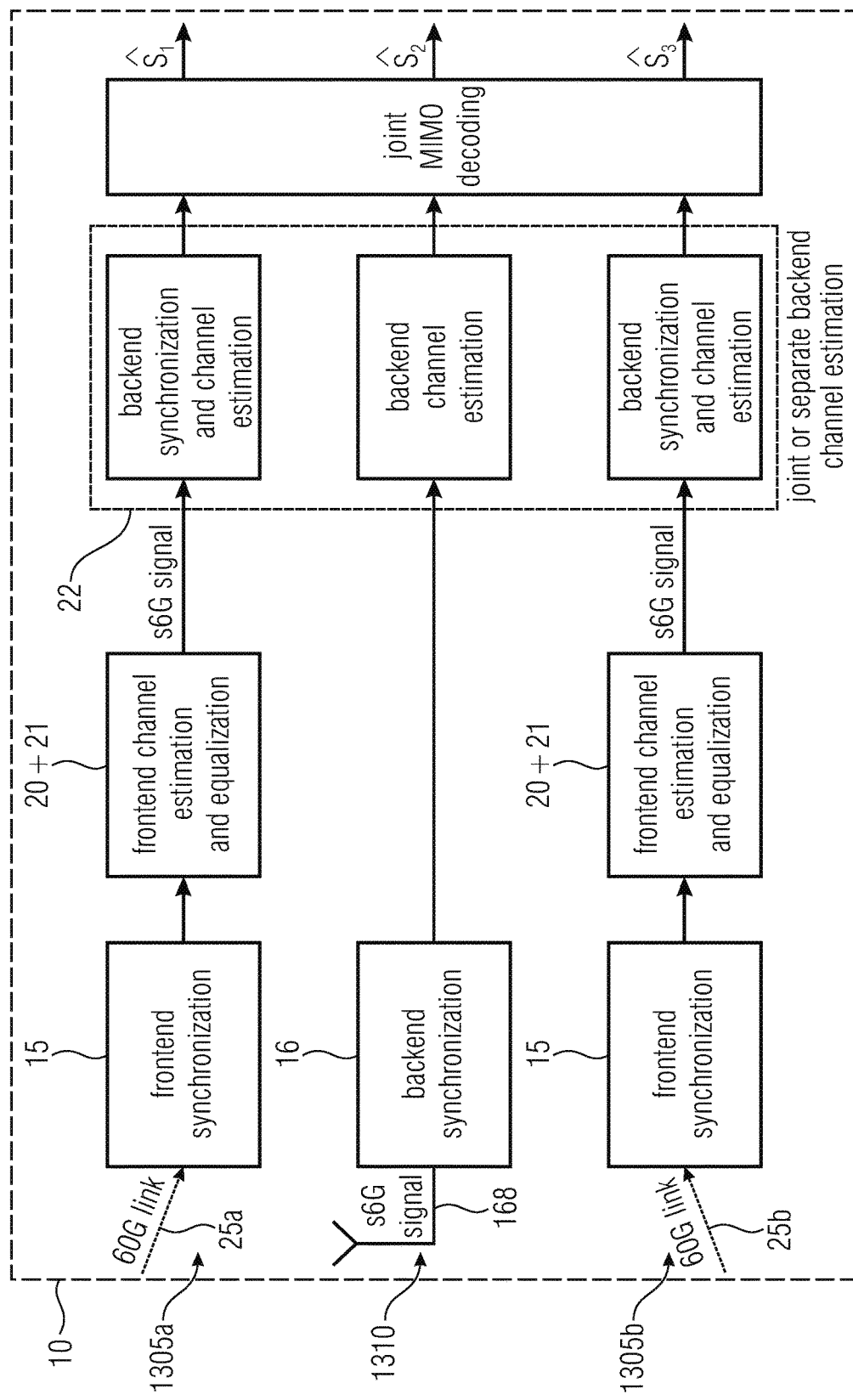
FIG. 4 shows a schematic overview of a transceiver of a user equipment and its processing blocks.

As indicated by FIG. 4, further embodiments show the transceiver 5 comprising a plurality of receiving stages 15, a common backend channel estimator 22 for the plurality of receiving stages 15, and a common backend channel equalizer 23 for the plurality of receiving stages 15 enabling the transceiver 5 of the user equipment 10 to use a MIMO transmission mode. The common backend channel estimator 22 is configured to perform a combined channel estimation based on a plurality of backend control portions 50. Furthermore, the common backend channel equalizer 23 is configured to perform a combined channel equalization based on the results of the combined channel estimation. Additionally, the transceiver 5 may comprise a direct receiving stage 16 configured to receive directly a signal from the base station 70. Therefore, the common backend channel estimator 22 is configured to perform a combined channel estimation based on the plurality of backend control portions 50 and the signal received directly from the base station.

Another embodiment shows the transceiver 5 comprising a frontend frequency estimator 17 configured to perform a frontend frequency estimation based on the frontend control portion 40 and a frontend frequency compensator 18 configured to perform a frontend frequency offset compensation based on the estimation. The estimation may be performed using the frontend frequency estimator 17.

Another embodiment shows the transceiver 5 comprising a backend frequency estimator 19 configured to perform a backend frequency estimation based on the backend control portion 50 and a backend frequency compensator 24 configured to perform a backend frequency offset compensation based on the estimation. The estimation may be performed using the frontend frequency estimator 24.

According to further embodiments, the transceiver 5 may comprise a transmitting stage 55 and a frontend channel pre-estimator 65. The frontend channel pre-estimator 65 is configured to calculate frontend channel coefficients in order to perform a channel pre-estimation in order to pre-compensate distortions which will be caused by using the extremely-high frequencies based on the frontend evaluation signal 45. Furthermore, the transceiver 5 may comprise a backend channel pre-estimator 66 which is configured to calculate backend channel coefficients in order to perform a channel estimation based on the backend control portion 50 in order to reduce distortions which will be caused by using the ultra-high frequencies.

Another embodiment shows the transmitting stage 55 being configured to transmit the frontend and/or backend channel characteristics and/or frontend and/or backend channel related parameters and/or frontend and/or backend signal processing related parameters to the SUDAC 30 in order to remotely control the signal processing in the SUDAC 30. This embodiment may be suitable for TDD (time division duplex) mobile communication networks, where the same backend carrier frequency is used for uplink and downlink. In other words, channel reciprocity may be beneficial for this embodiment. Therefore, the channel pre-estimator 65 may evaluate at least one previously received frontend and backend control portion 40, 50 for outbound signal pre-compensation. Note that having reciprocity of the relay channel is exploited in this embodiment. This pre-estimation and pre-compensation of the outbound signal 60 is, for example, performed by the transceiver 5.

Another embodiment describes the data portion 35 and the frontend control portion 40 of an extremely-high frequency signal as being transmitted using a different carrier frequency, and/or using a different code structure and/or using a different timeslot. Furthermore, the data portion 35 and backend control portion 50 of an ultra-high frequency signal is transmitted using a different carrier frequency, and/or using a different data code structure and/or using a different timeslot. In other words, the data portion 35 and the frontend control portion 40 of an extremely-high frequency signal to be transmitted differ from each other with regard to a carrier frequency, a code structure and/or a timeslot. Furthermore, the data portion 35 and the backend control portion 50 of the ultra-high frequency signal to be transmitted differ from each other with regard to a carrier frequency, a code structure and/or a timeslot. The inbound signal 25 may further comprise an additional frontend control portion 42 having a different carrier frequency when compared to the frontend control portion 40 and/or being shifted in time when compared to the frontend control portion (40). Furthermore, the frontend control portion 40 and the additional frontend control portion 42 are aligned in time and have different carrier frequencies in order to improve interpolation robustness or accuracy between further, subsequent frontend evaluation signals 45 due to a joint processing of the frontend control portion 40 and the additional frontend control portion 42. According to this embodiment, at least one frontend evaluation signal is used, while different channel conditions or signal structures (backend or frontend) may use more than one frontend evaluation signal. The signal processing schemes will be described in further sections. In general, it shall be pointed out that the frontend communication may be multiplexed using time division multiple access (TDMA), frequency division multiple access (FDMA), code division multiple access (CDMA), space division multiple access (SDMA), or any other suitable multiplexing method.

Other embodiments show the transceiver 5 comprising a signal processor 68 which is configured to calculate signal processing parameters in order to transmit the signal processing parameters to the SUDAC 30. The SUDAC 30 may use the signal processing parameters to process or encode e.g. the inbound signal 25 such that the inbound signal can be e.g. transmitted with reduced bandwidth or in a shorter period of time, i.e. the inbound signal may be transmitted compressed over the extremely high frequencies. To decode a compressed inbound signal, the user equipment 10 optionally comprises a decoder 69. The decoder 69 refers to the UE-side decompression/decoding (for the downlink) directly controlled by the compression parameter processor 68, whereas the SUDAC-side decompression/decoding (for the uplink) 94 (shown e.g. in FIG. 7) is remotely controlled by the compression parameter processor 68. An encoder 67, also referred to as compressor, refers to the UE-side compression/encoding (for the uplink) directly controlled by the compression parameter processor 68, whereas the SUDAC-side compression/encoding (for the downlink) 93 is remotely controlled by the compression parameter processor 68. Actual compression schemes are described in FIG. 24*a-e*.

In a further embodiment, the receiving stage 15 and/or the channel estimation stage 20 of the transceiver 5 is configured to adapt receiving parameters and signal processing parameters in accordance to an actual SNR (signal-to-noise ratio) and/or actual channel characteristic like the Doppler change rate.

According to another embodiment, the frontend control portion 40 and the additional frontend control portion 42 are aligned in time and have different carrier frequencies in order to improve interpolation robustness and/or interpolation accuracy between further, subsequent frontend evaluation signals 45 due to a joint processing of the frontend control portions 40, 42. The above described transceiver can additionally comprise a frequency analyzer to exploit a resonance frequency of a surrounding material which is a time/frequency reference for the receiving stage. A time reference is advantageous when using time-based transmission techniques, like e.g. a time division multiple access algorithm (TDMA). A good frequency reference is advantageous to support the frequency offset estimation and compensation.

FIG. 4 shows a schematic block diagram of a signal processing scheme in the user equipment 10. The signal processing scheme comprises two processing paths 1305*a*, 1305*b* for the 60G communication and one communication path 1310 for the s6G channel communication. The communication path 1310 may refer to a direct s6G communication, denoted as 75*b* in FIG. 1. Basically, processing paths 1305*a* and 1305*b* comprise a frontend synchronization 15 (including frontend frequency estimation 17 and frontend frequency offset compensation 18, which are similar to frontend frequency estimator 96 and frontend frequency compensator 97 in the SUDAC 30) and further a frontend channel estimation 20 and equalization 21, where the effects of the frontend channel are (mostly) compensated, in order to obtain the s6G communication data from the 60G communication data. On the s6G data of all of the three communication paths 1305*a*, 1305*b*, 1310, a backend synchronization (including backend frequency estimation 19 and backend frequency offset compensation 24, which are similar to the backend frequency estimator 98 and the backend frequency offset compensator 99 of the SUDAC 30) and channel estimation 22 may be applied. The signal received at path 1310 does not contain a transmission at the 60G channel, but the user equipment 10 receives the payload data directly from the base station, e.g. via the antenna 168. Therefore, only backend synchronization 16 and backend channel estimation 22 have to be applied. The backend channel estimation of all three signal processing paths 1305*a*, 1305*b*, 1310 can be done jointly or in a separate manner. Furthermore, a joint MIMO decoder for MIMO (backend channel) equalization 23 using the backend channel estimates from the 60G inputs and the s6G antenna, separates the received signal estimates $\hat{S}_1$ to $\hat{S}_3$.

Figure 5:
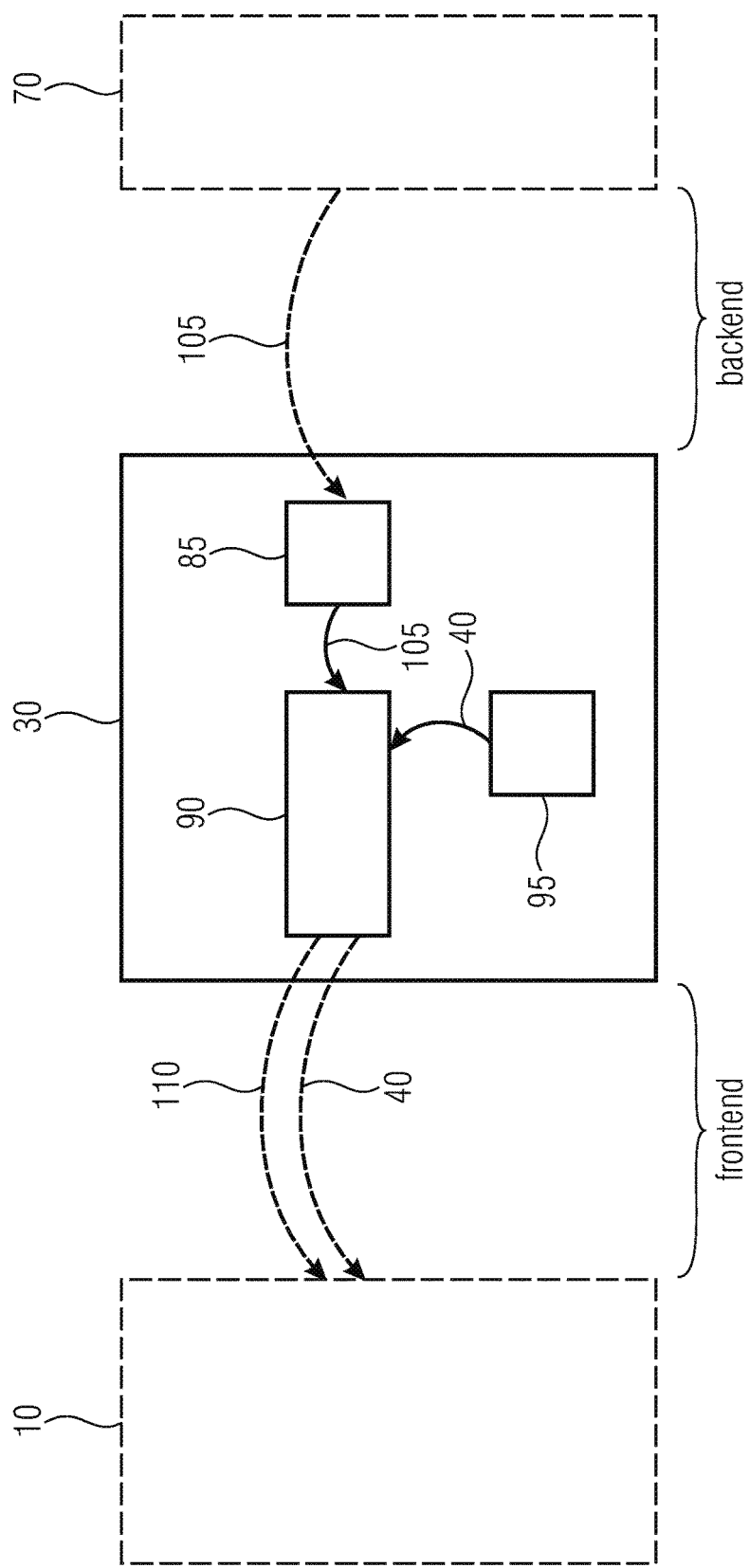
FIG. 5 shows a schematic overview of a SUDAC according to an embodiment.

FIG. 5 shows a schematic overview of a SUDAC 30 w.r.t. downlink signal processing. The SUDAC 30 comprises a backend transceiver 85, a frontend transceiver 90, and an evaluation signal generator 95. The backend transceiver 85 is configured to receive an inbound signal 105 from at least one base station 70 using ultra-high frequencies. The inbound signal 105 may comprise the data portion 35 and the backend control portion 50. The evaluation signal generator 95 is configured to generate the frontend control portion 40 comprising the frontend evaluation signal 45 and the control signal 46. Furthermore, the frontend transceiver 90 is configured to generate an outbound signal (110) using extremely high frequencies comprising the inbound signal (105) and the frontend control portion (40) and to transmit the outbound signal (110) and the frontend control portion (40) to a user equipment (10).

This embodiment shows the SUDAC 30 which is receiving and forwarding a signal from the base station 70 to the user equipment 10 without sophisticated signal processing such as channel estimation etc. Apart from basic time and frequency synchronization in the backend transceiver 85 and the frontend transceiver 90 including filter adaptations, the signal processing part is limited to a frequency conversion and in further embodiments to an amplification of the received signal. Furthermore, the evaluation signal generator 95 creates the frontend control portion (40) comprising the known frontend evaluation signal 45, e. g. a pilot field in a beacon signal. The beacon signal may be transmitted continuously or discrete in a continually way e. g. using a separate transmission channel or the beacon signal is included in the received signal e. g. as part of a header and enables the user equipment 10 to estimate at least the frontend evaluation signal 45 and enables it to compensate detected distortions. The frontend transceiver 90 is configured to generate an outbound signal 110 using extremely high frequencies comprising the inbound signal 105 and the frontend control portion 40 and to transmit the outbound signal 110 and the frontend control portion 40 to a user equipment 10.

Figure 6:
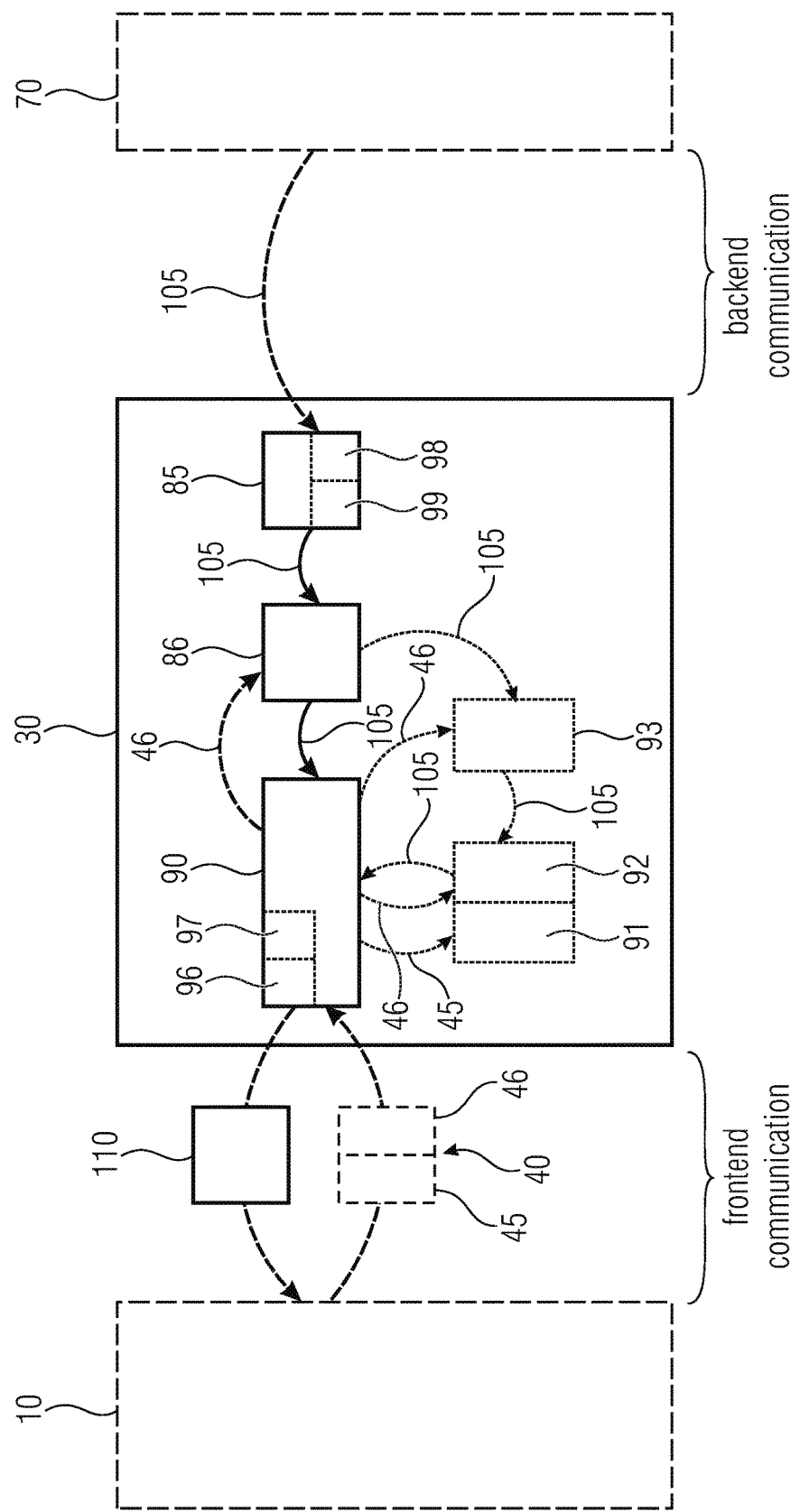
FIG. 6 shows a schematic overview of a SUDAC according to an embodiment.

FIG. 6 shows a schematic overview of the SUDAC 30 according to an embodiment. This embodiment may be referred to as a SUDAC with a receiving mode (downlink) and backend compensation mode. The SUDAC 30 comprises the frontend transceiver 90, the backend transceiver 85, and a backend channel equalizer 86. The backend transceiver 85 is configured to receive the inbound signal 105 from the at least one base station 70 using ultra-high frequencies and to output the inbound signal 105 at intermediate frequencies. Optionally, the inbound signal 105 can be synchronized by a backend frequency estimator 98 and a backend frequency estimator 99. The inbound signal 105 may comprise the data portion 35 and the backend control portion 50. Furthermore, the backend transceiver 85 can transform the inbound signal 105 from ultra-high frequencies to an intermediate frequency which is a more processing friendly frequency, e. g. by removing or down conversion of the carrier frequency. The backend channel equalizer 86 is configured to reduce the inbound signal from distortions caused by using the ultra-high frequencies, using the configuration signal 46 received from a backend channel estimator of the user equipment 10 via the frontend transceiver 90. The configuration signal 46 may be received as part of the control portion 40, e. g. by the frontend transceiver 90. Furthermore, the frontend transceiver 90 is configured to output the inbound signal using extremely-high frequencies in order to generate an outbound signal 110 and to transmit the outbound signal 110 to the user equipment 10. Additionally or alternatively, the frontend transceiver 90 is configured to receive a configuration signal 46 from the user equipment 10 and to forward the configuration signal to the backend channel equalizer 86. The frontend transceiver 90 transmits the outbound signal 110 to the user equipment 10 in a predistorted manner. Therefore, the backend channel equalizer 86 may be configured remotely by the UE 10, which analyzes the relayed backend signal. E.g., the UE 10 estimates the backend MIMO channel, calculates the backend MIMO equalization matrix and distributes relevant parts via the configuration signal 46 in the beacon signals (control portion 40) to the corresponding SUDACs. The configuration signal 46 may comprise filter coefficients or filter indices to select from a set of filters or other signal processing parameters.

According to further embodiments, the SUDAC 30 comprises a frontend channel estimator 91 and a frontend channel pre-equalizer 92. The frontend channel estimator 91 is configured to perform a channel estimation based on the frontend evaluation signal 45. Furthermore, the frontend channel pre-equalizer 92 is configured to pre-equalize the inbound signal 105 to reduce the distortions, which will be caused by using the extremely-high frequencies during transmission of the outbound signal 110, based on the channel estimation of the frontend channel estimator 91. This embodiment describes the SUDAC 30 with extended processing capabilities, since the SUDAC 30 performs a channel pre-estimation and pre-compensation of the frontend channel. Therefore, the user equipment 10 may transmit a frontend control portion 40 comprising the frontend evaluation signal 45. The frontend channel estimator 91 may use the frontend evaluation signal to calculate e. g. filter coefficients or filter indices, which can be applied to filter the outbound signal by the frontend channel pre-equalizer 92. Also other frontend communication data like status and control information of the beacons may be pre-compensated for transmission to the user equipment 10. A channel equalizer 92 in the user equipment 10 is therefore unnecessary or may at least use reduced processing capabilities.

Further embodiment shows the SUDAC 30 comprising a frontend channel pre-equalizer 92 which is configured to pre-equalize the inbound signal 105 to reduce the distortions, which will be caused by using the extremely-high frequencies during transmission of the outbound signal 110, based on the configuration signal 46 received from a frontend channel estimator 20 of the user equipment 10. This embodiment shows the SUDAC 30 with the frontend channel pre-equalizer 92 being remotely configured by the user equipment 10. Therefore, the user equipment 10 may transmit a configuration signal 46 in a frontend control portion 40 to the SUDAC 30. The SUDAC 30 extracts the configuration signal 46 comprising e. g. filter coefficients or filter indices, which can be applied by the frontend channel pre-equalizer 92 to e. g. filter the outbound signal. Also other frontend communication data like status and control information of the beacons may be pre-compensated for transmission to the UE 10. Furthermore, the inbound signal 105 may be encoded by an encoder 93, e. g. before the inbound signal 105 is pre-equalized or, alternatively, the inbound signal 105 can be encoded using the encoder 93 e. g. to compress the inbound signal 105 and therefore reduce the data to be transmitted by the outbound signal 110 to the user equipment 10. Furthermore, the encoder may comprise a quantization of the inbound signal.

Figure 7:
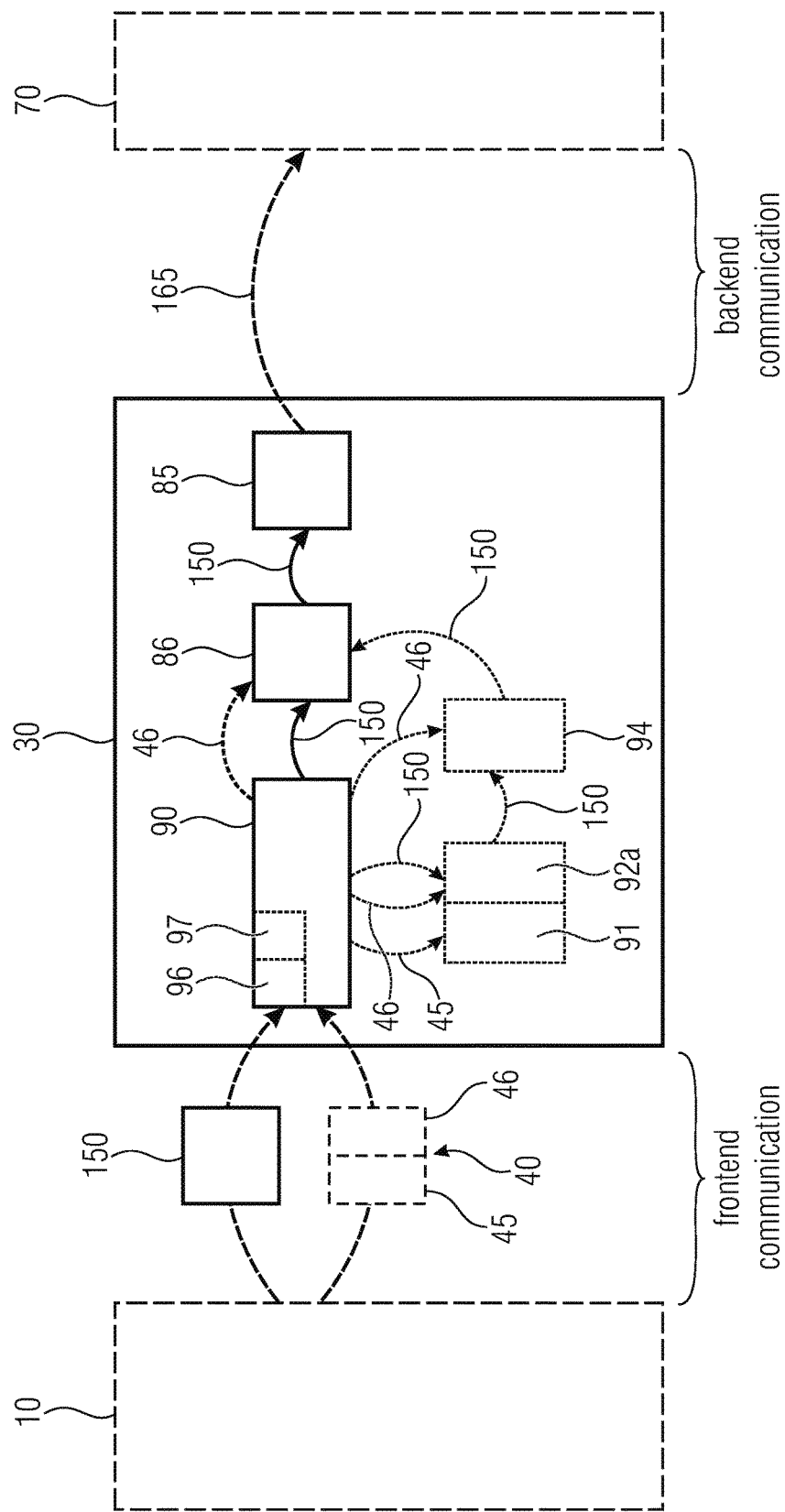
FIG. 7 shows a schematic overview of a SUDAC according to an embodiment.

FIG. 7 shows a schematic overview of the SUDAC 30 according to an embodiment. This embodiment may be referred to as a SUDAC with a transmitting mode (uplink) and compensation mode. In principle, the schematic overview of FIG. 6 is used in the opposite transmission direction. The SUDAC 30 comprises the same/similar processing blocks compared to the SUDAC described in FIG. 6. Therefore, the frontend transceiver 90 is configured to receive an inbound signal 150 from a user equipment 10 using extremely-high frequencies. Optionally, the inbound signal may be synchronized by applying a frontend frequency estimator 96 and a frontend frequency compensator 97 on the inbound signal 150. The inbound signal 150 may comprise a data portion 35, a backend control portion 50, and a frontend control portion 40 comprising a frontend evaluation signal 45 and a configuration signal 46. A frontend channel equalizer 92a may be configured by the frontend channel estimator 91 or remotely by the user equipment 10, e. g.

using the configuration signal 46. Therefore, the frontend channel estimator 91 or the user equipment 10 analyze the frontend signal based on the frontend evaluation signal 45 or regarding a beacon signal, in order to reduce inbound signal distortions. If the inbound signal 150 has been encoded by the user equipment 10, a decoder 94 may decode the inbound signal 150 before further processing. The frontend transceiver 90 may further transform the inbound signal 150 from the user equipment 10 using extremely-high frequencies to a processing friendly frequency, e. g. by removing or down conversion of the carrier frequency. The frontend transceiver 90 may extract a configuration signal from inbound signal and feeds it to the backend channel pre-equalizer 86 for application. The configuration data may comprise filter coefficients or filter indices to select from a set of filters or other signal processing parameters. The equalized and pre-processed inbound signal is forwarded to the backend transceiver 85. Additionally, the SUDAC 30 may apply a (two-stage) frequency offset estimation and compensation, e. g. to reduce Doppler shifts in the frontend and/or backend communication. The backend transceiver 85 may be configured to transmit the outbound signal 165 to the base station 70 using ultra-high frequencies. Therefore, the backend transceiver can apply a frequency conversion e. g. from processing friendly frequencies to ultra-high frequencies to the outbound signal 165.

All above embodiments have in common that distortions of the frontend communication as well as of the backend communication are reduced or at least that the reduction of the frontend distortions and backend distortions is enabled due to the two-stage channel estimation (also in a distributed way: backend channel estimation at the UE and frontend channel estimation at the SUDAC) and compensation at the user equipment for downlink.

According to the above described embodiment, the SUDAC 30 described in FIG. 7 may comprise the SUDAC according to the embodiment described in FIG. 6, for example to create a SUDAC having a transmission and a receiving mode. This embodiment describes the SUDAC 30 comprising sophisticated signal processing. The received signal, either via frontend or backend link, may be equalized, i.e. reduced from distortions caused by the data transmission, where equalization can be e.g. remotely controlled by the user equipment 10. Therefore, a channel estimation is performed either at the user equipment 10 (uplink or downlink) or at the SUDAC 30 (uplink). After completion of the frequency conversion, the signal to be transmitted may be pre-compensated using a previously received backend control portion or a previously received frontend control portion, depending on the direction of the data transmission. Pre-compensation means improving the signal quality at the receiver compared to omitted pre-compensation (assuming that the receiver has only little/limited compensation capabilities).

Embodiments show the frontend transceiver 90 of the SUDAC 30 comprising a frontend frequency estimator configured to perform a frontend frequency estimation based on frontend control portion 40 and a frontend frequency compensator configured to perform a frontend frequency offset compensation based on the estimation. Additionally or alternatively, the backend transceiver 85 of the SUDAC 30 comprises a backend frequency estimator configured to perform a backend frequency estimation based on the backend control portion 50 and a backend frequency compensator configured to perform a backend frequency offset compensation based on the estimation. The frequency conversion may be performed by applying a phase-locked loop adjustment to control the frequency conversion from the extremely-high frequencies to the ultra-high and/or processing friendly frequencies. The phase-locked loop adjustment might as well control the frequency conversion from the ultra-high frequencies to the extremely-high and/or processing friendly frequencies. The phase-locked loop adjustment may be performed on the analogue signal (provided e.g. by a beacon signal) and therefore reduces the digital processing effort in the SUDAC 30. That may be a more efficient processing in terms of processing speed and processing power. Therefore, the SUDAC 30 may comprise a voltage controlled oscillator (VCO), to obtain the frontend and/or backend frequency offset compensation, wherein the additional frontend evaluation signal 47 is a continuous wave signal used by the voltage controlled oscillator to perform an inverse frequency modulation. This may compensate a frequency shift of the inbound signal, e. g. to combat the rapidly time-variant Doppler frequency shift. According to a further embodiment, the frontend and/or backend transceiver 85, 90 is configured to adapt its receiving bandwidth to the bandwidth of the actual inbound signal.

Further embodiments show the frontend transceiver 90 of the SUDAC 30 being configured to receive an inbound signal 150 from a user equipment 10 using extremely-high frequencies, wherein the inbound signal 150 comprises a data portion 35 and a frontend control portion 40 comprising a frontend evaluation signal 45. Furthermore, the frontend communication may use a frequency division duplex technique and wherein the backend communication may use a time division duplex technique.

According to further embodiments, the SUDAC 30 comprises an encoder configured to encode and/or compress the inbound signal 105 using signal processing parameters and/or compressing parameters received from the user equipment 10, or wherein the SUDAC comprises a decoder configured to decode and/or decompress the outbound signal using decoding parameters and/or decompressing parameters received from the user equipment 10. This embodiment is described in FIGS. 24a-e.

SUDACs can relay to/from different sub-bands in the 60G frequency band. Furthermore, according to an embodiment, it is foreseen that the SUDACs signal their (potentially individual) processing delays to the user equipment. And due to the proximity of the user equipments and SUDACs (e.g. a room), the propagation delay effects are minimal compared to occurring propagation delays in the s6G band.

In general, a SUDAS consists of 1 to S SUDACs, wherein a SUDAS may be built in two different configurations: an amplify-and-forward (AF) mode, with no or transparent signal processing of the relayed payload signal, or a decode-and-forward and compress-and-forward (DF/CF) mode, which includes (digital) signal processing at the SUDAC. In the latter case, the uplink would be related to a decode-and-forward scheme, that is a decoding of an error-protection code of the 60G waveform without re-encoding of the error-correction code of the s6G waveform. And the downlink means sampling of the received s6G signal into digital domain without decoding of the error-correction code of the s6G waveform as well as encoding of the payload data samples by an error-protection code and/or by data-compression methods of the 60G waveform. In the SUDAS, each SUDAC has at least one relay path, i.e. physical means to receive a payload signal (e.g. the data portion 35), process it (e.g. band pass filtering), amplify it, do frequency conversion and re-transmission. A relay path can be one directional (simplex) or bi-directional in half duplex mode. Full duplex (i.e. simultaneous uplink and downlink signal relaying) is possible only with two relay paths.

However, in the SUDAS concept, there are almost no limitations due to the usage of a second 60G frequency band. Furthermore, in the proposed concept it is foreseen that the user equipment is allowed to remotely control the SUDACs w.r.t. timing and carrier frequency offset (CFO) alignment or to refer the SUDACs to synchronize to a target base station.

Each SUDAC may have 0 to N downlink relay paths and 0 to M uplink relay paths. The combination of 0 uplinks and downlinks is not meaningful and therefore excluded. More than one relay path per SUDAC would allow to support relaying of several s6G bands of the same mobile network operator (in case of non-continuous frequency bands) or relaying of different mobile network operators. This holds for relay paths with relatively narrow relay bandwidth. However, relay paths supporting wide-band relaying may cover several s6G bands of the same or different mobile network operators.

According to an embodiment, the SUDAC does a frequency conversion of a signal (from/to a MIMO system), where all processing is considered in a single frequency band. This is not restricted to e. g a TDMA approach of relay and terminal nodes, but may use any suitable multiplexing scheme. Furthermore, the processing is not very processing-time-consuming and can be applied in the 60G frequency band, which is a very critical aspect in the light of a rapidly time-variant transmission channel.

According to an embodiment, the SUDAC is not intended to do MIMO channel estimation and sophisticated signal processing, for which the channel estimation results of the destination nodes can be used. This central role of MIMO processing is not foreseen according to this embodiment, because the SUDACs shall do only forwarding of MIMO signals, whereas the MIMO signal processing (encoding/decoding) is done at base station and user equipment side. Opposed to the so-called multi-user MIMO considered in [14], i.e. several source and destination node with only one antenna, the SUDACs act as external antennas to the user equipment in order to decode the MIMO signals from the BS (having multiple antennas) and vice versa.

According to a further embodiment, the SUDAC does channel estimation and signal processing for the inbound and outbound signal. The inbound signal is equalized using the attached evaluation signal wherein the outbound signal is pre-compensated using an evaluation signal previously send by the receiver, e. g. the user equipment 10 or the base station 70.

The base station 70 may also comprise or coincides with a femto base station. Even though a femto base station device may also host a SUDAC in addition to the s6G communication link, this does not contradict this grouping. In other words, opposed to the normal base station, it can host s6G and 60G communication. This case may be considered as a further SUDAC for the SUDAS in this room, where the femto base station is mounted.

Figure 8:
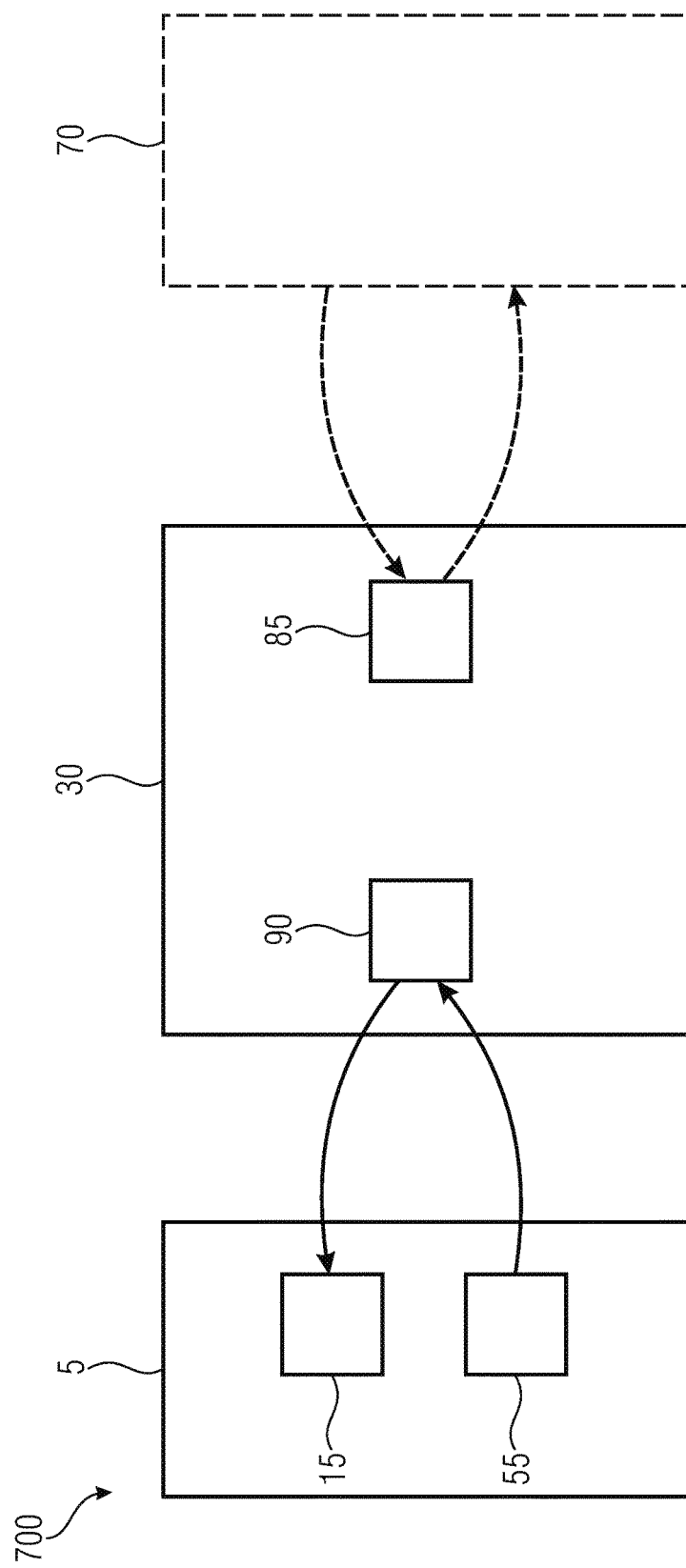
FIG. 8 shows a schematic overview of a system comprising a transceiver of a user equipment and a SUDAC.

After the SUDAC 30 and the user equipment 10 were described separately, a system 700 comprising the transceiver 5 of the user equipment 10 and the SUDAC 30 is shown in FIG. 8. The SUDAC 30 and the transceiver 5 of the user equipment 10 establish a communication link using the receiving and transmitting stages 15 and 55 of the transceiver 5 of the user equipment 10 and the frontend transceiver 90 of the SUDAC 30. Furthermore, the SUDAC 30 and the transceiver 5 of the user equipment 10 may establish a hardware- and/or environment adaptive time synchronization, wherein the time synchronization comprises a synchronization using an external, common time reference, or where the transceiver sends its current clock reference. In a further embodiment, the system 700 further comprises the base station 70 and/or further SUDACs 30 and/or further user equipments 10. Additionally or alternatively, a common time reference of the base station 70 may be received by the transceiver 5 of the user equipment 10 and/or the SUDAC 30 and applied to their local time or clock. To reduce the processing capabilities of the SUDAC 30, the user equipment 10 may extract the time reference from the backend control signal of the base station and forward the common time reference to the SUDAC 30 using e. g. the configuration signal 46 in the frontend control portion 40. Therefore, a common time reference in the base station 70, the SUDAC 30, and the user equipment 10 may be obtained. In an embodiment, the SUDAC 30 in the system 700 is configured for simultaneously relaying two or more communication links serving one or more receiving and transmitting stages 15, 55 of the transceiver 5 of one or more user equipments 10. In other words, the SUDAC 30 is simultaneously serving two or more UEs (uplink and/or downlink) by means of one relay path, which is enabled by negotiation between UEs and SUDAC and/or between UEs and the base station with respect to a suitable resource allocation and/or signal parameters of backend and/or frontend transmission. The transceiver 5 may comprise one or more receiving stages 15, 55 in a single user equipment or in more than one user equipment. The system 700 and especially the communication links will be described in detail in the following sections. Beforehand, the methods for signal processing in the transceiver 5 and the SUDACs 30 will be described in FIGS. 9 to 11.

Figure 9:
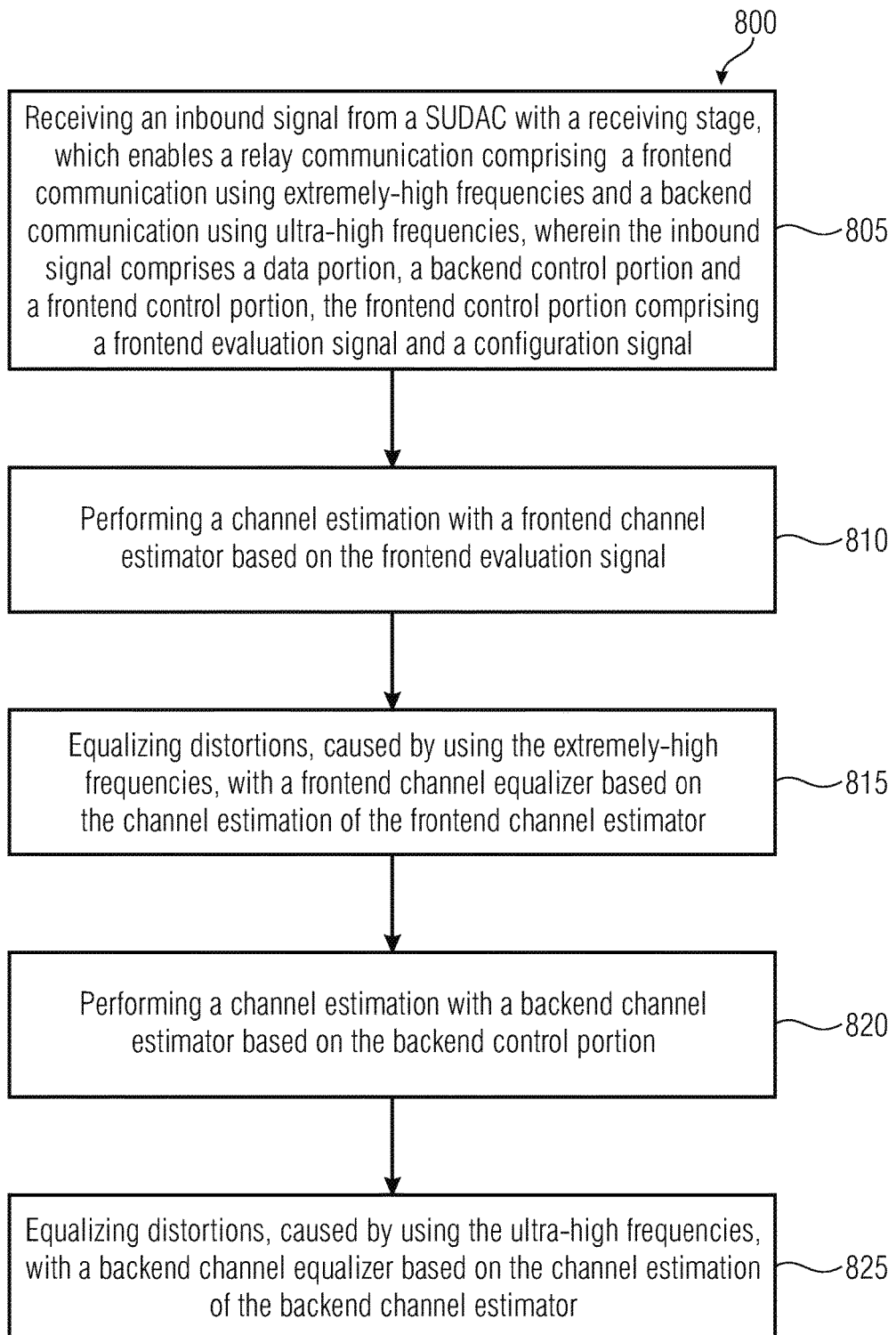
FIG. 9 shows a schematic block diagram of a method for signal processing in a transceiver.

FIG. 9 shows a schematic block diagram of a method 800 for signal processing in a transceiver. The method 800 comprises a step 805 "receiving an inbound signal from a SUDAC with a receiving stage, which enables a relay communication comprising a frontend communication using extremely-high frequencies and a backend communication using ultra-high frequencies, wherein the inbound signal comprises a data portion, a backend control portion and a frontend control portion, the frontend control portion comprising a frontend evaluation signal and a configuration signal", a step 810 "performing a channel estimation with a frontend channel estimator based on the frontend evaluation signal", a step 815 "equalizing distortions, caused by using the extremely-high frequencies, with a frontend channel equalizer based on the channel estimation of the frontend channel estimator", a step 820 "performing a channel estimation with a backend channel estimator based on the backend control portion", and a step 825 "equalizing distortions, caused by using the ultra-high frequencies, with a backend channel equalizer based on the channel estimation of the backend channel estimator". In a further embodiment, the step 825 may be performed by "equalizing distortions, caused by using the ultra-high frequencies, with a backend channel equalizer based on the channel estimation of the backend channel estimator, which includes possible joint processing of a plurality of receiving stages in the sense of claims 2 and 3".

Figure 10:
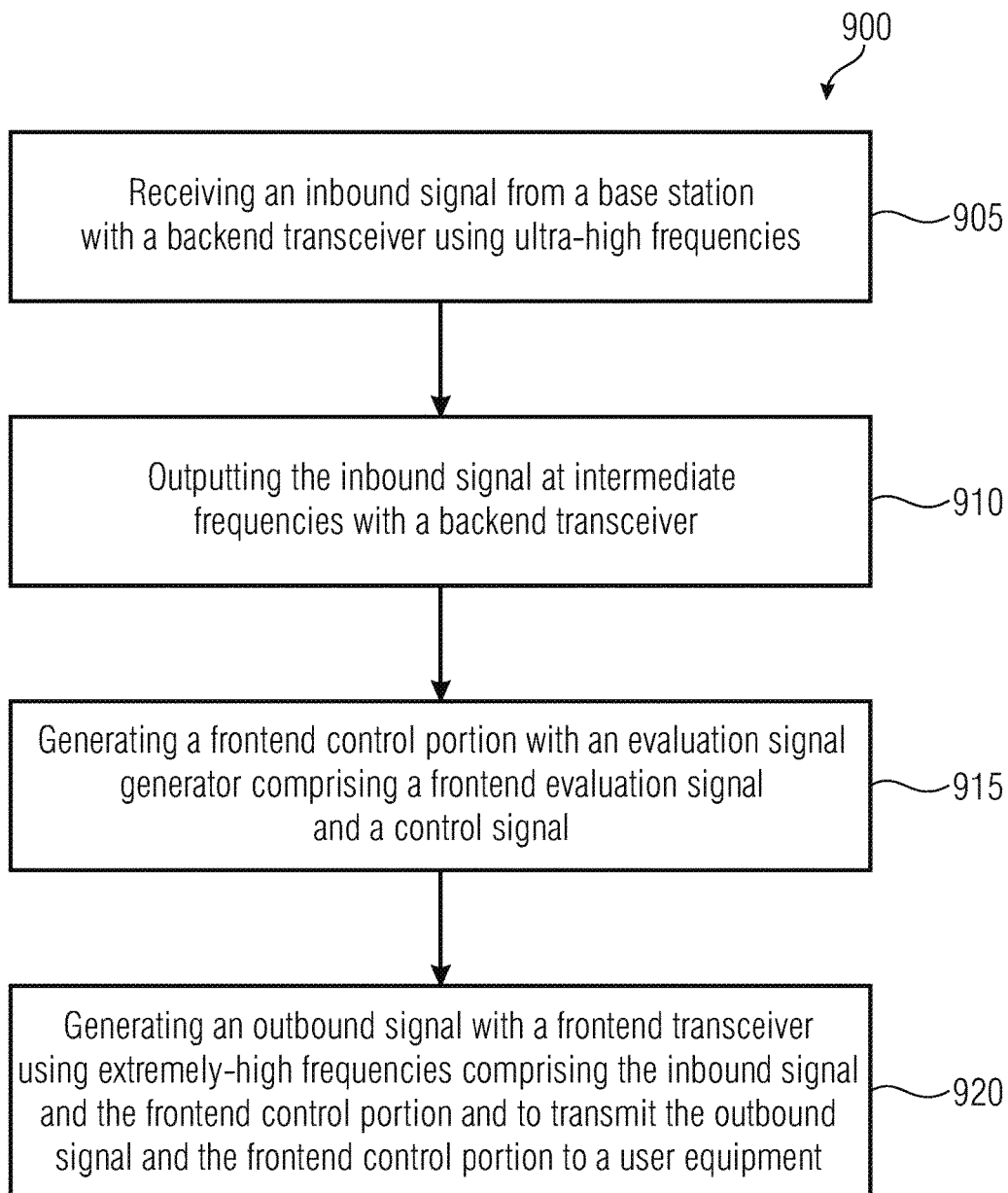
FIG. 10 shows a schematic block diagram of a method for signal processing in a SUDAC.

FIG. 10 shows a schematic block diagram of a method 900 for signal processing in a SUDAC comprising a step 905 "receiving an inbound signal from a base station with a backend transceiver using ultra-high frequencies", a step 910 "outputting the inbound signal at intermediate frequencies with a backend transceiver", a step 915 "generating a frontend control portion with an evaluation signal generator comprising a frontend evaluation signal and a control signal", and a step 920 "generating an outbound signal with a frontend transceiver using extremely high frequencies comprising the inbound signal and the control portion and to transmit the outbound signal and the frontend evaluation signal to a user equipment".

Figure 11:
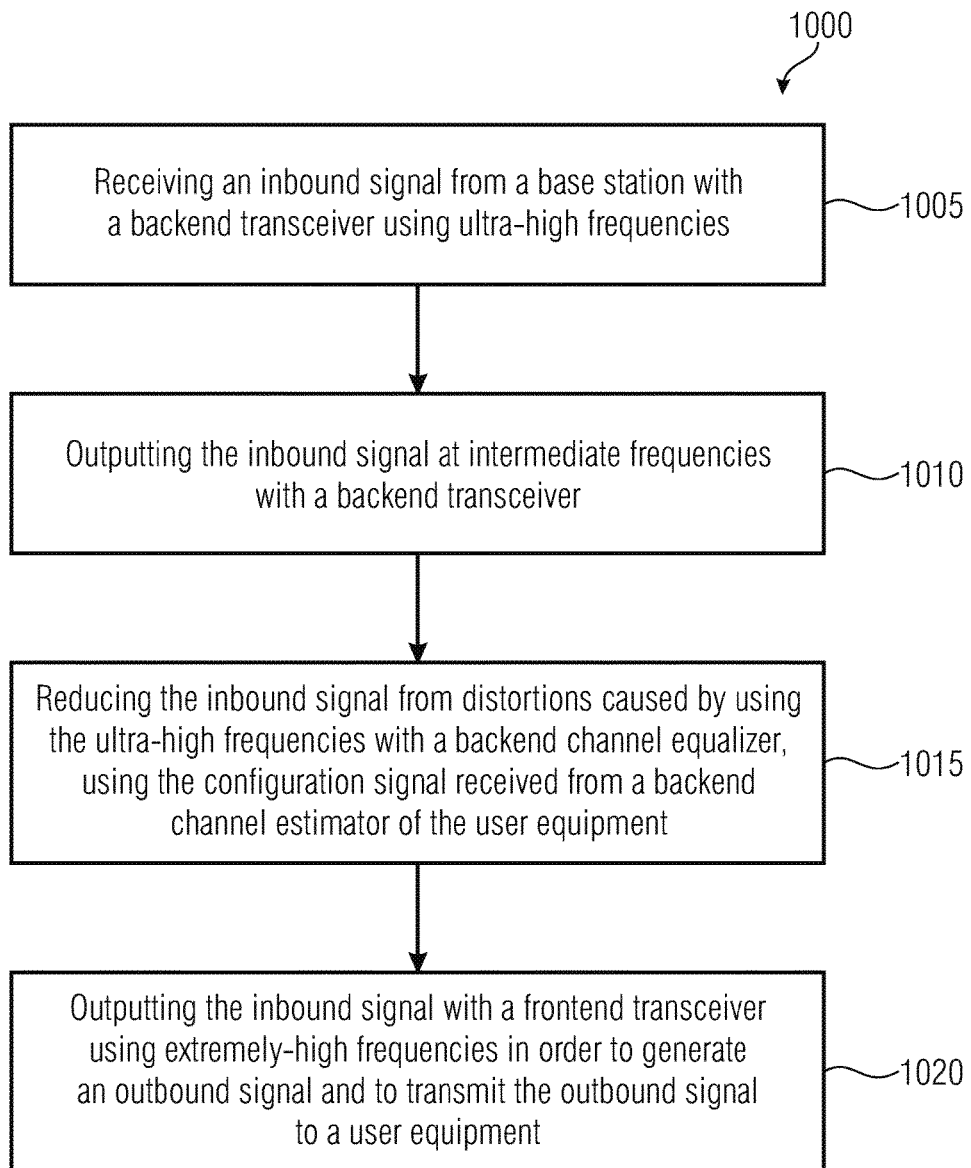
FIG. 11 shows a schematic block diagram of a method for signal processing in a SUDAC.

FIG. 11 shows a schematic block diagram of a method 1000 for signal processing in a SUDAC comprising a step 1005 "receiving an inbound signal from a base station with a backend transceiver using ultra-high frequencies", a step 1010 "outputting the inbound signal at intermediate frequencies with a backend transceiver", a step 1015 "reducing the inbound signal from distortions caused by using the ultra-high frequencies with a backend channel equalizer, using the configuration signal received from a backend channel estimator of the user equipment", and a step 1020 "outputting the inbound signal with a frontend transceiver using extremely-high frequencies in order to generate an outbound signal and to transmit the outbound signal to a user equipment".

In the following, FIG. 12a-c show diagrams of a MIMO representation of the above embodiments.

FIG. 12a shows a schematic diagram of the base station 70 and the user equipment 10, each having three antennas (167a-c and 168a-c, respectively) describing a common MIMO 3×3 communication. The user equipment 10 may perform a joint channel estimation of 3×3=9 channels. Furthermore, the user equipment 10 performs a joint equalization of 9 channels (MIMO decoding), which enables the user equipment 10 to distinguish and separate the signals $S_1$, $S_2$ and $S_3$ which are transmitted from the base station 70.

FIG. 12b shows a schematic diagram of the base station 70, two SUDACs 30a, 30b, and a user equipment 10 in a 3×3 communication mode. In this embodiment, the two SUDACs 30a and 30b comprise one antenna each in order to receive MIMO signals via the backend communication link. Furthermore, the SUDACs 30a and 30b comprise a frontend 60G communication with the user equipment 10. The user equipment 10 further comprises its own backend link antenna 168c to receive signals via the backend communication (referred to as 75b in FIG. 1). In this embodiment, the user equipment first performs a frontend channel estimation and synchronization on the 60G link and second performs a joint channel estimation of the backend channel to be able to perform a MIMO decoding step to separate the signals $S_1$ to $S_3$. This embodiment shows the case of a MIMO processing relay with enough (i.e. minimum amount of) receive antennas.

FIG. 12c shows a schematic diagram of the base station 70, the SUDAC 30a comprising two receive antennas 168a, 168b, the SUDAC 30b comprising one receive antenna 168c and the user equipment 10 comprising one receive antenna 168d. This embodiment shows a MIMO 3×4 communication which offers an increased performance in terms of e.g. bit-error rate compared to the MIMO 3×3 case. This is because an additional degree of freedom is offered to the MIMO decoder, which is commonly denoted as receive diversity gain. In other words, the four receive antennas provide in general more information on the three transmitted signals $S_1$ to $S_3$ to the MIMO decoder than three receive antennas.

The embodiments shown in FIGS. 12b and 12c both comprise only one antenna at the user equipment 10, which is advantageous in small user equipment since antennas for the sub 6G channel are comparably large. In contrast to the s6G antennas, an antenna built for 60G communication is relatively small. Therefore, a user equipment may comprise more 60G antennas than s6G antennas, wherefore the user equipment can establish more 60G connections as compared to a user equipment in an environment without SUDACs, which results in a better performance.

The above mentioned embodiments describe the hardware of a SUDAS. In the following, the advantages of an improved communication scheme between the hardware components, e.g. the SUDAC, the user equipment and the base station will be described. As stated above, the relay communication from the base station over the SUDAC to a user equipment and vice versa uses two different channel frequencies, for example an s6G channel and a 60G channel. There are few points of interaction between s6G effects and 60G effects. This is relevant for modeling the impact of the transmission channel, but also the impact of natural production tolerance of device components.

In the following, a transmission channel model for the 60G frequency band will be described. One embodiment considers that the user equipment is a moving object or that the surroundings of the user equipment are time-variant (e.g. body movement or metal reflectors), while the SUDACs are assumed to be fixed. According to further embodiments, the relative movement and environment relation between the base station and SUDACs (e.g. fixed base station and moving SUDACs) as well as between base station and user equipment in the s6G domain can be taken into consideration.

Frequency-Variability of the 60G Channel

Recent measurement-based channel models assume that the 60G channel is mainly subject to flat fading with a strong line-of-sight (LOS) component, which can be modeled as flat Rice fading. According to [2], common delay spread values for indoor communication are in the order of $\sigma_\tau$=10-20 ns. This can be translated into a coherence bandwidth (where the frequency correlation of the channel is above 0.5) by [5]

$$B_C \approx \frac{1}{5\sigma_\tau} = \frac{1}{5 \cdot 20 \text{ ns}} = 10 \text{ MHz}.$$

This indicates a coarse measure for the bandwidth over which a channel can be assumed as quasi-constant. The maximum excess delays of a few hundreds of nano-seconds may occur with very strong attenuation, on the other hand the application of directive or steerable antennas (in SUDACs and user equipments) for data transmission on the 60G channel will reduce the delay spread as well as the maximum excess delay in general.

As a consequence, for a transmission system with signal bandwidth significantly smaller than $B_C$, the channel transmission function can be modeled as a single complex valued constant over the signal bandwidth. In contrast, a transmission system with a signal bandwidth significantly larger than $B_C$ may take into account the frequency-variability. In the latter case, the channel impulse response of the 60G channel can be estimated and used for equalization. Thus, equalization may be done at the receiver side (e.g. at the user equipment in case of a downlink) or transmit side (=precoding/pre-compensation) (e.g. at the user equipment in case of an uplink), where the advantages of an OFDM signal waveform can be exploited. Note that the base station can do pre-coding only for the s6G link but not for the 60G communication link.

Time-Variability of the 60G Channel

Due to the absence of strong multipath components, the fading effect over frequency is marginal but significant over space/location of the moving user equipment. Furthermore, the Doppler effect due to user equipment movement will mainly result in a Doppler shift rather than in a Doppler spread for each signal transmission.

This is illustrated in the following examples:

Common speeds of the (handheld) user equipment 10 are below 1 m/s. Assuming a carrier frequency of 60 GHz, the maximum Doppler frequency and the coherence time according to [5] result as $$f_{D,max} = \frac{v}{c} \cdot f_c = \frac{1\frac{m}{s}}{3 \cdot 10^8 \frac{m}{s}} \cdot 60 \text{ GHz} = 200 \text{ Hz}$$

$$T_C = \frac{9}{16\pi f_{D,max}} \approx 0.895 \text{ ms}$$

Maximum/worst-case speed of $v_{max}=3$ m/s can occur when the user turns fast with the user equipment in its hands. Thus, we have $$f_{D,max} = \frac{v}{c} \cdot f_c = \frac{3\frac{m}{s}}{3 \cdot 10^8 \frac{m}{s}} \cdot 60 \text{ GHz} = 600 \text{ Hz}$$

$$T_C \approx \frac{9}{16\pi f_{D,max}} \approx 0.298 \text{ ms}$$

Note that the described LOS (line-of-sight) channel characteristic may be different in factory buildings and cars due to reflections at metal surfaces, which is not the case in conventional indoor environments. This effect might become more evident with larger relayed payload bandwidths, but for 20 MHz bandwidth and below, frequency-flat fading can be assumed.

A constant Doppler offset can be easily handled, because fast moving user equipments (at vehicular speed) experience such Doppler shifts already on the direct link to the base station in a s6G link. Thus, a common user equipment is already able to estimate and compensate such a constant shift.

However, the considered Doppler shift in the mm-wave band can change much faster over time due to sudden changes of user equipment movement direction than in the s6G domain. For example, if a user equipment, whose user starts to walk, accelerates from $v_1=0$ m/s to $v_2=1$ m/s within a duration of $\Delta t=1$ second, then the Doppler shift changes in average by $$\frac{\Delta f_D}{\Delta t} = \frac{\Delta v/\Delta t}{c} \cdot f_c = \frac{1\frac{m}{s}/1 \text{ s}}{3 \cdot 10^8 \frac{m}{s}} \cdot 60 \text{ GHz} = 200 \frac{\text{Hz}}{\text{s}}.$$

The same acceleration in the s6G band with e.g. $f_c=3$ GHz would mean a change of 10 Hz/s.

That means that there is a much stronger time-variant Doppler shift $f_D(t)$ than in the s6G band. As a result the channel phase (and amplitude) changes rapidly over time as well as the change rate or gradient of the Doppler shift $\partial f_D(t)/\partial t$.

As a consequence, the user equipment would not be able to compensate these fast phase variations at 60G by exploiting the reference data provided within the relayed payload signal, which is specified based on the s6G channel characteristics. Note that the envisaged high data rate transmission is very sensitive to any type of interference and distortion. Therefore, accurate channel estimation and synchronization are advantageous for 60G communication systems.

Carrier and Clock Frequency Offset Consideration

The local oscillator (LO) for 60G reference clock generation is one of the most critical elements concerning a synchronization. All SUDACs as well as the user equipments include these clock generators. They may have cheap local oscillators, which have for example an inaccuracy of 50 ppm with respect to a nominal frequency. This leads to a worst case offset of $\pm 50 \cdot 10^{-6} \cdot 60$ GHz=$\pm 3$ MHz in terms of sampling frequency and carrier frequency. This is already an offset in the same order of the relayed signal bandwidth, which would lead to strong distortions if not compensated. Unfortunately, the s6G synchronization is not sufficient because it is designed for much smaller offsets. Therefore, a new concept to synchronize at 60G can be implemented in the user equipment and in the SUDAC.

Exemplary Transmission at 60G

Prior to explaining the novel transmission and synchronization concept in detail, a SUDAS is introduced in such a way that all occurring frequency offsets can be defined. In this example, we consider first the frontend downlink with S=3 SUDACs, i.e. the transmission from SUDACs to the user equipment.

Downlink with Single Beacon Signal

FIG. 13*a* shows schematic transmit spectra 170*a-c* of three SUDACs that are visualized versus frequency f. According to an embodiment, each SUDAC transmits a signal block, which consists of a beacon signal 175*a-c* (vertical arrow) and the relayed payload signal 180*a-c* within the relayed bandwidth $B_{Relay}$ 185*a-c* (dashed rectangular). Between beacon signal 175*a-c* and relayed band 185*a-c*, there is a guard bandwidth $B_G$ 190*a-c*. Note that parts of the neighboring s6G signals 195*a-c* next in frequency in the s6G band to the target payload signal 180*a-c* may also be forwarded by the relay. This is a signal not meant for the UE using the SUDAS.

Furthermore, FIG. 13*a* shows different frequency offsets and distances as follows:

There is a guard bandwidth $B_G$ 190*a-c* between each beacon signal 175*a-c* and relayed signal bandwidth $B_{Relay}$ 185*a-c*. An assumption of $B_{G1} \approx B_{G2} \approx B_{G3}$ can be made but is not essential because the relayed signal 180*a-c* is not necessarily located at the center of the relayed bandwidth 185*a-c* due to e.g. backend Doppler shifts $f_{B1}$-$f_{B3}$. So, there may anyways be no common frequency distance between beacon signal 175*a-c* and relayed payload signal 180*a-c*.

Frontend Doppler shifts due to UE movement relative to the SUDACs: $f_{D1}$, $f_{D2}$, and $f_{D3}$. The dashed underbraces indicate that this shift holds for the whole signal block.

Backend Doppler shift $f_B$, which is likely to also include some Doppler spread from the s6G radio channel propagation. E. g. considering a car mounted with SUDACs or a vehicles of the public transportation, they may have somewhat directive backend antennas outside the vehicle and therefore different shifts $f_{B1}$, $f_{B2}$, and $f_{B3}$ of the payload signal within the relayed bandwidth will occur. Static locations of BS and SUDACs w.r.t. each other result in $f_{B1}=f_{B2}=f_{B3}=0$ Hz.

Due to the mentioned inaccuracies of the SUDACs' local oscillators relative to the user equipment's local oscillator, a frequency offset $\Delta f_{lo}$ results. Since the SUDACs are not yet synchronized, $\Delta f_{lo1} \neq \Delta f_{lo2} \neq \Delta f_{lo2} \neq 0$ can be considered, where worst-case values in the range of ±3 MHz can occur as analyzed above. These offsets normally occur when power up a device. Thus, this offset may be considered in an initial phase of acquisition, where the large frequency offset is eliminated first (using a frontend protocol as shown below) and then start relaying the payload signal.

The actual frequency shifts result in:

[Beacon1+Relayed Signal 1]=Signal block 1 170*a*
→Actual frequency shift by $f_{D1}+\Delta f_{lo1}$

[Beacon2+Relayed Signal 2]=Signal block 2 170*b*
→Actual frequency shift by $f_{D2}+\Delta f_{lo2}$

[Beacon3+Relayed Signal 3]=Signal block 3 170*c*
→Actual frequency shift by $f_{D3}+\Delta_{lo3}$, which is negative in the shown example in FIG. 13*a*

In this embodiment, it has been assumed that each SUDAC has one downlink relay path. However, each SUDAC may have N relay paths in general. If N=2, e.g. signal block 1 170*a* and signal block 2 170*b* may be transmitted by the same SUDAC to one user equipment. Then $\Delta f_{lo1}=\Delta_{lo2}$ and $f_{D1} \approx f_{D2}$ would result, where the Doppler shift is only approximately equal because of potentially different antenna directivities and locations on the SUDAC device.

Uplink Considerations

The uplink case, i.e. the transmission from the user equipment to three SUDACs, is explained according to FIG. 13*a*. Again, there is $\Delta f_{lo1} \neq \Delta f_{lo2} \neq \Delta f_{lo2} \neq 0$ as relative offset between the user equipment's local oscillator and the SUDAC oscillators. There is no backend Doppler frequency shift $f_{B1}-f_{B3}$ due to the opposite transmission direction, but the frontend Doppler shifts due to user equipment movement relative to the SUDACs ($f_{D1}$, $f_{D2}$, and $f_{D3}$) are still different and may be compensated within the SUDAS because the base station will not be able to compensate them.

Therefore, a synchronization mechanism may be applied enabling the user equipment, the SUDAC and the base station to send and receive data reliably from one device to another.

Concept for Synchronization

The concept for synchronization aims for the SUDAS type of "Amplify-and-Forward" (AF), where the challenge arises to synchronize and equalize a relayed signal, which is not designed for 60G transmission. However, for the SUDAS type of "Compress-and-Forward" (CF), there will be a specific waveform, which will be suited for the 60G transmission in order to synchronize correctly and independent of the embedded relayed payload data. Here, "suited for the 60G transmission" means adequate pilot data structure of the CF waveform for synchronization at 60G. However, in case of AF, the relayed payload data is directly or transparently forwarded and the "adequate pilot data structure" may be added separately according to the concept described below. The following parts deal with the transmission system in general.

Mobile Network Duplex Types

In general, one can distinguish between two mobile network duplex types, which lead to different aspects in case of relaying:

Frequency Division Duplex (FDD) system: The uplink and downlink payload transmission take place at different carrier frequencies and can therefore be used simultaneously and need not be time-synchronized. For this case, the approaches discussed below can be used as they are. SUDACs then have single-directional relay paths implemented, e.g. one downlink relay path and one uplink relay path, which work independently of each other.

Time Division Duplex (TDD) system: The uplink and downlink payload transmission takes place at the same carrier frequency but at different time slots. For this case, the SUDAS can also synchronize to the duplex switching cycle. Each implemented relay path of a SUDAC has also to support bidirectional transmission according to the duplex switching cycle.

Exemplary Beacon Signal Schemes

The beacon signals are meant for communication, configuration, and synchronization at 60G of the SUDAS, also called status/control channels. According to the actual embodiment, the beacon signal can be e. g. a single carrier signal, a multi-carrier signal like OFDM or a spread-spectrum signal, c. f. [4] and [5]. Below are listed general aspects to create a suitable beacon signal scheme.

Due to the absence of channel dispersion on the 60G band, a single carrier signal may be a good choice due to its simplicity in signal processing.

Since bi-directional communication via beacon signals between SUDACs and UE could be envisaged, one can choose between a TDD and an FDD approach. In any case, there should be a sufficiently dense structure of pilot fields within the beacon signal to ensure two goals: Successful channel estimation and synchronization for a robust beacon signal communication as well as equalization of the fast varying frontend channel over the relayed bandwidth.

In general, the beacon signal can be specified as continuous or dis-continuous/bursty transmission, where the latter one would be advantageous for the TDD approach. During active relaying of a signal, the most convenient way for the synchronizing receiver (receiving stage of the user equipment) is to have a continuous and regular structure of pilot data within the beacon signal. In this respect, it does not matter whether the beacon data fields completely fill the space between the pilot fields or whether the data fields are transmitted by the SUDAC or by the user equipment (in case of TDD). Thus, it is advantageous to specify the pilot field duty cycle of the beacon carrier, i.e., the sharing ratio between pilot fields and none-pilot fields.

Due to the fast time-varying channel, it is advantageous for the beacon signal to have a sufficiently high symbol rate to transmit pilot data in a dense time grid. So the pilot fields within the beacon signals can be dense enough to allow interpolation over the beacon data fields. Depending on the signal-to-noise ratio (SNR), there is also a certain pilot field length advantageous to assure the estimation accuracy. In the following, it is assumed that the pilot field duty cycle and field length are correctly designed for the 60G channel (="adequate pilot data structure").

Figure 14:
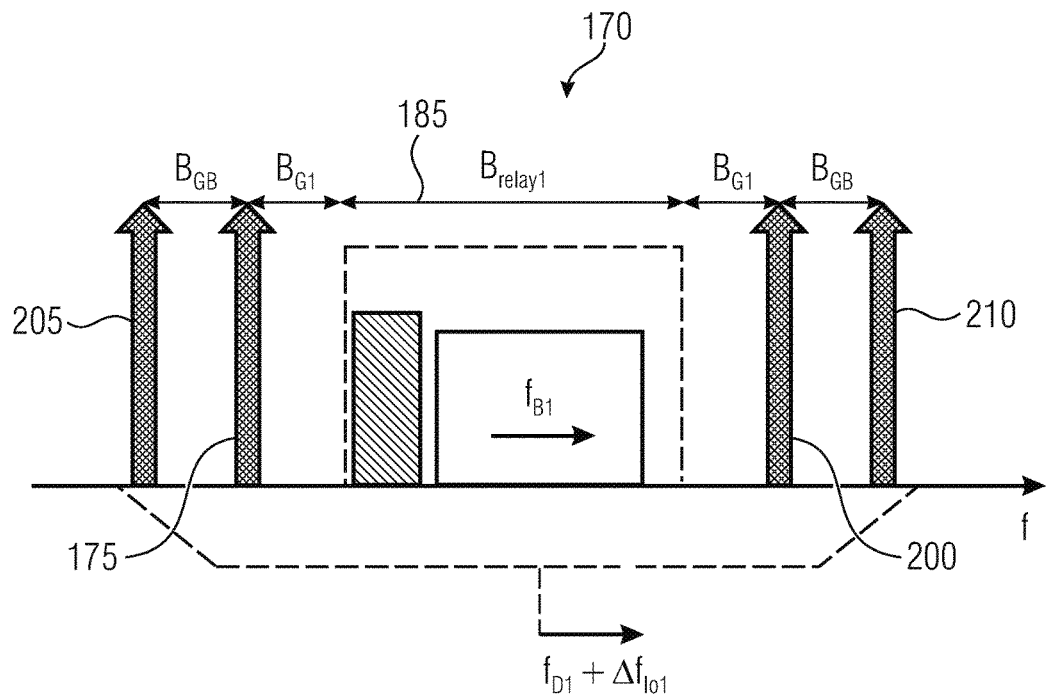
FIG. 14 shows an exemplary transmit spectrum of multi-beacon signal blocks in the 60G band by one SUDAC.
Figure 15:
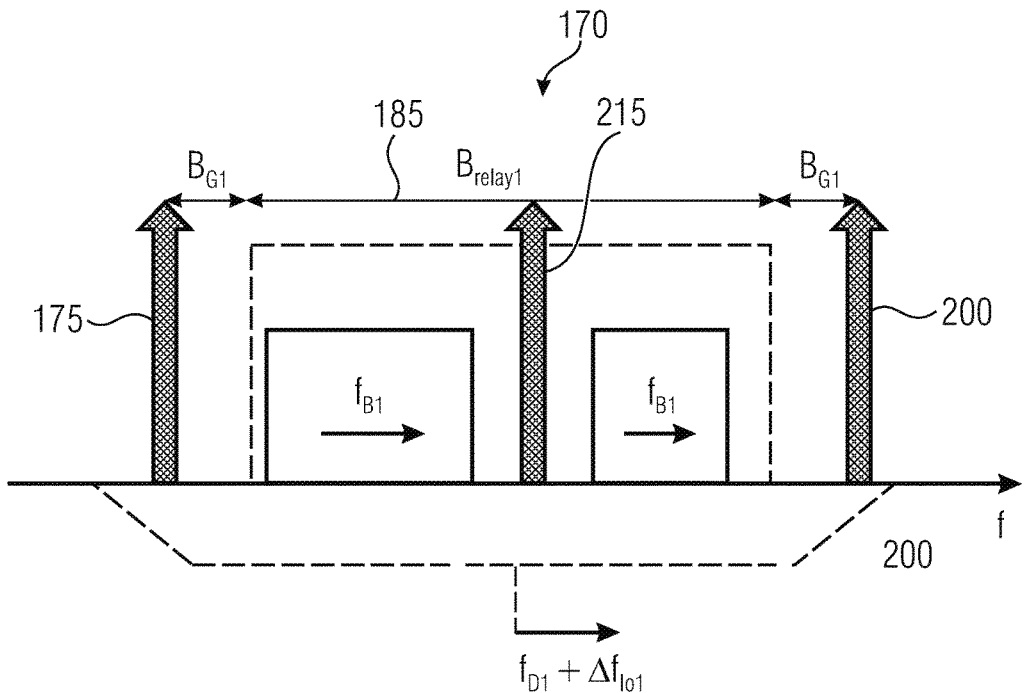
FIG. 15 shows an exemplary transmit spectrum of super-position-beacon signal blocks in the 60G band by one SUDAC.
Figure 16:
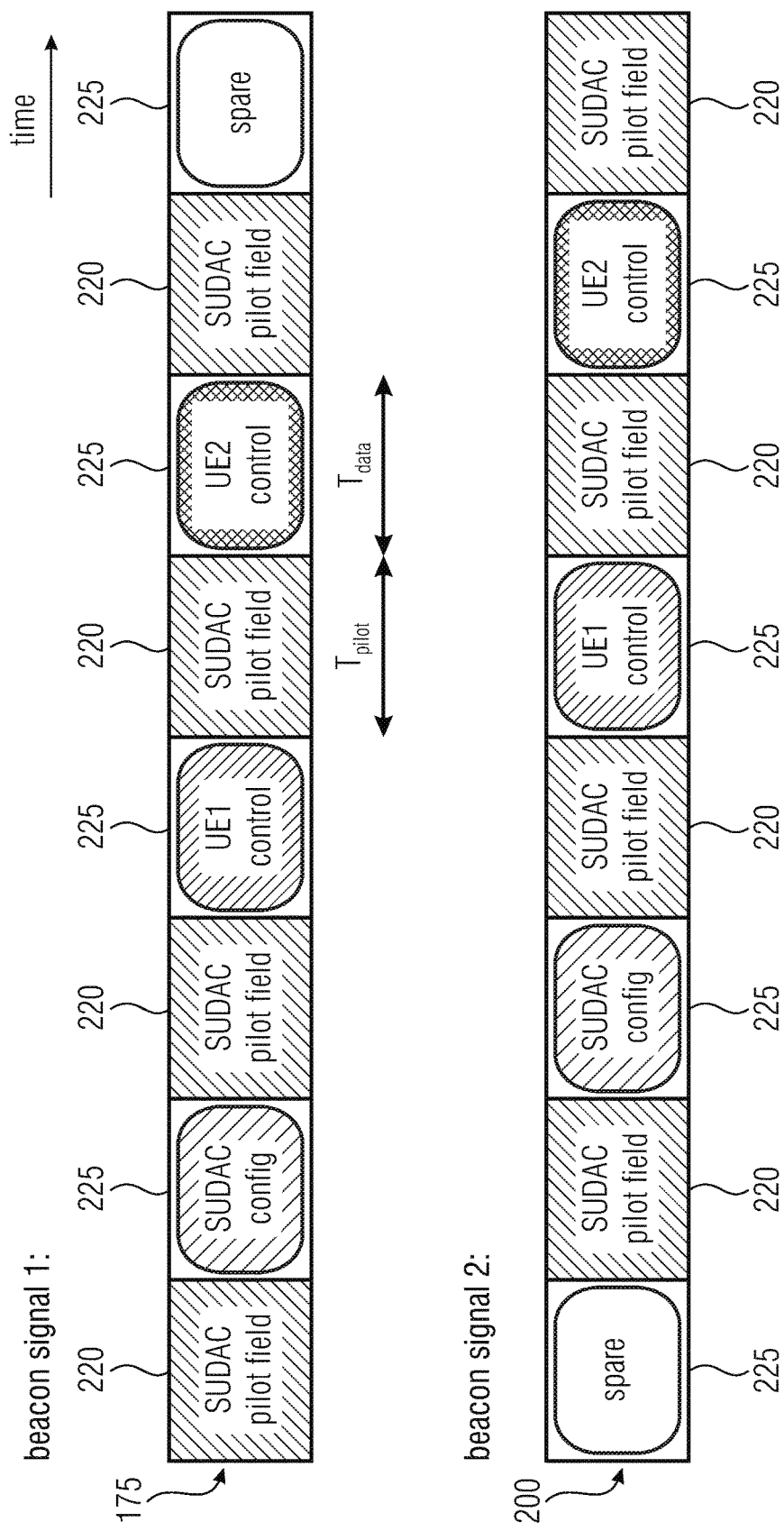
FIG. 16 shows an exemplary high level beacon signal structure indicating pilot fields and fields for control and configuration data in a TDD (time division duplex) mode.
Figure 17:
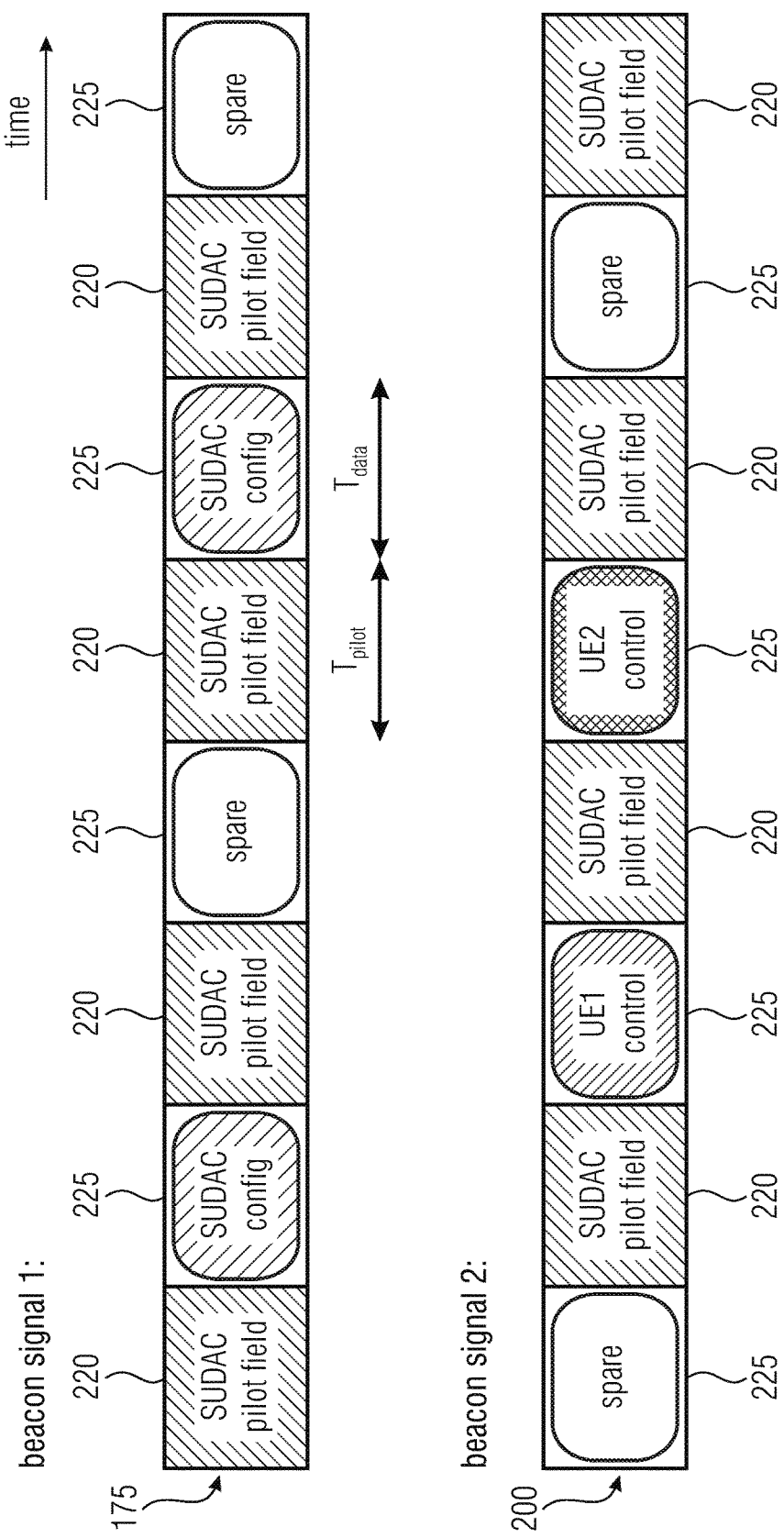
FIG. 17 shows an exemplary high level beacon signal structure indicating pilot fields and fields for control and configuration data in a FDD (frequency division duplex) mode.

To be more specific, possible embodiments of beacon signal schemes are described in FIGS. 13*a*-17 wherein FIGS. 13*a*-15 show exemplary transmit spectra using different beacon schemes and FIG. 16-17 show exemplary structures of beacon schemes. The reference signs 175, 200, 205, 210, and 215 used for the beacon signal refer to the frontend control portion 40 and/or the additional frontend control portion 42. The reference sign 220 of the pilot data fields refers to the frontend control portion 45 and the reference sign 225 of the data fields refers to the configuration signal 46.

In FIG. 13*a*, a single-beacon signal block is shown which has already been introduced and visualized.

FIG. 13*b* shows exemplary transmit spectra 170*a-c* of an un-synchronized double-beacon transmission in the 60G band by three SUDACs. Using double-beacon signal blocks, one beacon signal is arranged below and another beacon signal is arranged above the relay bandwidth. Therefore, a second beacon signal 200*a-c* is added to the transmit spectra of FIG. 13*a*. As shown in FIG. 13*b*, the second beacon signal 200*a-c* may have the same guard bandwidth $B_{G1}$-$B_{G3}$ above the relayed bandwidth 185*a-c* compared to the guard bandwidth of the beacon signals 175*a-c* below the relayed bandwidth. In a further embodiment, the guard bandwidth may also differ between the relayed payload signal 180*a-c* and the beacon signal 175*a-c* or the beacon signal 200*a-c*.

FIG. 14 shows an exemplary transmit spectrum 170 of multi-beacon signal blocks in the 60G band by one SUDAC. Multi-beacon signal blocks are characterized by more than one beacon signal below the relay bandwidth 185 and/or more than one beacon signals above. In the embodiment shown in FIG. 14, there is a first and a second beacon 175, 205 below the relay bandwidth 185 and a first and a second beacon 200, 210 above the relay bandwidth 185 having two guard bandwidths $B_{GB}$ and $B_{G1}$. Multi-beacon signals can be realized and implemented in different ways. If a multi-carrier transmission method like OFDM is applied, there can be subcarrier individual resource allocation for beacon data and pilot data.

According to further embodiments, several single carrier beacon signals can be placed at different frequencies to accomplish the same free resource allocation as shown in FIG. 15. However, a simple repetition of a single carrier beacon signal over frequency can be accomplished by transmitting also the spectral repetitions of the originally digital beacon signal.

Furthermore, (Multi-) Beacon signal blocks (like in FIG. 14) with different/adaptive signal structure over t-f-c-s resource may be applied. I.e., the pilot density may be adapted over time (pilot field length or density) to account for a faster or slower varying channel. Thus, the channel estimating device (e.g. UE) will give feedback to the pilot field transmitting device (e.g. SUDAC). Opposed to the following approach, an advantage of multi-beacon signal blocks is that beacons may easily be cancelled completely from the signal block such that there does not remain interference to the relayed payload.

FIG. 15 shows an exemplary transmit spectrum 170 of a superposition-beacon signal block in the 60G band by one SUDAC. Herein a spectral gap within the relay bandwidth is exploited to place a superposition beacon 215. Superposition-beacon signal blocks correspond to the multi-beacon signal blocks, but introduce also beacon signals 215 within the relayed bandwidth 185. Thus, the latter beacon signals will superimpose with the relayed signals. A robust beacon signal waveform is beneficial to enable detection and channel estimation in this interference scenario. Superposition beacon signals have three major advantages/characteristics:

a) Since the location and content of the superimposing beacon signals are known to the UE, they can be canceled from the payload signal. This transmission scheme may be related to a kind of CDMA transmission.

b) Like a) but exploiting some gaps in the spectrum of the relayed signals within the relayed bandwidth. Most likely, the UE has knowledge or detects gaps and signals this information to the SUDAC. Thus, a remaining interference after a possible incomplete beacon signal cancellation is avoided, because a payload signal is not located at these frequencies. This embodiment is visualized in FIG. 15. This scheme is suitable for an FDMA approach. In case the SUDAC is informed by the UE on the payload signal resource allocation in time, one can also apply a TDMA scheme for the superposition beacons.

c) The user equipment can signal to the base station to not allocate payload data to specific frequency resources, where the superimposing beacon signals shall be located in frequency. As a consequence, also no distorting superposition will occur at the cost of reduced useful s6G bandwidth for payload data because of this spectral gap. However, the base station can fill this spectral gap with payload data for other user equipments, which is not forwarded by the SUDAC.

Lattice Beacon Signal Block

In the special case of relaying a set of backend carriers, the SUDAC can shift the signal spectra of the different backend carriers in frequency (in addition/combination to the up-conversion) in order to produce suitable gaps for transmitting the beacon signals. This mode can be used if the base station aggregates a set of subbands for one user equipment or a certain group of user equipments, which is a potential method to achieve high data-rates. If the data of a certain group of user equipments is spread over these subbands, a multiplexing gain can be achieved compared to aggregating exclusively one subband per user equipment. An example is visualized in FIG. 27, where subbands/carriers 1 to 3 1605-1615 are shifted separately and subbands/carriers 4+5 1620, 1625 en bloc. Note that there will be a maximum distance between two beacons to allow correct channel estimation, which is why this shifting of subbands and having the "superposition" beacons might be advantageous. The total bandwidth of the relay signal $B_{relay,total}$ equals the sum of the bandwidths of the backend relay signals $B_{relay,a}$ $B_{relay,b}$ $B_{relay,c}$ $B_{relay,d}$.

Considering the beacon signal structure, two examples for a double-beacon signal block are discussed in the following.

FIG. 16 shows an exemplary high level beacon signal structure indication pilot fields and fields for control and configuration data in a TDD mode. Assuming a single carrier signal with linear modulation, a first potential high-level signal structure is depicted in FIG. 16, where pilot data fields 220 are inserted in a regular manner, transmitted by the SUDAC and have a duration of $T_{pilot}$. Between the pilot fields, there are data fields 225 for configuration and control data. In this embodiment of beacon signal 1 175, the SUDAC transmits first, then user equipment 1 and finally user equipment 2, while the last data field is empty as spare. The above mentioned proper beacon signal design will assure that $T_{pilot}+T_{data}$ is (noticeably) smaller than $T_C$. In this example, beacon signal 2 200 (placed e.g. at the right side of the spectrum) has the same but shifted structure. This staggered scheme, which can also be extended to more than two beacon signals, has the following advantages:

A denser grid of Doppler frequency estimates (at least one per each pilot field) in time direction results compared to a single beacon signal of the same type. This results in a better tracing of the Doppler frequency change.

The structure enables a more precise channel interpolation from the staggered pilot fields over the relayed bandwidth as discussed in a further section.

Since this signal structure depicted in FIG. 16 allows transmission of user equipments and SUDACs in a TDD mode, the structure can be used for uplink and downlink relaying due to the synchronization concepts shown below.

FIG. 17 shows an exemplary high level beacon signal structure indication pilot fields and fields for control and configuration data in a FDD mode. According to this embodiment, both beacon signals 175, 200 have the same pilot structure as shown in FIG. 16. Here, beacon signal 1 175 is meant only for transmitting SUDAC configuration data and beacon signal 2 200 is meant only for user equipment control data. Thus, this mixed TDMA/FDMA scheme allows status and control data transmission of UEs and SUDAC in a FDD mode (in the view of the SUDAC).

Transmitting pilot fields by the SUDAC has a couple of advantages compared to transmitting pilot fields by the user equipment.

Applying a scheme to align the pilot field transmission of UE1, UE2, and further ones may be used, where, the handling of newly introduced devices is not advantageous. An exaggerated number of spare data fields may be used for hosting all potential pilot fields of the UEs due to different transmission channels. However, pilot fields transmitted by a SUDAC can be used for more than one transmission link.

The SUDAC does not need to spend effort on channel estimation and equalization, this is done by the user equipment.

Good channel estimation accuracy over the relayed bandwidth since each user equipment can evaluate the beacon signals of each SUDAC having a line-of-sight connection to the user equipment.

Permanent transmission of pilot fields is no problem for a SUDAC which is commonly connected to (any kind of) power supply, but the battery-driven UE might suffer from the burden of permanent transmission.

In general, the pilot symbol sequence can be the same or different within different pilot fields according to a predefined generation scheme.

Principles and Demands

SUDAC basic functionality/working principle:

Signaling communication by means of beacon signals (Rx and Tx digital processing) between SUDACs and UE in the 60G domain.

Relaying of payload signals by one or more analogue RF chains, which includes amplification, carrier frequency conversion and filtering. One relay path is used per relayed signal. At least one beacon signal processor may be used per relayed signal.

User demands to the system:

Typical cases: walking around with the UE, turning around with the UE. High accuracy of the channel estimation is beneficial to not degrade the system throughput.

Untypical cases: throwing the UE on the floor, fast UE shaking. The channel estimation may fail and synchronization may be lost while such a use case persists. Fast recovery is provided after these events end.

General synchronization flow in a receiver:

1. Acquisition for coarse synchronization to reduce offsets (e.g. carrier frequency offset) such that algorithms of the tracking stage can cope with it:
   Cold acquisition after switching on the device
   Warm acquisition after a device internal reset initiated e.g. by pushing a reset button
2. Tracking for fine synchronization and channel estimation
   Offsets are further reduced by the more precise algorithms of this stage
   In this mode data demodulation is done.

Frequency Synchronization

As indicated before, local clock offset leading to sampling and carrier frequency offsets is a severe problem, because the worst-case offset is already higher than potential beacon signal bandwidths. Commonly frequency synchronization is performed before channel estimation is applied. Although one can measure only the sum $\Delta f_{lo}+f_D$, it can be exploited that $|\Delta_{lo}|\gg|f_D|$ can happen and that the Doppler shift $f_D$ varies faster over time than $\Delta f_{lo}$.

1. During acquisition, the mean and potentially large carrier frequency offset is estimated and compensated, which refers mostly to the frequency offset $\Delta f_{lo}$ of the local oscillator.
2. During tracking, the large offset estimated in 1. is assumed to be already compensated. There are three tasks to be performed:
   The rapidly changing frontend Doppler frequency can be estimated, tracked, and compensated.
   Second task is to track a drift of the frequency of the local oscillator over time, which is commonly a rather slow process.
   The backend Doppler frequency can be estimated and compensated.

Initial Estimation of the Local Oscillators' Frequency Offset

The main part of the carrier frequency offset problem is related to the frequency offset $\Delta f_{lo}$ of the local oscillator at 60G which is relative between the communication devices, e.g. between SUDACs and/or user equipments. In the following, different strategies are discussed as potential remedies:

1. SUDAS self-synchronization via 60G rendezvous channels. The SUDACs may detect each other by their transmitted beacon signals in the rendezvous channels by scanning over the frequency range. Once found each other, the SUDACs can negotiate a common clock reference via beacon signal communication. The user equipment will then synchronize itself to the beacon signals transmitted from the SUDACs or takes part in the negotiation process.

In order to prevent the so-called hidden node problem, where some SUDACs cannot be detected due to strong signal attenuation or even blockage, a user equipment, if it is present, could have connection to the missing SUDACs and could forward the negotiation commands. UEs might even see one SUDAC from this cluster and one from another cluster, which would allow synchronizing these clusters. This prevents SUDACs from missing the clock negotiation. This scheme can work fine and autonomously, when it is assured that all SUDACs can detect each other, e.g. by location planning of the devices within a car. Additionally, this embodiment does not need a s6G communication, where, if in a mobile environment $f_{B1}\neq f_{B2}\neq f_{B3}$ holds also for the base station reference signals, an s6G communication may lead to further issues.

2. SUDAS self-synchronization via third party communication network, e.g. Power Line Communication in case all SUDACs are mounted on wall outlets. The UE will then synchronize itself to the beacon signals transmitted from the SUDACs. This scheme can work autonomously like method 1, but omits the hidden node problem, because all SUDACs are connected to the third party communication network to attend the negotiation of a common clock reference. Therefore, a communication device/component may be applied in each SUDAC.

3. SUDAS alignment to external/separate reference clock device. The SUDACs are connected to an external reference clock device. One could even think of a device using resonance frequency of e.g. oxygen. These spectral lines are very sharp, which can be exploited for the synchronization of the local oscillator. The user equipment will then synchronize itself to the beacon signals transmitted from the SUDACs.

This strategy refers to a common reference without any extra control mechanism or negotiation effort, which may be practical for lab experiments and small SUDAS like in a car, where e. g. a radio frequency (RF) modulation of the DC (direct current) power supply could be used. This reduces the effort to install or establish separate wires or radio links to distribute the clock signal since existing wires can be reused. A common reference may be applicable by using a device exploiting resonance frequencies/spectral lines of surrounding material e.g. a gas like oxygen.

4. SUDAS alignment to a user equipment as a reference.
   a) Since the UE can scan anyway for new SUDACs in its transmission range via the beacon signal detection as well as to track the quality of the actual connections, the UE can control the SUDACs clock offset in relation to its own local clock.

If SUDACs own several relay paths, each path may have its own clock generation/alignment because each path may be related to a different UE. If all user equipments are properly synchronized to their base station and the base stations are synchronized, then the difficulty of aligning to different clocks may not arise. The user equipment can spend also some effort in controlling all SUDACs as well as provide fast updates in case a SUDAC joins. Therefore, only SUDACs in the range of the UE can be active and do synchronization.

b) An automated clock frequency synchronization scheme could be performed at the SUDAC based on "wake-up beacon signals" sent by the UE in rendezvous channels. I.e. the SUDACs synchronize themselves to the UE beacon signals. This may be a multi-step process: initial sync to wake-up signal followed by a hand-shake, where offset is further reduced and finally using the user equipments beacon to remain synced. The SUDAC can scan actively for "wake-up beacon signals" and performs processing to adapt/control its local clock. The scan can be done anyway, additionally the acquisition algorithm may be able to detect wake-up signals at very high frequency offset and then to estimate this offset. Again, if SUDACs own several relay paths, each path may have its own clock generation/alignment because each path may be related to a different UE. Therefore, the user equipment may not manage and control all the clock offsets of the different SUDACs. Moreover, no extra control signals need to be transmitted.

5. SUDAS aligned to a base station as reference. The base station transmits reference signals in the s6G domain (like the common control channel in non-MIMO (Multiple Input Multiple Output) mode as well as pilot data embedded in the payload signal) to enable synchronization of the user equipment. A capable SUDAC could also receive these signals and exploit it for synchronization. As an alternative, special reference signals can be transmitted from the base station dedicated to SUDACs or other devices to sync on.

Therefore, SUDACs may be able to process s6G signals to receive the clock reference. In this embodiment, all 60G devices (incl. user equipments) have the same reference. Since the BS signal is present, the SUDACs can update their offset compensation in a specific cycle. Thus, it is synchronized at any time and can directly start relaying, when activated by UE. This may be of special interest in a (quasi) stationary/fixed environment of BS and SUDACs.

6. Combined approaches:
   Switching between approaches: E.g., if an external clock source is connected to a SUDAC, it switches to method 3. Otherwise, it will use method 5.

Simultaneous use of approaches: E.g., method 5 is used as baseline for coarse synchronization, because there is the uncertainty of a non-zero backend Doppler shift $f_B$. Fine carrier frequency synchronization is performed by method 4.b).

Furthermore, the steps for carrier frequency synchronization according to an embodiment will be listed.

1. Scan over frequency, where commonly power detection (of the beacon signals) is applied. This results in a coarse carrier frequency synchronization. Thereafter, all found beacon signal frequencies may be collected.

2. Fine carrier frequency synchronization and Control

Additionally or alternatively, a method for calculation an estimate of the frequency offset from reference data or blindly by power detection or exploiting signal correlation properties may be applied.

Frontend Carrier Frequency Offset

Figure 18:
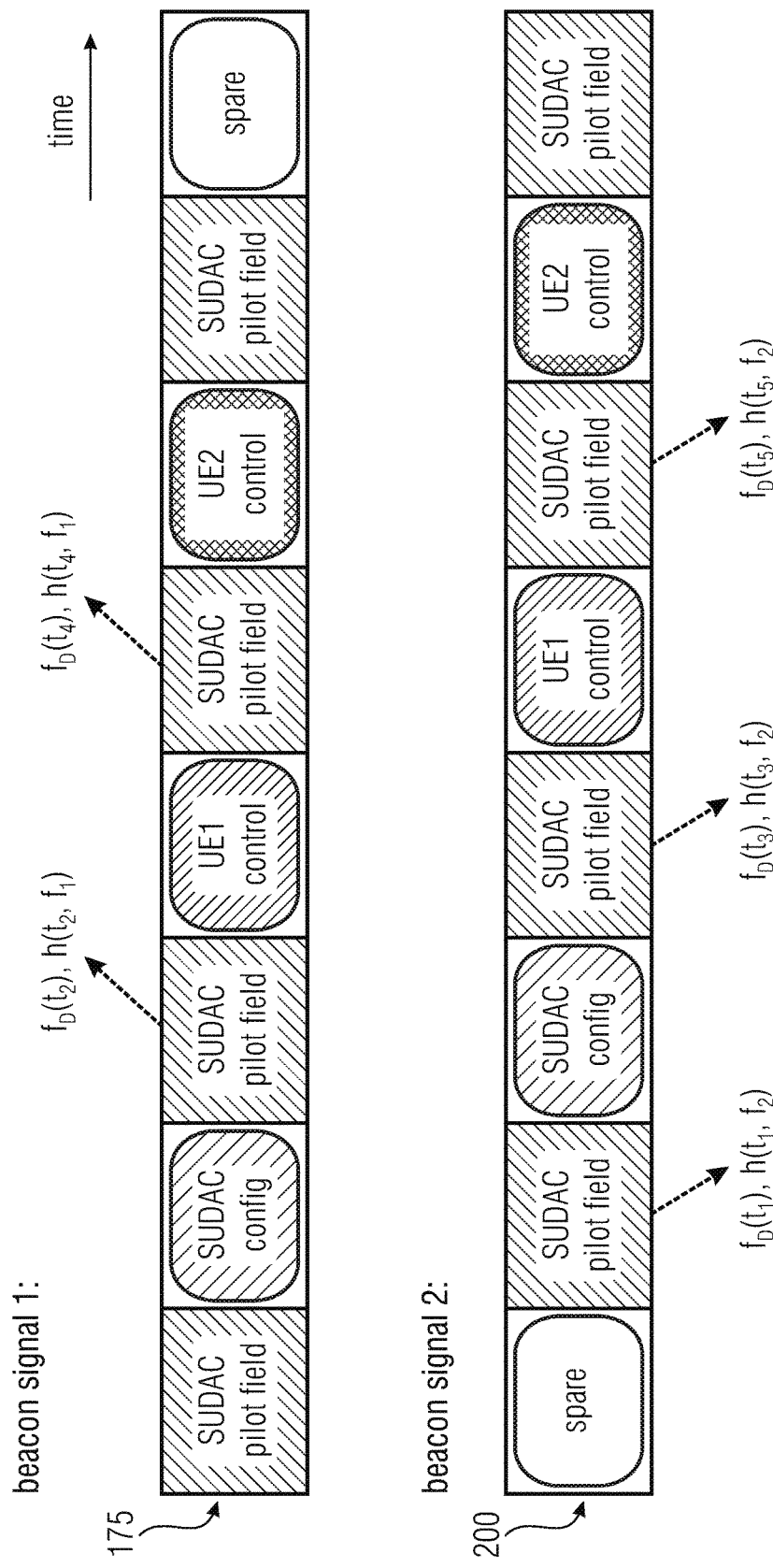
FIG. 18 shows an image comparable to the image of FIG. 16, where additionally, estimates of a frontend Doppler shift $f_D(t_1)-f_D(t_5)$ and complex channel coefficients h deduced from two exemplary beacon signals from one SUDAC are shown.

FIG. 18 shows the image of FIG. 16, where additionally, estimates of a frontend Doppler shift $f_D(t_1)-f_D(t_5)$ and complex channel coefficients h deduced from two exemplary beacon signals 175, 200 from one SUDAC are shown.

The frontend carrier frequency offset (CFO) may be estimated per each pilot field (or subblocks of pilot fields), maybe interpolated between the pilot fields (or subblocks) and immediately compensated due to the fast variation over time. Although FIG. 18 represents only one signal block, this may be done for each signal block individually due to different (Doppler) offsets.

Algorithms for this estimation plus potential averaging over estimates from different beacon signals are applied and the remaining phase variations (due to a certain estimation variance) over time and frequency will be tackled by the channel estimation. This is visualized in FIG. 18, where the estimated frontend Doppler frequencies $f_D$ are shown at different time instants as well as (single coefficient) channel estimates h at different time and frequency instants.

Since the frontend CFO is the same for all beacon signals from the same source, especially a time-staggered pilot field structure enables a very smooth interpolation and compensation of the actual frontend CFO.

Backend Carrier Frequency Offset

After compensation of the frontend CFO, the backend CFO due to Doppler shift $f_B$ may be compensated. According to an embodiment, compensation of this offsets shall not be done by the SUDAC (especially in case of an analogue amplify & forward type due to feasibility issues of the estimation) but rather by the UE, which has already such functionality implemented.

Issues of Carrier Frequency Offset Estimation

New ways for initial acquisition are shown in the previous sections.

Two step approach of estimation and compensation is helpful for tracking: First, the frontend CFO is estimated based on the beacon signal pilot fields and compensated for the beacon signal and the relayed payload signal. Second, the backend CFO is estimated and compensated based on the reference data of the payload signal.

The user equipment can transmit beacon signals within the uplink signal block, which can be used at SUDACs for frequency offset compensation. In one embodiment, special beacon signals drive a fast phase locked loop (PLL) adjustment to control the mixer for down conversion from 60G to s6G. More specifically, one of the beacon signals of a multi-beacon signal block could be a continuous wave signal, which can be forwarded inside the SUDAC directly as analog input to a VCO to accomplish inverse frequency modulation for fast frequency offset compensation. This approach may compensate phase/frequency variant signals. In case of the SUDAS type compress-and-forward, this phase compensation can be accomplished in the digital domain of the SUDAC.

Channel Estimation for the Downlink Part: Base Station—SUDAS—User Equipment

The channel estimation is beneficial to equalize the beacon signals and the relayed payload signals.

Channel Estimation on UE-Side

After conventional processing steps of the UE like bandpass filtering, down conversion, low-pass filtering, and synchronization, the channel estimation is performed. The signals from different SUDACs can be considered separately, since different transmission channels apply per each link. The channel estimation method and accuracy depends on the provided beacon signals of the SUDACs as follows:

Single-beacon signal blocks: Channel estimation can be done only at the single-beacon frequency. Since there is no information/estimation about the variability of the channel over the relayed band, a single complex value (or impulse response) is assumed for compensation to be constant over the whole frequency band. This is of low complexity, because only one beacon transceiver at 60G is applied per relayed signal.

Double-beacon signal blocks: Channel estimation can be done by interpolation over the relayed bandwidth, where the complex channel estimates from the lower and the upper beacon signal are exploited. Thus, a moderate channel variability over frequency can be estimated and compensated by equalization. Thus, better estimation accuracy can be achieved than in case of single-beacon signal blocks. This scheme is from medium complexity, because two synchronized beacon receivers (or reception paths) at 60G are applied per relayed signal for the uplink and a corresponding amount of transmitters for the downlink, both potentially running in parallel. Therefore, time-variant change of the channel over frequency is respected, where little degradation is still expected to result from the fact that only linear interpolation over frequency might not cover the real channel behavior.

Multi-beacon signal blocks (with same, different, or adaptive signal structure): Sophisticated interpolation between several complex values over frequency for compensation by e.g. adapting higher order polynomials. Also least squares (LS) solutions can be calculated for higher order polynomials, in case of more available channel estimates from the multi beacon signal blocks than may be used, e. g. in an over-determined system. This scheme is from medium-to-high complexity for a SUDAC and UE, because several synchronized 60G beacon transmitters/receivers are applied. According to a further embodiment, the scheme is from medium complexity, if spectral repetitions of the same beacon signal from the digital-to-analog-conversion can be used to generate at multi-beacon signal (identical signals at all beacon subcarriers) or if two multi-carrier beacon signals are transmitted by two transmit paths.

Superposition-beacon signal blocks:

Channel estimation using superposition-beacon signal blocks is from medium complexity when applying the methods describe in FIG. 15 related to approach b) or c), since this might lead to the same complexity level as in case of the multi-beacon signal blocks. The most accurate channel estimates can be achieved for two reasons: First, the interpolation distance over the relayed bandwidth reduces here to only a fraction of this bandwidth, which improves the channel estimation accuracy w.r.t. to the other methods above. And second, the beacon signals are not disturbed by the payload signal, which would act as interference.

According to the embodiment related to approach a) described with respect to FIG. 15, channel estimation may have a higher calculation effort for the interference cancellation.

Furthermore, the shifted pilot structure of the beacon signals shown in FIG. 16 and FIG. 17 has the advantage that a more enhanced two-dimensional interpolation scheme (i. e. a simultaneous estimation in time and frequency) would gain over a two-times one-dimensional interpolation scheme (i. e. a separate estimation in time and frequency). If e.g. beacon signal 1 and 2 would be identically aligned in time, a two-dimensional interpolation scheme can perform only as good as the two-times one-dimensional interpolation scheme, which is known from channel estimation in OFDM systems.

Besides other synchronization and procession steps, the UE can do two steps for channel estimation and equalization according to an embodiment:

1. Channel estimation and compensation based on the beacon signals for two reasons:

Demodulation of the configuration data fields of the beacon signal(s) of the target signal block(s).

Estimation of the fast time-varying complex channel coefficients, which are valid at the beacon signals' frequencies in 60G domain.

First, channel estimation is done at each received pilot field, where the applied method depends on the selected waveform for the beacon signal, on the target channel impulse response length and accuracy level.

Second, interpolation of channel estimates in time direction over beacon data fields and in frequency direction over the relayed bandwidth is done. Channel estimates at the beacon data fields are applied to equalize and demodulate the carried configuration and control data successfully. Channel estimates from interpolation over time and frequency can be used to equalize the payload signal of the relayed bandwidth. For this purpose, the interpolation may adapt the channel estimates to a sampling rate which is directly related to the relayed payload signal. In more general, the interpolation adapts/relates the channel estimates from the beacon signal pilot fields to the (different) t-f-c-s resource grid of the relayed payload signal.

This modular approach is applied in parallel to all relay channels, i.e., multiple estimation, interpolation and compensation/equalization instances.

Figure 19:
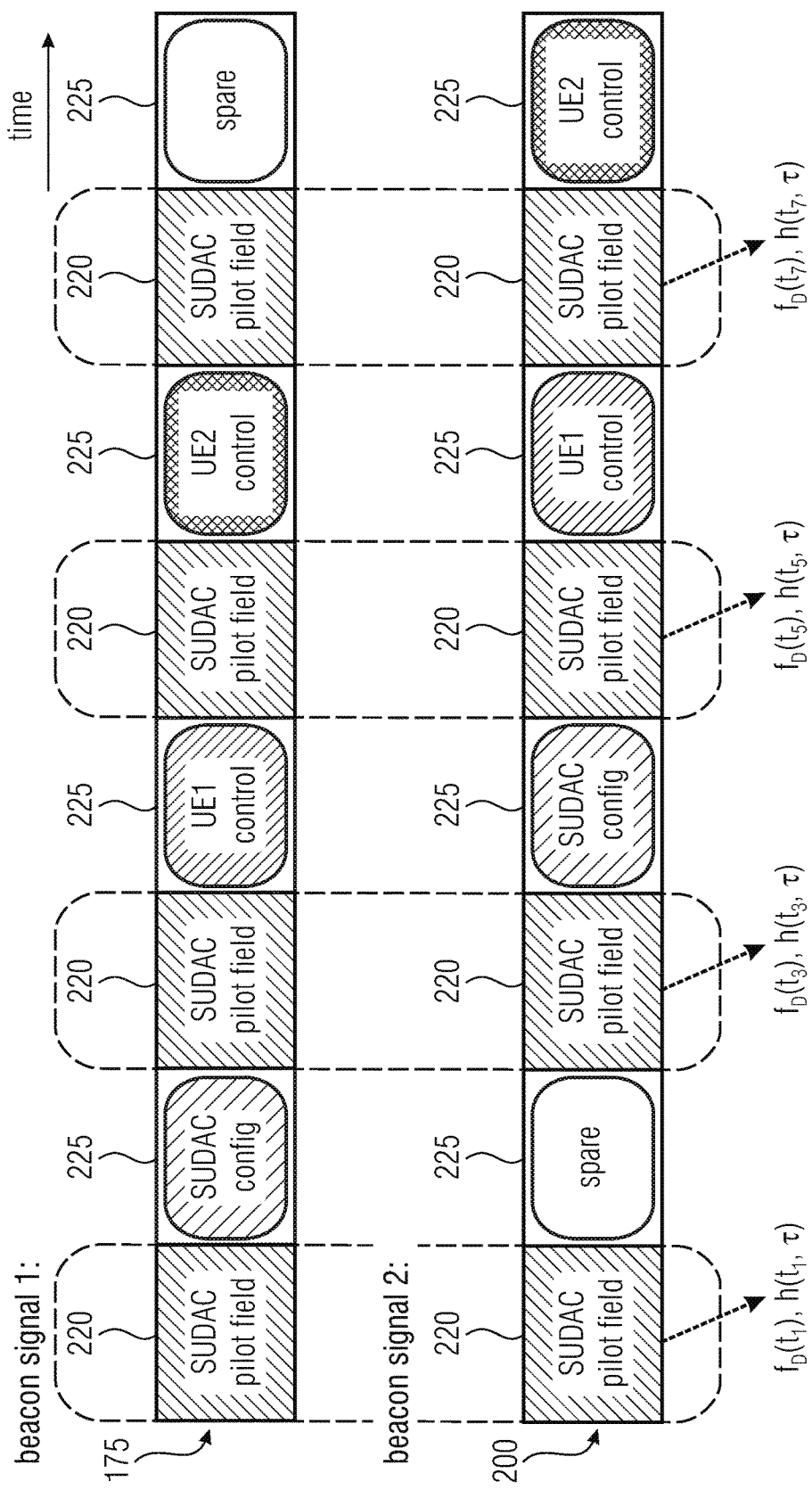
FIG. 19 shows an exemplary joint processing of pilot fields from two beacon signals, where the pilot field structure is aligned in beacon signal 1 and 2.

FIG. 19 shows an exemplary joint processing of pilot fields from two beacon signals, where the pilot field structure is aligned in beacon signal 1 and 2. Herein, a joint processing of pilot fields for channel estimation (and CFO estimation) can alternatively be performed when interpreting the beacon signals (e. g. at different frequencies) as a single signal with uneven power distribution over frequency. In this embodiment, it is possible to enhance the time resolution of the estimated channel impulse response, i.e. w.r.t. the resolution of the channel path delays, compared to the standard case of a symbol-rate related resolution of the channel estimate from a per-beacon channel estimation. Nevertheless, an interpolation in time direction might still be applied. It is more practical for this approach to have a non-staggered but aligned pilot field structure. Especially, this includes a constantly synchronous transmission of pilot fields, where one beacon signal is shifted by halve of a symbol duration (=T/2). This joint processing of beacon signal pilot fields 220 from different beacon signals 175, 200 improves channel estimation and CFO estimation. If the configuration & control data within the beacon signal data fields are also aligned, a joint detection of the configuration & control data fields 225 will improve the robustness and/or the accuracy.

If a SUDAC with more than one downlink relay path transmits its payload data to the UE, the signal blocks should be located in frequency as close as possible. This is because a more enhanced channel estimation scheme can consider these set of beacon signals (from different signal blocks but the same SUDAC and therefore very similar channels) as a multi-beacon scheme and enhance the channel estimation accuracy further opposed to per signal block processing.

Figure 27:
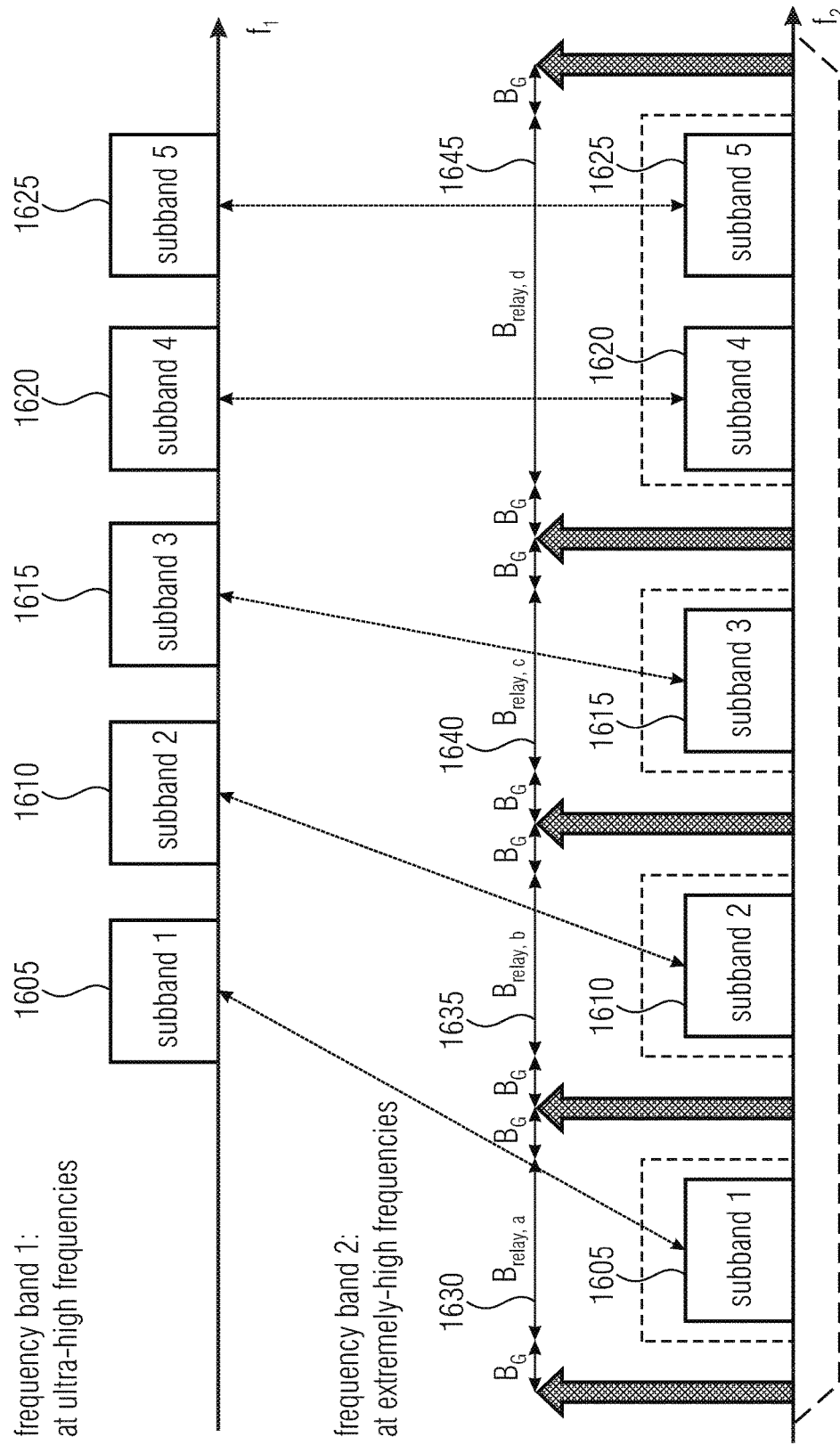
FIG. 27 shows schematic frequency spectra of processing five backend signal subbands being embedded in five frontend data portions in the frontend.

In the special case of the superposition pilots with subband shifting as visualized in FIG. 27, the UE can do wideband processing using all beacon signals for joint processing. As an alternative, the UE can do separate parallel processing per each relay bandwidth by exploiting the neighboring beacons.

2. Channel estimation and compensation based on the relayed signal pilot fields are applied after compensation of the fast varying channel in stage 1 as well as further synchronization steps on the payload signal, e.g. estimation and compensation of the backend channel Doppler shift $f_B$. Since the relayed payload signals include enough pilots to equalize the backend channel experienced in the mobile radio system, common approaches can be applied, which are system specific but normally already established (e.g. for GSM, UMTS, LTE, etc. . . . ).

In the following, two embodiments are considered concerning the first channel estimation and equalization step for the above introduced example of a single carrier beacon signal with linear modulation.

Embodiments Using One Complex Channel Coefficient Per Pilot Field

For the above introduced example of a single carrier beacon signal with linear modulation, a correlation with the original pilot sequence would yield a single complex channel estimate at the correlation maximum. This represents an accurate estimate if the channel shows negligible delay spread.

After evaluation of the pilot fields (i. e. channel estimates valid for specific t-f-c-s resource elements), the interpolation task can be performed. There is a large variety of methods. Some examples are:

Linear interpolation methods over the t-f-c-s resource grid. The most trivial method from this class is to apply a constant channel estimate over the t-f-c-s resource grid. Also of low complexity is to apply averaging or adaptation of linear filters.

In case of multiple beacon signals, a least squares (LS) approach can be used to adapt higher order polynomial coefficients for interpolation, which is of value in an over-determined system with more incorporated estimates than polynomial coefficients.

There are channel tracking methods for continuously adapting/updating parameters of an assumed channel model with the most recent channel estimates. From the model then the interpolation or even forecasting/prediction results can be deduced. The accuracy strongly depends on the model-mismatch w.r.t. reality.

After the interpolation task, one possible representation of the channel estimate is a frequency domain channel transfer function. It can be used for frequency domain equalization, whose coefficients are derived from the channel transfer function.

Embodiment for Channel Impulse Response with Non-Negligible Delay Spread

If the true channel exhibits non-negligible delay spread, its channel impulse response is composed of the line-of-sight (LOS) signal and several delay taps. The estimation can e.g. be accomplished by the maximum likelihood estimator, which applies a vector-matrix multiplication per pilot field.

Having a channel impulse response estimate per pilot field, the interpolation over the t-f-c-s resource grid can be applied. In general, the methods of embodiment 1 can be used on each individual complex value of the channel impulse response.

After that, one can again use the above mentioned method of calculating an overall channel transfer function and use it for equalization in frequency domain. Alternatively, one can partition the band into sub-bands and assume flat fading in each sub-band. Then, sub-band individual equalization can be performed based on the interpolation results assumed to be constant per sub-band.

A different method may be related to splitting the equalization into a phase compensation part (see embodiment 1, one complex coefficient varying fast over time and little modification over frequency) and multipath compensation part (channel impulse response varying also fast over time, but one channel impulse response is valid for the whole relayed frequency band).

The above mentioned channel estimation and equalization techniques can also be extended to iterative approaches according to the turbo equalization principle. Then the above mentioned methods represent the initial step to start a turbo equalization algorithm.

Since this is a core idea of the described embodiments, the two step channel estimation and equalization approach, first to compensate for the 60G channel effects, where beacon signals are exploited, and second to compensate for the s6G channel effects by means of the payload signal capabilities/structure is pointed out again. Furthermore, channel estimate interpolation over the relayed bandwidth (or parts of it in case of superposition pilots) is advantageous according to some embodiments. Further embodiments describe the joint processing of pilot fields and data fields.

Channel Estimation on SUDAC-Side

The communication of the SUDACs may be related only to the beacon signals (rather small bandwidth compared to relayed signal), where configuration and control data is sent by the UEs to the SUDAC (and vice versa) as has been shown in the previous sections, i.e., a return control channel is received (or transmitted). Therefore, the SUDAC may be able to receive and equalize the beacon signal correctly. In this embodiment, the SUDAC does no channel estimation over the relay bandwidth like the UE.

Although the downlink beacon signals are considered in this section, return control channel can also be received by the SUDAC from the beacon signals accompanying the uplink relay signals.

For the channel estimation for beacon signal detection, it may be sufficient to assume negligible delay spread, i.e. only one complex factor, which can vary potentially fast over time. So the pilot fields may be dense enough to interpolate over the data fields of the beacon signal. Depending on the system concept defining which device transmits the pilot fields associated with the target beacon signal data fields, the following two different approaches according to embodiments result:

1. UE transmits pilot fields
    In consequence, the SUDAC may do channel estimation based on the received pilot fields and performs interpolation over time due to the presence of the beacon data fields. With this channel estimation result, the channel distortion can be compensated by equalization. This refers to the same scheme discussed above for the UE. This embodiment may have some processing effort at SUDAC side.
2. SUDAC transmits pilot fields
    As shown in the embodiment shown in e.g. FIG. 16, the SUDAC transmits pilot fields. Based on these pilot fields, the user equipment does the channel estimation, which may be done anyway due to the applied equalization of the relayed payload data. Thus, the user equipment can use its estimation results to do pre-compensation/equalization of its control and payload signals. So, the SUDAC may do without channel estimation and equalization. Nevertheless, the beacon signal data fields may have also some small pilot fields to assure correct demodulation of important control data by the SUDAC. In conclusion, the UE does most of the equalization work based on the pilot fields transmitted by the SUDAC. And the SUDAC has relatively little effort to use the small pilot fields, which are inherent to the beacon signal data fields.
    This collaborative approach of channel estimation and pre-compensation at UE-side for most of the equalization work and exploitation of the "beacon signal data field pilots" by the SUDAC for fine-equalization is advantageous. According to this embodiment, existing hardware resources may be used, e. g. in the user equipment, and the implementation of further hardware resources can be minimized.

Channel Estimation for Uplink Part: User Equipment—SUDAS—Base Station

According to embodiments, the base station is not able to estimate and correct the fast phase variations of the 60G domain (due to propagation channel effects like Doppler shift). Furthermore, all the transmit signals from all the SUDACs to the base station would superimpose in the same s6G band. If beacon signals were also be transmitted to the base station, they would also super-impose like the payload uplink signal and might not be suited for the s6G transmission (not communication standard conform or even interfering with other s6G uplink signals of other UEs).

Figure 20:
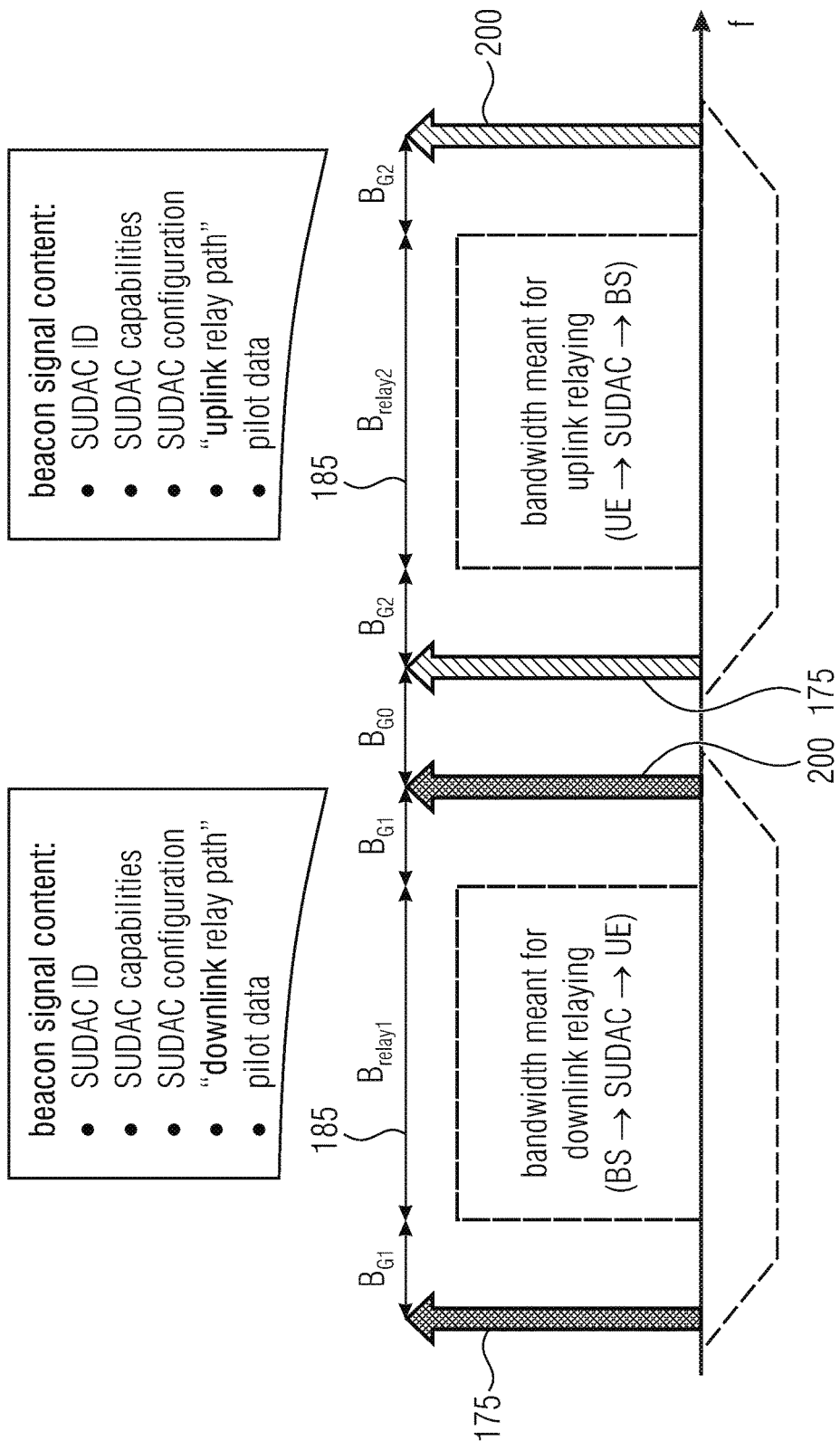
FIG. 20 shows exemplary beacon signals of one SUDAC serving one downlink relay path and one uplink relay path in frequency division duplex (FDD) mode.

Potential remedies:
    Pre-Compensation at the user equipment since signal-processing may be done there anyway. Two options for concept implementation are explained in the following:
        a. Fast feedback of phase estimates from SUDAC to user equipment. The SUDAC is able to estimate the actual complex channel coefficients from the beacon signal(s) sent by the user equipment. Fast feedback of these estimates by a beacon signal is beneficial to not have outdated channel estimates for pre-compensation.
        b. FIG. 20 shows exemplary beacon signals of one SUDAC serving one downlink relay path and one uplink relay path in frequency division duplex (FDD) mode w.r.t. relay payload data, which is related to the mobile network duplex mode. The user equipment transmits only the uplink signal to be relayed but no beacon signal pilot fields. The SUDAC transmits beacon signal pilot fields 220 within the beacon signals 175, 200 related to the used relayed bandwidth 185 by the user equipment as shown in FIG. 16 and FIG. 20. The user equipment exploits these beacon signal pilot fields 220 to estimate the complex channel coefficients and calculates the pre-compensation. If the uplink and downlink signal blocks are such close as in FIG. 20, a joint channel estimation, interpreting this as a multi-beacon signal can provide better estimation accuracy than separate uplink and downlink channel estimation. Thus, it is advantageous that there is no explicit feedback link applied as in a. and the probability of using outdated data only depends on the processing speed of the user equipment. An approximate channel reciprocity of uplink and downlink in 60G is assumed to be valid for this approach.
    Each SUDAC forwards the received pilots at 60G via a separate s6G-conform link to the base station, where more enhanced processing methods can be applied. Again, a two-stage channel estimation and equalization approach can be applied like in the previous sections thanks to the number of receive antennas at the base station. This embodiment may be given further resources in the s6G band as well as standardization such that all BS understand the SUDACs' s6G uplink.

In essence, all these compensation techniques may compensate the remaining phase and amplitude variations due to the frontend channel distortions after compensation for the actual frequency shifts of the 60G domain, e.g. including Doppler shifts $f_{D1}$, $f_{D2}$, and $f_{D3}$ in case of three SUDACs uplink relay paths.

Figure 21:
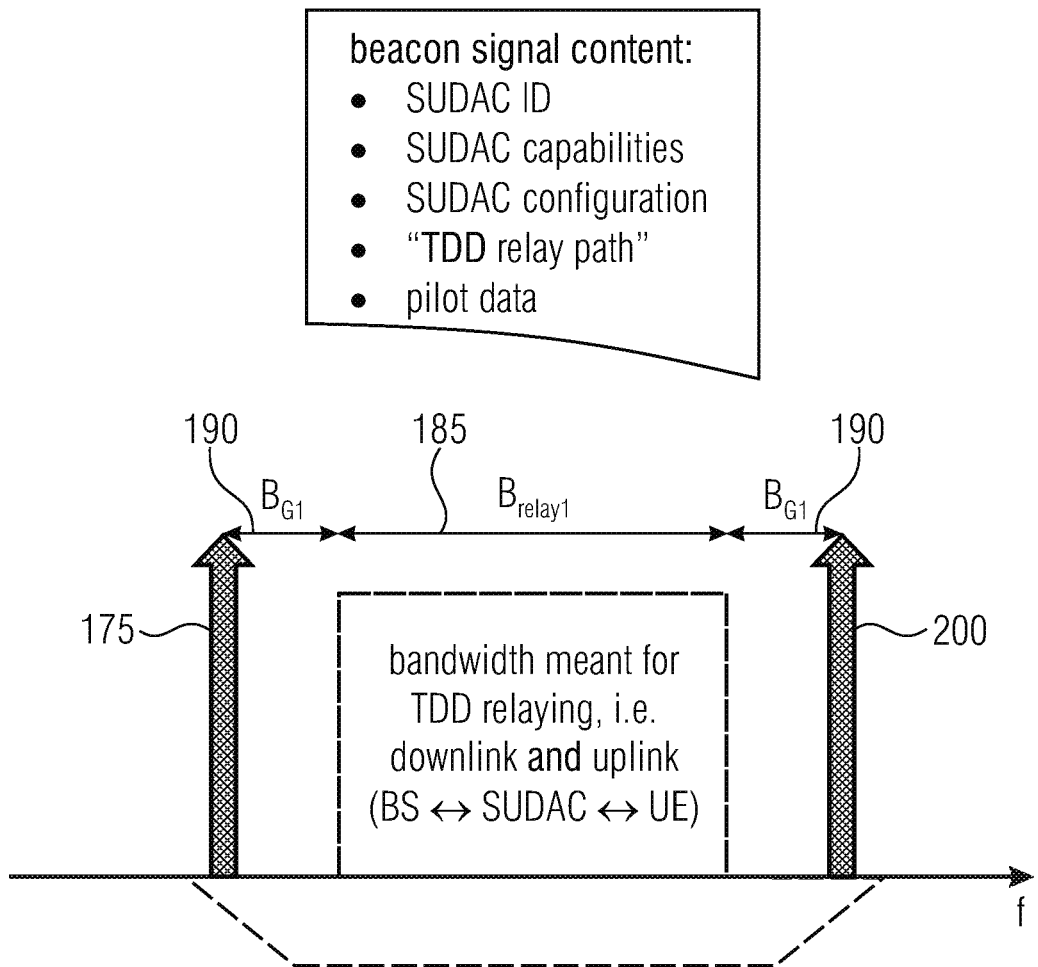
FIG. 21 shows beacon signals of one SUDAC serving one relay path for downlink and uplink in time division duplex (TDD) mode.

FIG. 21 shows beacon signals of one SUDAC serving one relay path for downlink and uplink in time division duplex (TDD) mode w.r.t. relay payload data, which is related to the mobile network duplex mode. The TDD mode shown in FIG. 21 represents the alternative mode to the FDD mode shown in FIG. 20. The embodiments of FIG. 20 and FIG. 21 may be advantageous embodiments, although the UE can transmit and pre-compensate the uplink signal for each SUDAC simultaneously. Nevertheless, this simplifies the time division duplex (TDD) transmission concept as shown in FIG. 21, because the user equipment can continuously estimate the 60G transmission channel and selects only between the usage of these estimates: pre-equalization for the uplink transmission or equalization for the downlink. Of course, the guard bandwidths $B_{G1}$ in TDD mode and $B_{G0}$, $B_{G1}$, and $B_{G2}$ in FDD mode can be carefully chosen to have sufficient isolation of transmit and receive signals.

Note that it is possible in an alternative embodiment to use the scheme of FIG. 20 for TDD. In this case, the SUDAC provides FDD communication at the frontend link, where the uplink relay signal and the downlink relay signal, meant for the TDD mobile communication network, are separated in frequency. Although this may use more bandwidth on the frontend but may have advantages for implementation: Switching of the transmission direction for TDD has to be accomplished in the SUDAC, but this can be done at the processing friendly frequencies instead of the extremely high frequencies for the approach of FIG. 21. Thus, a costly switching device for the extremely high frequencies can be omitted.

An advantageous embodiment may comprise the following processing steps:

Beacon signal pilot fields are transmitted by the SUDAC—irrespective of uplink or downlink relaying as described previously.

The UE performs continuous channel estimation based on the beacon signal pilot fields.

In case of a TDD mobile communication network, the usage of the estimation result can be switched between pre-compensation/-equalization in case of uplink transmission (payload signal for uplink relaying or beacon data fields) and equalization of the received downlink signals (relayed downlink payload signal or beacon data fields). This has been described w.r.t. FIG. 21.

In case of an FDD mobile communication network, enhanced channel estimation accuracy can be deduced at the UE in case of close uplink and downlink channels as described with respect to FIG. 20.

Furthermore, the above described alternative embodiment of using frontend communication according to FIG. 20 can also accomplish backend communication with a TDD mobile communication network.

Finally, this scheme has two advantages:

The SUDAC has a minimum of processing effort leading to reduced hardware requirements and to finally get a cheaper SUDAC device.

Energy-efficient concept, because the most power consuming elements are the transmit power amplifiers. Since the SUDAC is most likely connected to a general power supply, energy consumption for transmitting the beacon signals is not an issue. And the battery-driven user equipment uses its power amplifiers only for status/control data or for the uplink transmission.

Nevertheless, it is in general also possible to exchange the roles of SUDAC and user equipment in the above stated concept. I.e., the user equipment would permanently transmit beacon signal pilot fields and the SUDAC would do the carrier frequency offset (CFO) and channel estimation as well as the (pre-) compensation.

Joint Block Diagram of CFO Estimation and Channel Estimation

Since we have found that a two-step approach is advantageous for carrier frequency offset (CFO) estimation and for the channel estimation part, it is important to know that the following application order may be respected in case of receive signal processing:

1. During acquisition: Estimation and compensation of the coarse CFO mainly induced by the offset of the local oscillator (LO).

2. Frontend CFO estimation and compensation, which is re-used also for transmit signal processing (pre-compensation).

3. Frontend channel estimation and compensation, which is re-used also for transmit signal processing (pre-compensation).

4. Backend CFO estimation and compensation

5. Backend channel estimation and compensation

FIG. 22 shows a schematic block diagram of signal processing blocks at the user equipment to communicate with SUDACs. General processing modules e. g. for timing synchronization and band-pass filters as well as the down-/up-conversion (from/to extremely high frequencies to/from processing friendly frequencies) are omitted for the sake of simplicity. FIG. 22 gives an indication about the interactions of steps 2-5. In the upper part, there is the receive signal processing path and in the lower part the transmit signal processing part.

According to this embodiment, the receive signal processing part comprises an extractor 240a, e.g. a demultiplexer, which is configured to extract a beacon signal 242 from the received signal composed of beacon signals and relayed payload signal. A pilot based carrier frequency offset (CFO) estimator 17 calculates the CFO estimates $f_D(t_x)$ 247 by evaluating the pilot fields (i. e. the frontend evaluation signal) of the beacon signal 242. After a smooth interpolation in time, a numerical controlled oscillator (NCO) 255 generates a phase rotation signal $\exp(-j2\pi f_D(t))$ 257. The signal 257 is multiplied with the receive signal (i. e. the inbound signal) using a multiplicator 260 to compensate for the CFO. After CFO correction, the now CFO-corrected beacon signal 265 is again extracted by an extractor 240b. The frontend channel estimator 20 calculates channel coefficients h(t, f) 267 from the beacon signal 265. The channel coefficients h(t, f) are used by an frontend equalizer 21 to provide an equalized inbound signal 275 wherefrom the equalized beacon signal 280 and the equalized relayed payload signal 285 are extracted with an extractor 240c. The equalized relayed payload signal 285 is further processed by a backend CFO estimation & compensation 290 and a backend channel estimation & MIMO equalization 295. Note that 290 and 295 also receive other relayed backend signals from communication instances like FIG. 22 as well as directly received backend signals at the UE to have a joint/collaborative processing. A beacon signal processor 300 receives the equalized beacon signal 280 and may control the beacon signal data field generator 305 to create a beacon signal 307 (at least comprising control and configuration data) that transmit at the right t-f-c-s resource.

Furthermore, for the transmit signal processing part, a backend uplink signal generator 310 creates the uplink payload signal 315. This uplink payload signal 315 is multiplexed with the beacon signal 307. After a frontend precoding/pre-equalization with a frontend precoder 325 using the channel coefficients h(t, f) 267 for channel pre-compensation, the precoded signal is phase rotated for pre-compensating the assumed CFO by multiplication with the phase rotation signal $\exp(-j2\pi f_D(t))$ 257 using the multiplicator 260. The now pre-compensated outbound signal 60 may be send to the SUDAC.

Per each used SUDAC, such an instance shown in the block diagram can be implemented in the UE, where the shown components 290, 295, and 310 may coincide or can be connected for information exchange. This embodiment is shown in FIG. 23.

Thanks to the pre-compensation of the frontend CFO and the frontend channel, the SUDAC has only little signal processing effort, which makes the device cheaper.

Since the user equipment owns already significant processing power (due to multiple input, multiple output (MIMO) processing capabilities), the above stated signal processing is most likely be performed at the user equipment. Nevertheless, it would be straightforward to re-arrange the block diagram of FIG. 22, for the case of performing the signal processing at the SUDAC when the user equipment transmits permanently the beacon signal pilot fields.

FIG. 23 shows a schematic block diagram of signal processing blocks at the user equipment to communicate with three SUDACs. FIG. 23 is an extension of the in FIG. 22 described embodiment. FIG. 23 comprises three processing paths. Each of the processing paths may be able to communicate with a SUDAC. The signal processing according to the embodiment shown in FIG. 23 is similar to the w.r.t. FIG. 22 described signal processing. Additionally, a single or combined (joint) backend CFO estimation and compensation (290) and a combined or joint backend channel estimation and (MIMO) equalization (295) may be applied. Furthermore, according to FIG. 4, the user equipment may comprise an antenna for s6G communication in order to directly receive signals or data from the base station. Therefore, a simplified receiving path without frontend channel signal processing as shown in FIG. 4 may be added to the embodiment of FIG. 23.

Compression

FIG. 24a-e show schematic block diagrams of signal processing blocks for compressed signal processing at the user equipment 10 and the SUDAC 30. For the sake of simplicity, the UE-side encoder 67 and decoder 69 are shown in FIG. 3, but omitted in FIG. 24a-e. The decoder 69 refers to the UE-side decompression/decoding (for the downlink) directly controlled by the compression parameter processor 68. The encoder 67 refers to the UE-side compression/encoding (for the uplink) directly controlled by the compression parameter processor 68.

Figure 24A:
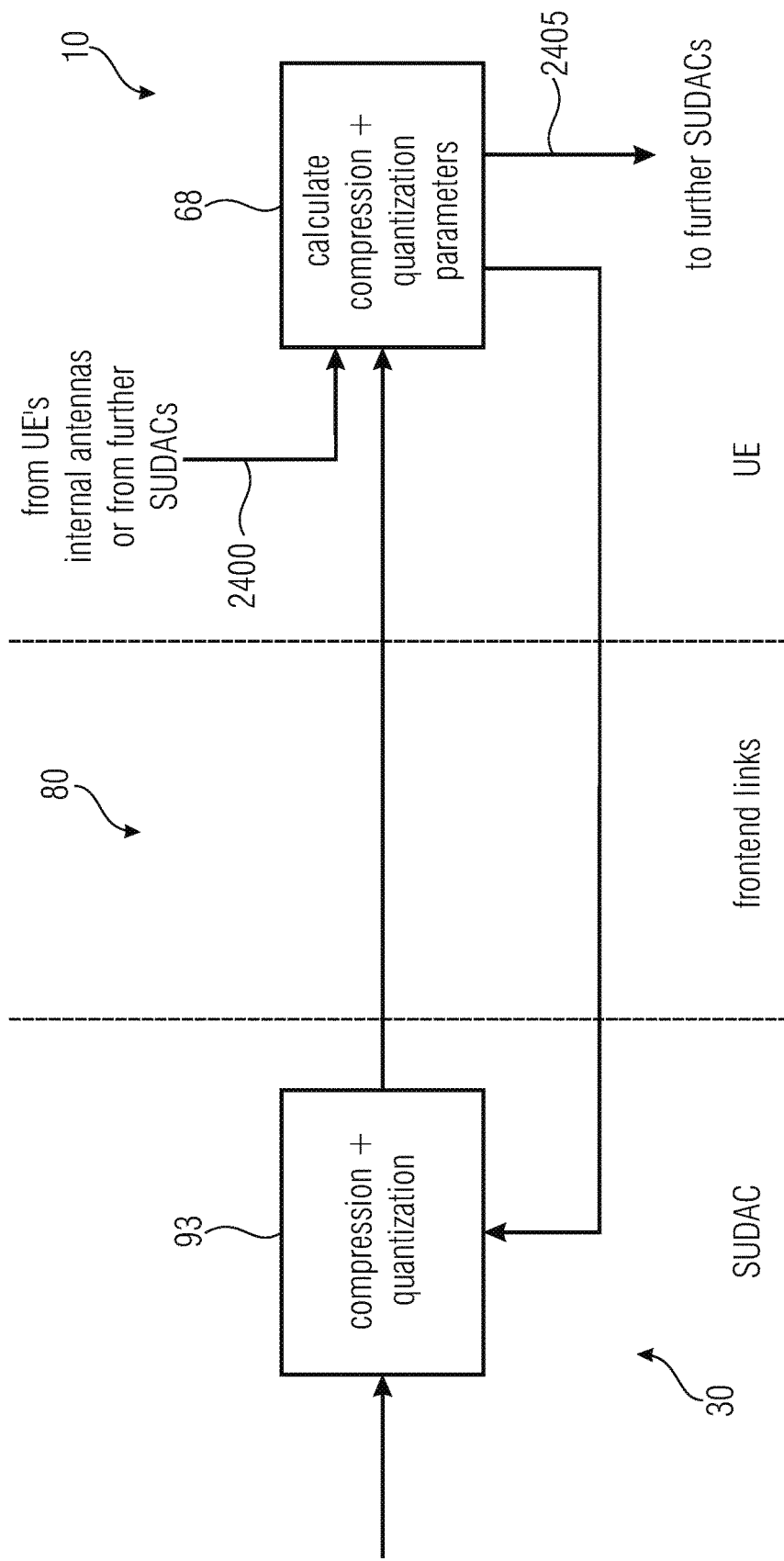
FIG. 24a shows a schematic block diagram of signal processing blocks for compressed signal processing at the user equipment and the SUDAC.

FIG. 24a shows an embodiment of the present invention. The SUDAC 30 compresses and quantizes the signal received from the backend link in an ultra-high frequency band using the encoder 93 and forwards the compressed and quantized signal over the frontend link in an extremely-high frequency band towards the UE 10, such that the number of symbols forwarded over the frontend link is reduced with respect to the case without compression and quantization. All or part of the parameters that the SUDAC 30 uses for this compression and quantization process are calculated in the UE 10 based on the frontend signal received from this SUDAC and/or based on further backend signals received in an ultra-high frequency band by the UE's internal antennas or from further frontend signals received in an extremely-high frequency band from further SUDACs. Therefore, the user equipment 10 comprises the signal processor 68, which may receive information via a path 2400 from the UE's internal antennas or from further SUDACs 30 and which may transmit information via a path 2405 to further SUDACs 30. The SUDAC-side compression/encoding (for the downlink) 93 may be remotely controlled by the compression parameter processor 68.

The UE can thereby optimize the compression and quantization in the SUDAC such that the UE's overall end-to-end performance is optimized taking into account the channel characteristics of all transmission paths in the MIMO transmission.

In one embodiment, the compression and quantization taking place in the SUDAC comprises a vector quantization device, and the UE provides the parameters used for the vector quantization like the used lattice parameters and number of quantization levels.

In another embodiment of the present invention, the compression and quantization is based on a codebook, where the projection of the backend signal received in the SUDAC on to the different codebook elements is calculated, the best fitting codebook entry is selected and its representative transmitted to the UE and furthermore the residual difference signal between received signal and selected codebook element is compressed and quantized.

FIG. 24b shows a further embodiment where compression and quantization functions are split into two devices 93a, 93b in the SUDAC 30, and each receives all or part of its parameters from the UE 10 based on similar parameter calculations in the signal processor 68.

Figure 24C:
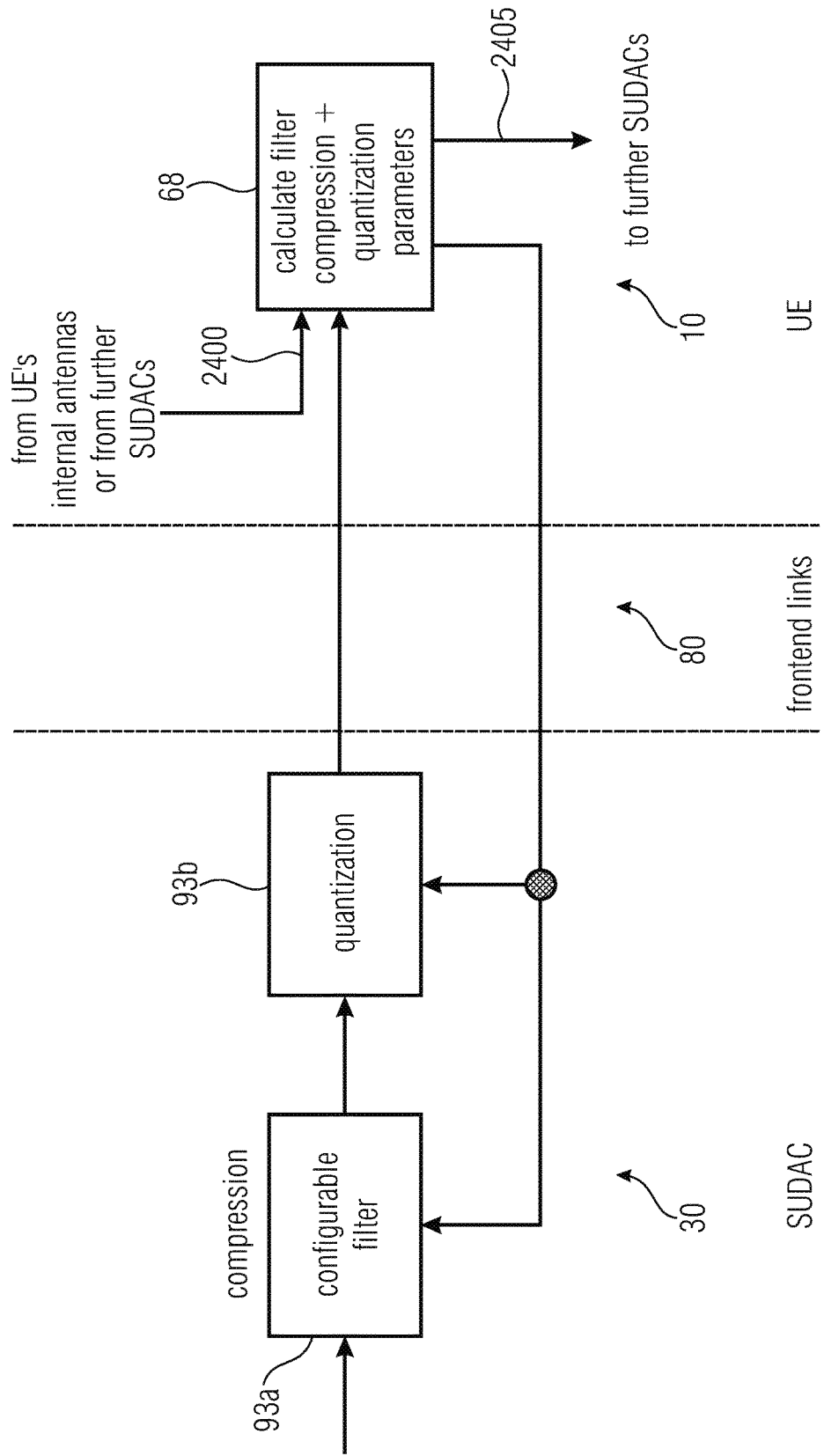
FIG. 24c shows a schematic block diagram of signal processing blocks for compressed signal processing at the user equipment and the SUDAC.

FIG. 24c shows another embodiment. The compression device contains a (configurable) filter 93a that can for instance implement linear filtering according to a minimum-mean-squared-error (MMSE) criterion. Part or all of the filter coefficient calculation based on this MMSE criterion is implemented in the UE 10 using the signal processor 68. The MMSE criterion can for instance be to filter the backend signal in such a way that the signals from one or multiple base station antennas are output with a maximum signal-to-noise-plus-interference ratio (SNIR) after the filter and before the compression, where the signals from the other base station antennas may be considered as interference for this calculation.

Figure 24D:
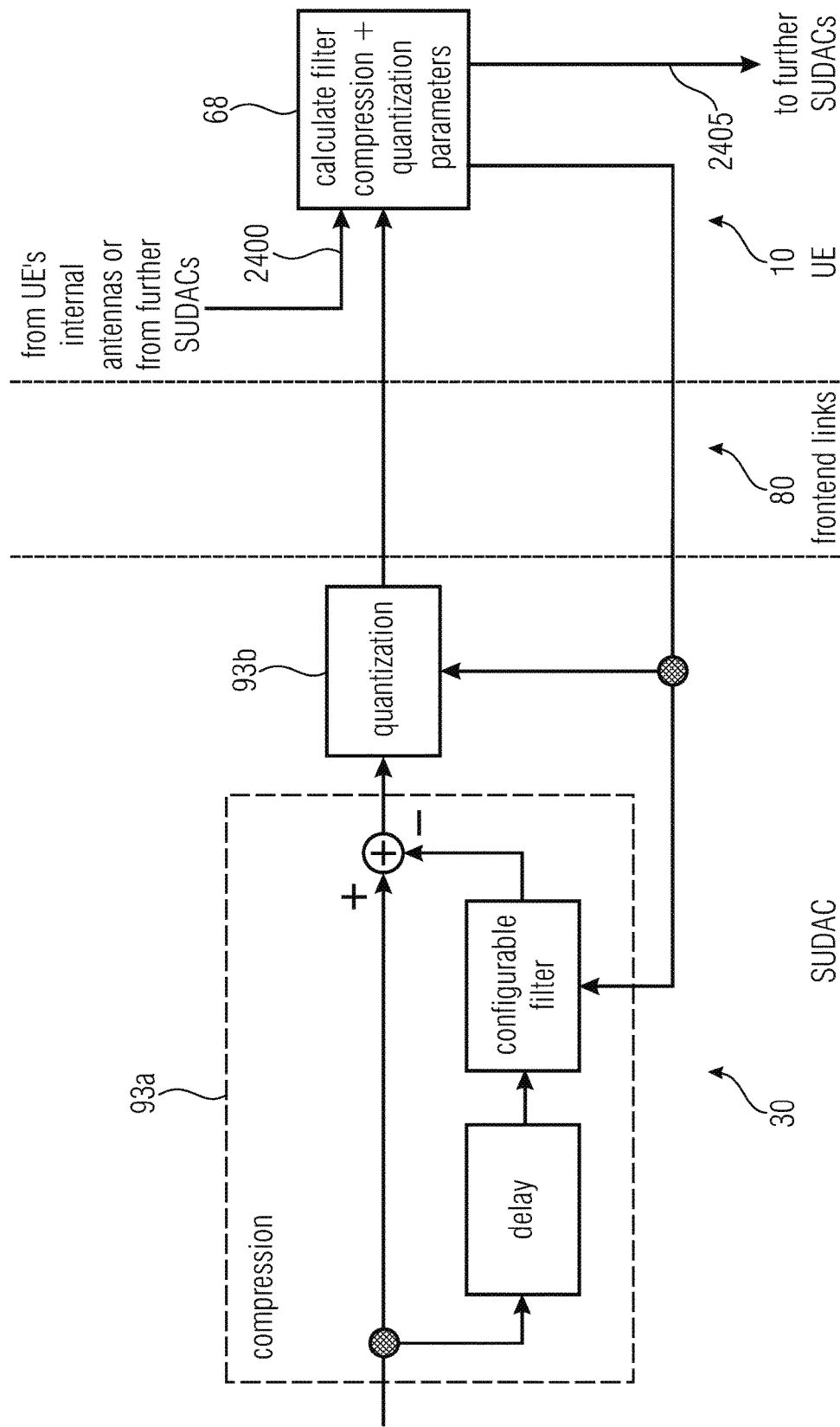
FIG. 24d shows a schematic block diagram of signal processing blocks for compressed signal processing at the user equipment and the SUDAC.

FIG. 24d shows yet another embodiment where the filter of the compression device 93a may implement signal prediction for whitening the received backend signal, where the compression comprises a prediction filter and optionally a delay element for predicting the next sample of the received backend signal, in which the filter coefficients are calculated by the UE.

Figure 24E:
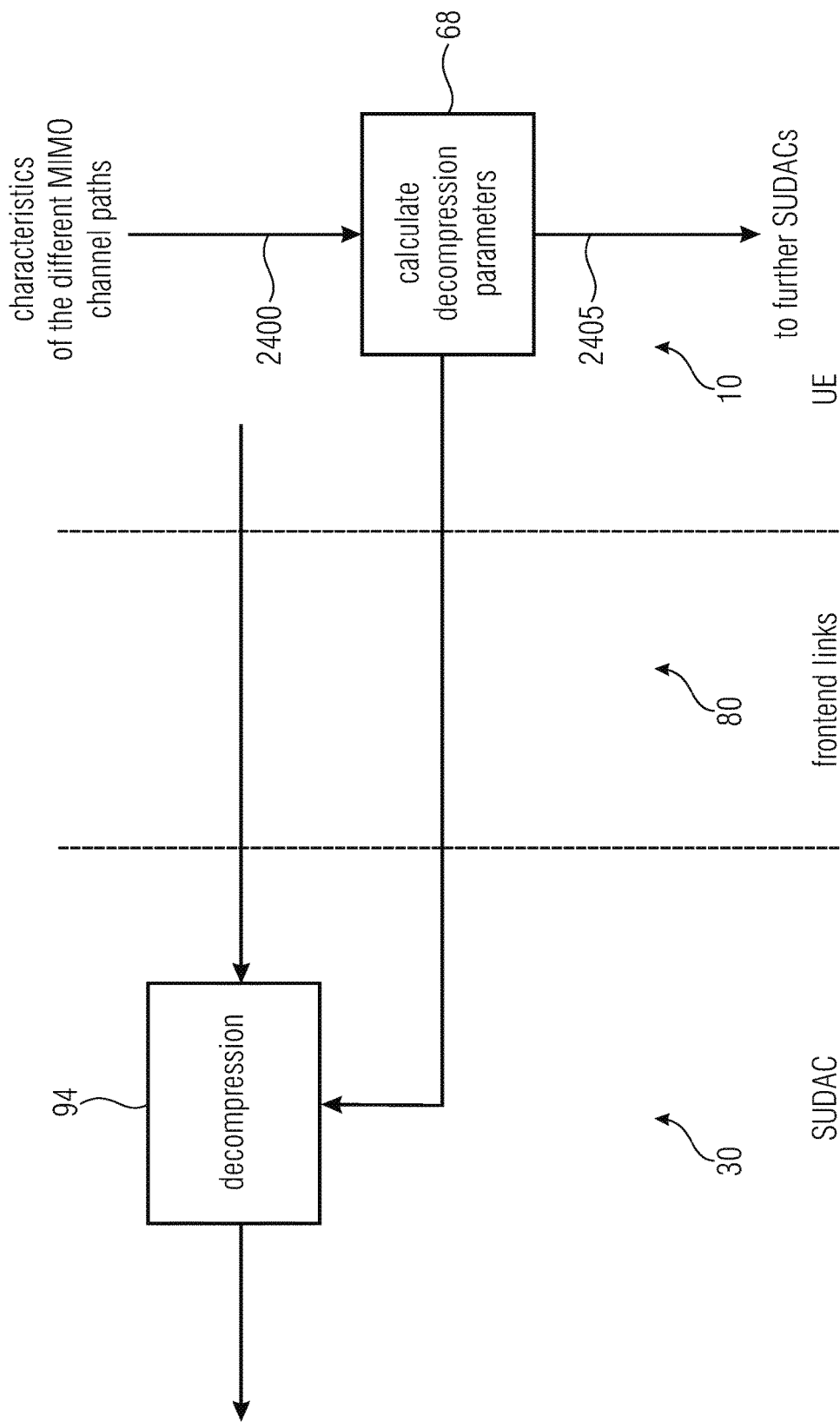
FIG. 24e shows a schematic block diagram of signal processing blocks for compressed signal processing at the user equipment and the SUDAC.

FIG. 24e shows a further embodiment where the SUDAC 30 carries out decompression (in the decoder 94) of signals that were compressed by the UE 10 and that are received over the frontend link in extremely-high frequency bands from the UE 10, where the parameters that may be used for the decompression are calculated by the UE 10 and forwarded to the SUDAC 30 over a frontend link. The type of compression that needs to be decompressed can be any of the types described above for the opposite case where compression occurs in the SUDAC. The calculation of the (de-) compression parameters are again based on the characteristics of the different MIMO channel paths in the ultra-high frequency band that terminate at the base station antennas on the one hand and at the internal antennas of the UE or at the backend antennas of the SUDACs on the other hand. The (de-) compression parameters may be again calculated in the signal processor 68. In other words, the SUDAC-side decompression/decoding (for the uplink) 94 may be remotely controlled by the compression parameter processor 68.

Relayed Bandwidth Adaptation for Downlink Bandwidth

Figure 25:
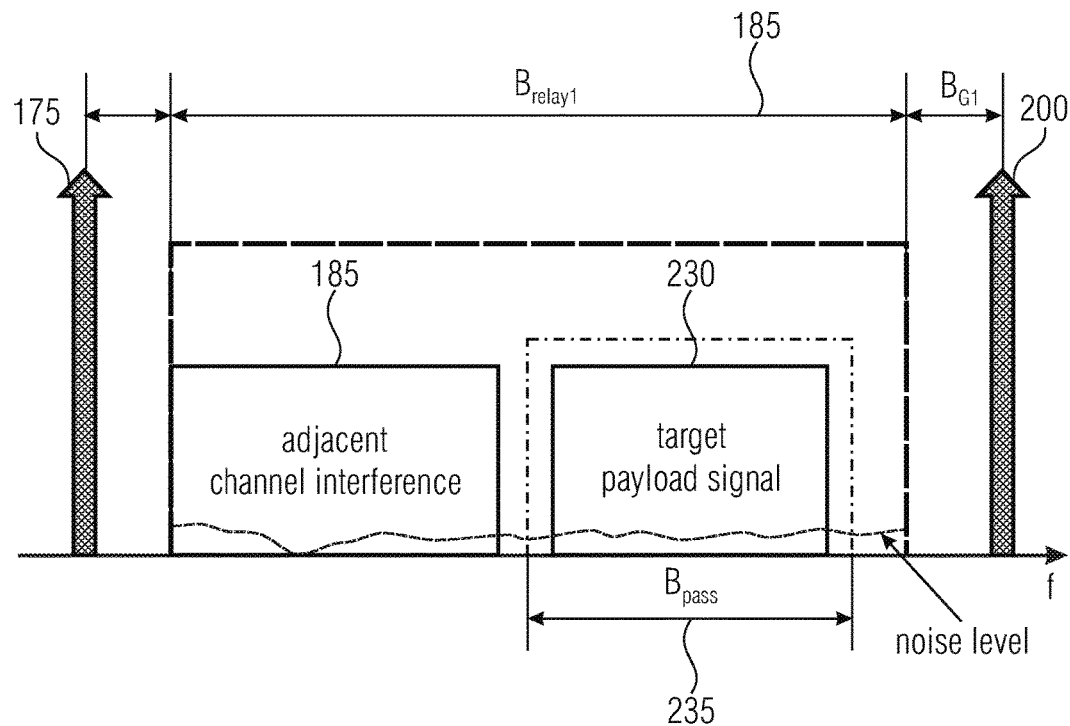
FIG. 25 shows a schematic frequency spectrum of a relayed signal, where the target payload signal has a smaller bandwidth than the relay bandwidth for downlink and/or uplink signal relaying.

FIG. 25 shows a schematic frequency spectrum of a relayed signal, where the target payload signal 230 has a smaller bandwidth than the relay bandwidth 185 for downlink and/or uplink signal relaying. As shown in FIG. 25, a statically implemented relayed bandwidth $B_{Relay}$ 185 can lead to also relaying parts of neighboring signals 195 (Adjacent Channel Interference, ACI) as well as noise. If the SUDAC supports relayed bandwidth adaptation by e. g.

setting pass-band filters with $B_{pass}$ 235 accordingly or by changing $B_{Relay}$ 185, the user equipment can signal to the SUDACs the appropriate payload signal bandwidth and carrier frequency to control the SUDAC. This works since the user equipment has knowledge of the desired signal structure but the SUDAC does not. This adaptation can be realized by switching between different input filters of different bandwidths or adapting filters. This can be implemented in analog or digital domain or as mixed approach: e. g. filter of relayed bandwidth $B_{Relay}$ 185 in analog domain and pass-band filters 235 with $B_{pass}$ in digital domain.

Note that difference is made between $B_{relay}$ and $B_{pass}$, because potential different implementation in an embodiment: $B_{pass}$ as digital adaptive filter and $B_{Relay}$ as analogue filter bandwidth, which may correspond to the maximum relay path bandwidth or switchable analogue filters of different bandwidth. Therefore, the SUDAC is remotely tuned to the correct sub-band and bandwidth for the downlink scenario.

If there is no issue in amplifying and forwarding neighboring signals and noise, one can use the cheaper static relay bandwidth implementation at a SUDAC. Since the UE has already means for proper sub-band selection for s6G communication implemented, these means can also be applied to the relayed signal after down-conversion from the 60G domain to the baseband.

Relayed Bandwidth Adaptation for Uplink Bandwidth

The problem of relaying noise (and maybe ACI) is more severe for the uplink as depicted in FIG. 25. If the uplink relay path would have a static bandwidth, the noise from not allocated 60G frequencies (and maybe ACI) within the band would also be amplified and forwarded to the s6G band. At least in case of frequency division duplex (FDD), this would produce additional distortion to other uplinks in close s6G uplink sub-bands, which experience this forwarded noise. As a remedy, the user equipment can control the SUDAC to tune to the correct sub-band and bandwidth as pass-band and to suppress/block all other parts of the uplink frequency band. Therefore, the SUDAC is remotely tuned to the correct sub-band and bandwidth for the uplink scenario.

Time Synchronization (Sampling, Framing, Switching)

The sampling frequency or local clock offset has already been considered in the previous sections, because of the close relation of the carrier frequency offset to the local clock.

In case of a time division duplex (TDD) mobile network, the user equipment configures/controls the SUDACs in order to switch synchronously between uplink and downlink transmission to be forwarded. In order to not disturb uplink signals of other user equipments in their time slot by forwarding noise samples, the SUDAC may have a third switching state: no relaying or muting. Thus, for operation in TDD mobile networks, the user equipment controls the SUDAC w.r.t. the general states:
1. downlink relaying,
2. uplink relaying,
3. pause/no relaying/loopback.

Therefore, the SUDAC is remotely synchronized to the time division duplex (TDD) cycle as well as the pass-band filters are switched/adjusted.

Independent of having a time division duplex (TDD) or frequency division duplex (FDD) mobile network, each SUDAC can tell the user equipment its maximum processing time via the configuration & control data fields in the beacon signals. This information is used by the user equipment for calculation of the delay of the relayed downlink payload data and to align the received payload data streams at the 60G band from the different SUDACs with each other and the directly received payload data stream at the s6G band. Therefore, different types of SUDACs may have different processing delays but report it to the user equipment for delay alignment.

In case of uplink relaying, the user equipment uses the signaled uplink processing delays of the SUDACs to schedule earlier transmission at the 60G band than for its own direct uplink transmission at s6G to respect the mobile network protocols and rules.

This is of special importance in case of the compress and forward/decode and forward (CF/DF) scheme, while for amplify and forward (AF) the delay is expected to be rather small. More specifically, the user equipment and all connected SUDACs synchronize their timestamp counters via the configuration & control data fields in the beacon signals, where most likely the user equipment will be the reference. Then use the timestamps as follows for CF/DF:

Uplink (Decode-and-Forward, DF): In addition to the uplink payload data, the UE signals to the SUDACs a target timestamp for transmission by the SUDAC. The UE will then transmit on its own s6G uplink at same target timestamp for transmission, because all these signals (to be sent by the SUDACs and by the UE) may be MIMO-pre-coded and therefore synchronous transmission is advantageous. This target timestamp for transmission respects the maximum processing times of all involved SUDACs.

Downlink (Compress-and-Forward, CF): In addition to the relayed payload data, the SUDACs transmit the timestamps, when they received the payload data bursts in the s6G frequency band. This information is used at the user equipment to sort/align correctly all input data streams/bursts from the different SUDACs with the directly received data stream/bursts by the user equipment (UE) at s6G and finally to perform correct MIMO-signal-decoding.

Therefore, the user equipment-side processing aligns several data-streams/bursts from 60G w.r.t. each other as well as with a corresponding s6G data-stream/bursts according to the signaled processing delays or timestamps of the different SUDACs to satisfy the mobile network protocols and rules and to enable MIMO-signal-decoding (Tackles uplink and downlink).

Ways to Support Multiple User Equipments within a SUDAS

So far, the case of one user equipment per SUDAS was considered. However, it is very likely that there are several user equipments even in one room, which demand for the SUDAS support to enhance the transmission data rates. Thus, a straight forward extension is to assign SUDACs exclusively per user equipment, i.e. disjoint subsets of SUDACs per each user equipment. According to an embodiment, a solution aims for providing also shared SUDAC service to several user equipments.

Shared Downlink (for Frequency Division Duplex (FDD) Mobile Networks)

Each SUDAC can forward the whole downlink band of one operator or even the whole downlink band of several/all operators, which leads to relaying several ten MHz from s6G to different 60G sub-bands. Since a SUDAC might not have the capabilities to analyze the whole relayed bandwidth, the user equipments will negotiate with each other and signal to the SUDAC, where the desired parts of the spectrum are as well as gaps in the downlink spectrum, which could be used by superposition beacons. The negotiation is applied, because of different capabilities of the user equipments to cancel the superposition beacons. The indication on the desired band helps or even directly controls the SUDAC to adjust the pass-band filters as discussed in a previous section. In order to avoid the hidden node problem here, the communication between the user equipments can be relayed by the SUDAC that is supposed to serve them.

Figure 26:
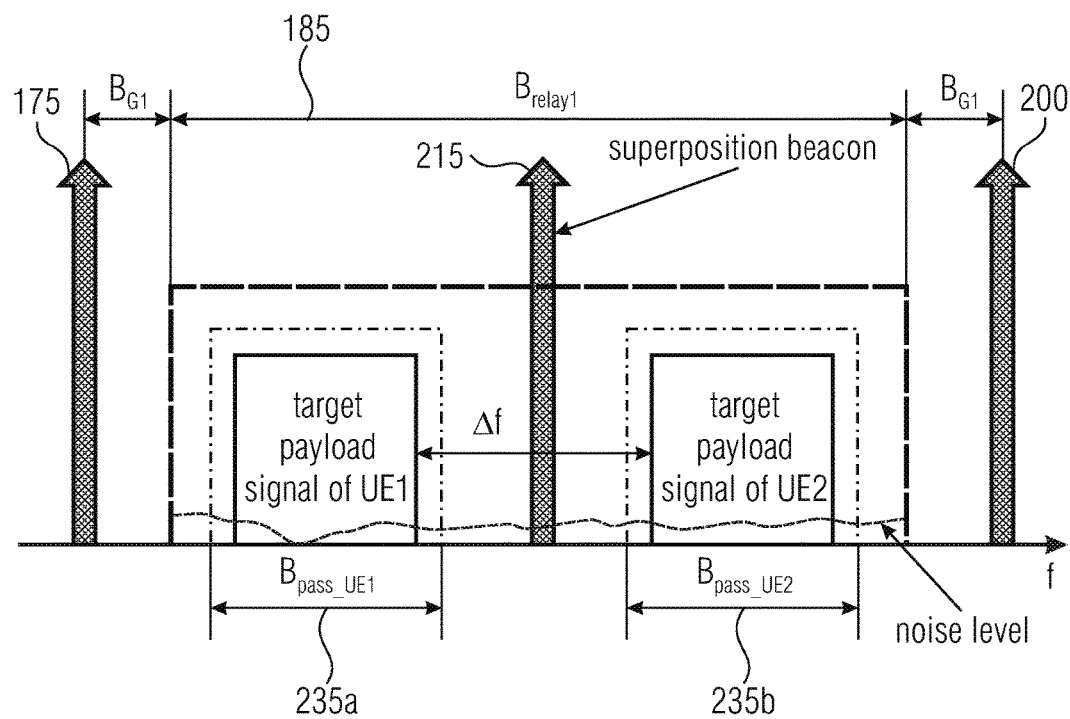
FIG. 26 shows a schematic frequency spectrum of a shared relaying channel within the same relay bandwidth, which holds for downlink and uplink signal relaying.

FIG. 26 shows a schematic frequency spectrum of a shared relaying channel within the same relay bandwidth, which holds for downlink and uplink signal relaying. According to this embodiment, a SUDAC serves two user equipments. As the aim is to use a single relay path, the two target signals keep their distance in frequency $\Delta f$ during up-conversion from s6G to the 60G domain. The two adapted pass-band filters with $B_{pass\_UE1}$ and $B_{pass\_UE2}$ suppress the noise and adjacent channel interference (ACI) so that a superposition beacon can be allocated. Due to successful negotiation of SUDAC and user equipments, the superposition beacon does not need to be canceled in this exemplary case, since it does not interfere with the relayed signals. Therefore, the SUDAC is remotely advised/controlled to adjust pass-band filters and superposition beacon signals. Negotiation between user equipments via SUDAC can be done (i. e. joint cooperative optimization), because some user equipments might not be able to communicate with each other directly.

Shared Uplink (for FDD Mobile Networks)

The ideas from the downlink transmission as well as the example in FIG. 26 can be transferred to a shared uplink relaying. Again, the user equipments and the SUDAC can negotiate the spectrum allocation of the relayed bandwidth to adjust the pass-band filters, identify band gaps for superposition beacons, and also to respect the distance in frequency $\Delta f$ between the uplink signals, because $\Delta f$ is a direct result of the resource allocation scheme for the s6G domain signaled from the base station to the user equipments.

This has again the flavor that the combined uplink band can be down-converted from 60G to s6G in a single relay path and transmitted to the base station. The concept of simultaneously sending pilot fields in the beacon signal from the SUDAC to the user equipments and sending the pre-compensated payload uplink from the user equipment to the SUDAC described in the previous sections for the case of one user equipment per SUDAC, can be applied here as well. This is because each user equipment can pre-compensate its own uplink payload signal according to the channel experienced by the beacon signals. However, the alternative approach of frontend channel estimation and equalization/compensation at the SUDAC would be a bit more sophisticated, because each user equipment can send (disjoint) beacon signals to the SUDAC in order to estimate each of the different channels at SUDAC side. With digital payload signal processing at the SUDAC, the different payload signals can be equalized individually.

An uplink relay band is reserved by one SUDAC, which is a straight forward case. Thus, a further SUDAC would offer its uplink relay band at a different carrier frequency than the first one. The user equipments can transmit the same uplink payload signal but with different pre-compensation to the two SUDACs. Since the user equipment can pre-compensate the uplink signal only according to one transmission channel, the user equipments cannot transmit simultaneously to more than one SUDAC in the same frontend uplink relay band.

Therefore, the SUDACs are remotely advised/controlled to adjust pass-band filters and superposition beacon signals. Negotiation between user equipments via SUDAC can be done (i. e. joint cooperative optimization), because some user equipments might not be able to communicate with each other directly. Especially, the distance in frequency $\Delta f$ between the payload uplink signals can be aligned accurately (by the negotiation) according to the control signals of the base station.

Shared Relaying (for TDD Mobile Networks)

To compare sharing for TDD and FDD, one may differentiate:
1. FDD/TDD, where multiple user equipments use (time-frequency resource blocks) of the same carrier
2. FDD/TDD with multiple user equipments using multiple carriers of the same mobile network operator (i.e. synchronized/coordinated carrier aggregation)
3. FDD/TDD over carriers from multiple mobile network operators (unsynchronized)

For FDD, the above mentioned methods work in cases 1, 2, and 3, where proper calculation and alignment in frequency w.r.t. the band gap $\Delta f$ is beneficial in case 3 due to different operators. However, shared relaying in TDD mode works only in cases 1 and 2, where it is assumed for case 2 that one operator use the same TDD switching cycle at different carrier frequencies. TDD in case 3 may not work because different operators will not align their different TDD switching cycles (between uplink and downlink). This is an issue because one relay path can be related only to a single TDD switching cycle.

Therefore, one could argue to apply two relay paths, one does solely uplink relaying (2 states: uplink relaying and pause/no relaying) and one does solely downlink relaying (2 states: downlink relaying and pause/no relaying). Then, the two relay paths would have the same carrier frequency in s6G (w.r.t. the relayed bandwidth) but different frequencies in 60G. Therefore, independent switching and adjustment of pass-band filters per (uplink or downlink) relay path is applied, because each user equipment may be related to a different switching cycle. Dedicated uplink or downlink relay paths are applied in this mode.

However, simultaneous reception and transmission at the same carrier frequency in s6G (w.r.t. the relayed bandwidth) can lead to unfavorable cross-talk within the SUDAC. This might occur although the resource allocation, which is made separately by each operator within its band, shows no direct conflicts.

Further Embodiments

Joint CFO and channel estimation plus (pre-) compensation at UE side (for AF)
  The SUDAC has a minimum of processing effort leading to reduced hardware requirements and to finally get a cheaper SUDAC device.
  Energy-efficient concept, because the most power consuming elements are the transmit power amplifiers. Since the SUDAC is most likely connected to a general power supply, energy consumption for transmitting the beacon signals is not an issue. And the battery-driven user equipment may use its power amplifiers only for status/control data or for the uplink transmission.
  Each user equipment vendor is responsible for provided quality of signal processing result at 60G, where competition leads normally to valuable solutions.
Joint CFO and channel estimation plus (pre-) compensation at SUDAC side (for AF)
  In case of none-MIMO uplink, the UE can transmit the same uplink payload signal to several SUDACs and not individually to each SUDAC, because channel estimation and equalization is done at the SUDAC side.

However, this does not hold for uplink MIMO, because different payload datastreams are transmitted to different SUDACs.

Less processing capabilities may be used at UE side.

User equipment may run permanently its power amplifiers to transmit the beacon signal pilot fields.

Shared uplink may be easier by using a further alignment of beacon signals from the different user equipments, e.g. by TDMA or FDMA so that the SUDAC can estimate the different frontend channels (from user equipment to SUDAC) and compensates it for the different sub-bands individually.

Comments on Further Embodiments

According to an embodiment, MIMO transmission is considered for uplink and downlink for several user equipments (without connection to the base station), SUDACs and base station. The methods described above can directly be applied to this scenario, although it is proposed here that each user equipment controls its serving SUDACs concerning the resource allocation, interference alignment, etc. Nevertheless, the SUDAC can signal to the user equipment via the config & control channel (=beacon signal) when mitigations due to interference are observed. Therefore, a robust synch due to potential interference may be applied which allows resource allocation which changes over time. New SUDACs may join and others may leave the active SUDAS. Therefore, a continuous update of resource allocation and interoperability with other systems (interference) e. g. partly during discovery and partly during operation by resource allocation, is beneficial.

A further embodiment describes the user equipments having connection to the base station opposed to previous. In this case, the mentioned time synchronization as discussed previously is of additional relevance. Note that the user equipment can signal to the base station the degree of possible spatial multiplexing depending on the actual amount of user equipment-owned antennas and employed SUDACs. Then, the base station can trade-off between Beamforming-Gain and Spatial Multiplexing gain, i.e. whether the base station antennas are more used for beamforming or for transmitting of more spatial data streams.

If the user equipment possesses an antenna array (i.e. more than one antenna), a pure usage for beam-forming/beam-steering will use only one instance of channel estimation+equalization/pre-coding per 60G link. However, (partly) application of the antenna array for interference mitigation will use several instances of the channel estimation and a joint equalization/pre-coding. This is because the interfering signals are separated according to the different channel characteristics, which are estimated by the channel estimation.

When polarized antennas are applied (maybe in combination with beamforming), a channel estimation instance is applied per polarization. If there is joint beamforming or no beamforming for the different polarizations, a joint channel estimation over the signals from/for the different polarizations is advantageous.

If CDMA is applied, the beacon signal will also be spread by Direct Sequence Spread Spectrum. It might be useful to do a joint spreading of beacons+payload signal from/for relaying. After dispreading, the described algorithms for channel estimations should be applicable.

The application of different time slots instead of different sub-bands for CF/DF in the 60G frequency domain is similar when having only a bit more flexibility for the channel estimation when estimating the different channels from/to different SUDACs at the corresponding time slots.

Figure 28:
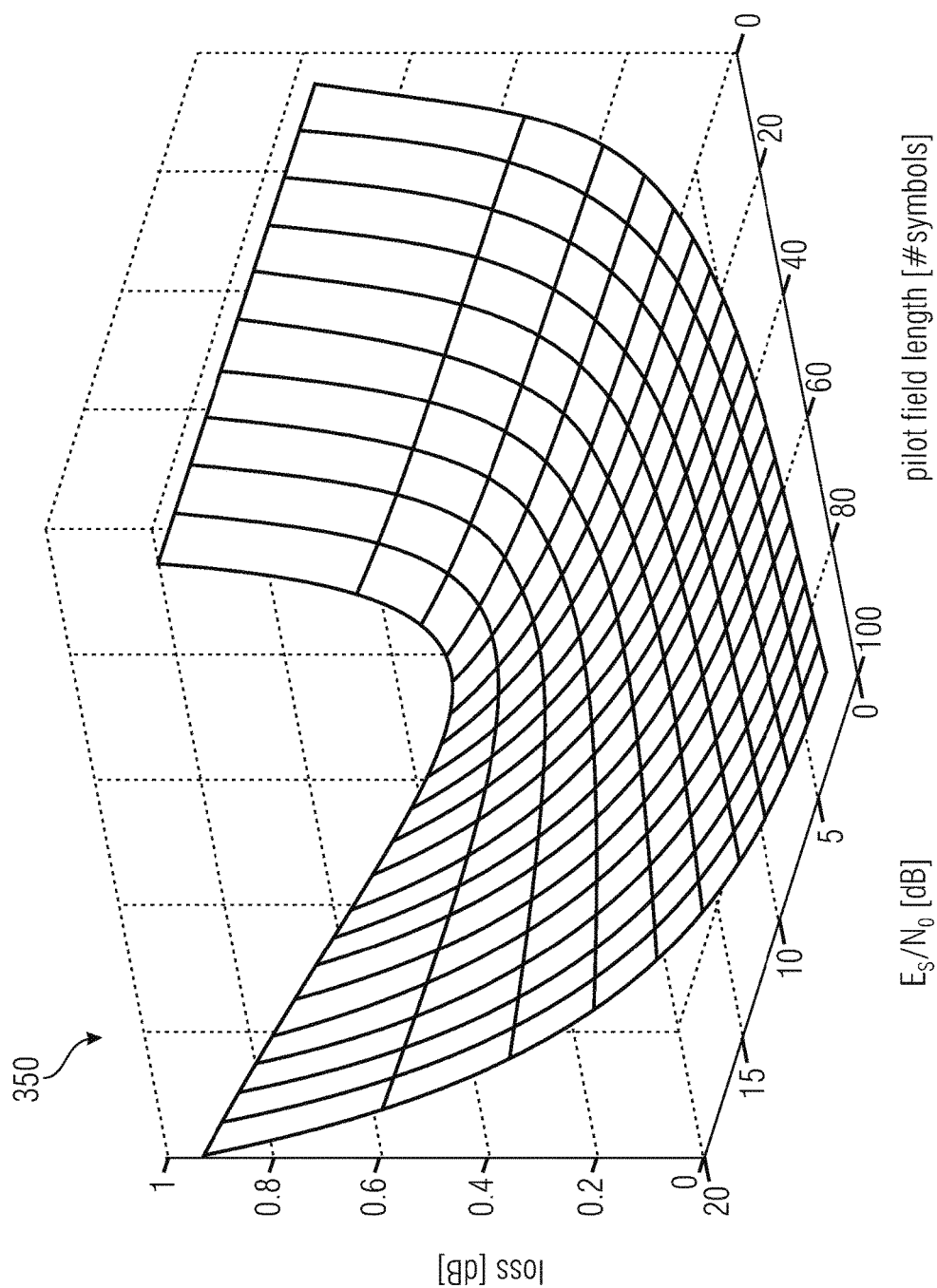
FIG. 28 shows a schematic 3D meshgrid showing the loss/degradation in dB due to phase noise and channel estimation error dependent on the pilot field length and the SNR (signal-to-noise ratio) ($E_s/N_0$).

The amplitude and phase extraction or channel estimation from reference data is in general well-known for a signal in the s6G band as well as interpolation/extrapolation techniques. These methods are extended means to achieve the goal of 60G communication. Therefore, it is shown a channel estimation and interpolation over time and frequency of/over a relayed signal spectrum based on beacon signals, where the relayed signal alone does not provide sufficient means to achieve this channel estimation accuracy and resolution. The described channel estimation can support different pilot field densities as well as different numbers of beacon signals, different beacon signal structures (e.g. normal and superposition beacon signals), or different locations in the t-f-c-s resource grid. Furthermore, channel estimation can adapt to changing positions and structure of beacon signals (e.g. in case of superposition beacon signals). Additionally, the estimation algorithms can adapt their way of processing the pilot fields according to e.g. the actual SNR or actual frontend Doppler change rate or other trade-offs. For example, there is a trade-off between pilot field length or exploited segment length of pilot fields and the SNR ($E_s/N_0$), wherefrom a loss (due to additional interference) can be calculated from the channel estimation error and uncompensated-able phase noise. This is shown in FIG. 28, which shows a 3D meshgrid 350 showing the loss in dB dependent on the pilot field length and the SNR ($E_s/N_0$). According to FIG. 28, there is a minimum loss for a given pilot field length or exploited segment length of a pilot field and the SNR.

Further embodiments show the transceiver (5), wherein the receiving stage (15) and/or the frontend and/or backend channel estimator (20, 22) is configured to adapt receiving parameters in accordance to actual channel characteristics like actual SNR and/or an actual Doppler change rate.

Another embodiment shows the transceiver (5), comprising a frequency analyzer to exploit a resonance frequency of a surrounding material which is a time reference for the transceiver (5).

Furthermore, the user equipment (10) may comprise at least one transceiver (5).

According to further embodiments, the SUDAC (30) comprises a frontend channel estimator (91), wherein the frontend channel estimator (91) is configured to perform a channel estimation based on the frontend evaluation signal (45) in order to calculate channel estimation coefficients, wherein the frontend transceiver (90) is configured to transmit the channel estimation coefficients to a user equipment.

Another embodiments shows the SUDAC (30), wherein the frontend and/or backend frequency offset compensation performs a phase-locked loop adjustment to control the frequency conversion from the extremely-high frequency to the ultra-high frequency and/or the intermediate frequencies.

A further embodiment shows the SUDAC (30), wherein the backend and/or frontend transceiver (85, 90) is configured to adapt its receiving bandwidth to the bandwidth of the actual inbound signal.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

RELATED DOCUMENTS

[1] Parallel patent application
[2] T. S. Rappaport, et al., "State of the Art in 60-GHz Integrated Circuits and Systems for Wireless Communications", Proceedings of the IEEE (Volume 99, Issue 8, pp. 1390-1436), August 2011.
[3] Mengali, D'Andrea, "Synchronization Techniques for Digital Receivers", Plenum Press, New York, USA, 1997.
[4] J. G. Proakis, "Digital Communication", 5th Edition, McGraw-Hill Inc., New York, USA, 2008.
[5] T. S. Rappaport, "Wireless Communications: Principles and Practice", 2nd Edition, Prentice Hall, Upper Saddle River, USA 2002.
[6] L. Hanzo, M. Münster, B. J. Choi, and T. Keller, "OFDM and MC-CDMA for Broadband Multi-User Communications, WLANs and Broadcasting," John Wiley & Sons Ltd.—IEEE Press, West Sussex, England, 2003.
[7] Karolina Ratajczak, Krzysztof Bakowski, Krzysztof Wesolowski, "Two-way Relaying for 5G Systems—Comparison of Network Coding and MIMO Techniques," IEEE Wireless Communications and Networks Conference, WCNC 2014.
[8] Jun Ma, Philip Orlik, Jinyun Zhang, and Geoffrey Ye Li, "Pilot Matrix Design for Estimating Cascaded Channels in Two-Hop MIMO Amplify-and-Forward Relay Systems", IEEE Transactions on Wireless Communications, Vol. 10, No. 6, June 2011.
[9] Chirag S. Patel and Gordon L. Stüber, "Channel Estimation for Amplify and Forward Relay Based Cooperation Diversity Systems," IEEE TRANSACTIONS ON WIRELESS COMMUNICATIONS, VOL. 6, NO. 6, JUNE 2007.
[10] Feifei Gao, Tao Cui, and Arumugam Nallanathan, "On Channel Estimation and Optimal Training Design for Amplify and Forward Relay Networks," IEEE TRANSACTIONS ON WIRELESS COMMUNICATIONS, VOL. 7, NO. 5, MAY 2008.
[11] Patent WO08069555A1 (Patent Family 41912590), "APPARATUS AND METHOD FOR CHANNEL ESTIMATION AND SYNCHRONIZATION IN OFDM/OFDMA RELAY SYSTEM", Prio Date 5.12.2006
[12] Patent CN102833193A, "COMPRESSED SENSING BASED SPARSE CHANNEL ESTIMATION METHOD IN TWO-WAY RELAY NETWORK," Prio Date 20.08.2012
[13] Patent CN102281129A, "MIMO two-way relay system information processing method (Machine translation)," Prio Date 12.08.2011
[14] Patent CN102546127A, "Information processing method for multiple-input multiple-output (MIMO) relay system," Prio Date 6.01.2012

The invention claimed is:

1. A Shared User Equipment-Side Distributed Antenna Component comprising:
a backend transceiver,
a frontend transceiver, and an evaluation signal generator;
wherein the backend transceiver is configured to receive an inbound signal from at least one base station using ultra-high frequencies and to output the inbound signal at intermediate frequencies;
wherein the evaluation signal generator is configured to create a frontend control portion comprising the frontend evaluation signal;
wherein the frontend transceiver is configured to generate an outbound signal using extremely high frequencies comprising the inbound signal using a relay bandwidth and further comprising the frontend control portion arranged below and another frontend control portion arranged above the relay bandwidth and to transmit the outbound signal comprising the frontend control portions to a user equipment.

2. The Shared User Equipment-Side Distributed Antenna Component comprising:
a backend transceiver,
a frontend transceiver, and
an evaluation signal generator;
wherein the backend transceiver is configured to receive an inbound signal from at least one base station using ultra-high frequencies and to output the inbound signal at intermediate frequencies;
wherein the evaluation signal generator is configured to create a frontend control portion comprising the frontend evaluation signal;
wherein the frontend transceiver is configured to generate an outbound signal using extremely high frequencies comprising the inbound signal using a relay bandwidth and further comprising the frontend control portion arranged below and another frontend control portion arranged above the relay bandwidth and to transmit the outbound signal comprising the frontend control portions to a user equipment,
wherein the frontend transceiver is configured to receive an inbound signal from a user equipment using extremely-high frequencies;
wherein the backend transceiver is configured to transmit an outbound signal to a base station using ultra-high frequencies.

3. The Shared User Equipment-Side Distributed Antenna Component according to claim 2, comprising a frontend channel estimator and a frontend channel equalizer;
wherein the frontend channel estimator is configured to perform a channel estimation based on the frontend evaluation signal;
wherein the frontend channel equalizer is configured to equalize distortions, caused by using the extremely-high frequencies, based on the channel estimation of the frontend channel estimator.

4. A system comprising:
a transceiver of a user equipment, said transceiver comprising:
a receiving stage;
a frontend channel estimator;
a frontend channel equalizer;
a backend channel estimator; and
a backend channel equalizer;
wherein the receiving stage is configured to receive an inbound signal from a Shared User Equipment-Side Distributed Antenna Component, wherein the Shared User Equipment-Side Distributed Antenna Component enables a relay communication comprising a frontend communication using extremely-high frequencies and a backend communication using ultra-high frequencies, wherein the inbound signal comprises a data portion, a backend control portion and a frontend control portion, the frontend control portion comprising a frontend evaluation signal and a configuration signal;
wherein the frontend channel estimator is configured to perform a channel estimation based on the frontend evaluation signal;
wherein the frontend channel equalizer is configured to equalize distortions, caused by using the extremely-high frequencies, based on the channel estimation of the frontend channel estimator;
wherein the backend channel estimator is configured to perform a channel estimation based on the backend control portion; and
wherein the backend channel equalizer is configured to equalize distortions, caused by using the ultra-high frequencies, based on the channel estimation of the backend channel estimator; and
a Shared User Equipment-Side Distributed Antenna Component comprising:
a backend transceiver,
a frontend transceiver, and
an evaluation signal generator;
wherein the backend transceiver is configured to receive an inbound signal from at least one base station using ultra-high frequencies and to output the inbound signal at intermediate frequencies;
wherein the evaluation signal generator is configured to create a frontend control portion comprising the frontend evaluation signal;
wherein the frontend transceiver is configured to generate an outbound signal using extremely high frequencies comprising the inbound signal using a relay bandwidth and further comprising the frontend control portion arranged below and another frontend control portion arranged above the relay bandwidth and to transmit the outbound signal comprising the frontend control portions to a user equipment.

5. The system according to claim 4, wherein the system comprises a base station.

6. The system according to claim 4, wherein the transceiver and/or the Shared User Equipment-Side Distributed Antenna Component use the backend control portion of the base station as a common time reference.

7. The system according to claim 4,
wherein the user equipment extracts a time reference from the backend control portion;
wherein the user equipment transmits the time reference to the Shared User Equipment-Side Distributed Antenna Component in order to acquire a common time reference.

8. The system according to claim 4,
wherein the Shared User Equipment-Side Distributed Antenna Component is configured for simultaneously relaying two or more communication links serving one or more receiving and transmitting stages of the transceiver of one or more user equipments.

9. A method for signal processing in a Shared User Equipment-Side Distributed Antenna Component, comprising:
receiving an inbound signal from at least one base station with a backend transceiver using ultra-high frequencies and to output the inbound signal at intermediate frequencies;

creating a frontend control portion with an evaluation signal generator comprising the frontend evaluation signal;
generating an outbound signal with a frontend transceiver using extremely high frequencies comprising the inbound signal using a relay bandwidth and further comprising the frontend control portion arranged below and another frontend control portion arranged above the relay bandwidth and to transmit the outbound signal comprising the frontend control portions to a user equipment.

10. A non-transitory digital storage medium having a computer program stored thereon to perform the method for signal processing in a Shared User Equipment-Side Distributed Antenna Component, said method comprising:
receiving an inbound signal from at least one base station with a backend transceiver using ultra-high frequencies and to output the inbound signal at intermediate frequencies;
creating a frontend control portion with an evaluation signal generator comprising the frontend evaluation signal;
generating an outbound signal with a frontend transceiver using extremely high frequencies comprising the inbound signal using a relay bandwidth and further comprising the frontend control portion arranged below and another frontend control portion arranged above the relay bandwidth and to transmit the outbound signal comprising the frontend control portions to a user equipment,
when said computer program is run by a computer.

11. The Shared User Equipment-Side Distributed Antenna Component comprising:
a backend transceiver;
a backend channel equalizer; and
a frontend transceiver;
wherein the backend transceiver is configured to receive an inbound signal from a base station using ultra-high frequencies;
wherein the backend transceiver is configured to output the inbound signal at intermediate frequencies;
wherein the backend channel equalizer is configured to reduce the inbound signal from distortions caused by using the ultra-high frequencies, using a configuration signal received from a backend channel estimator of a user equipment via the frontend transceiver;
wherein the frontend transceiver is configured to output the inbound signal using extremely-high frequencies in order to generate an outbound signal and to transmit the outbound signal to the user equipment; or
wherein the frontend transceiver is configured to receive a configuration signal from the user equipment and to forward the configuration signal to the backend channel equalizer,
wherein the frontend transceiver is configured to receive an inbound signal from a user equipment using extremely-high frequencies;
wherein the backend transceiver is configured to transmit an outbound signal to a base station using ultra-high frequencies.

12. A system comprising:
a transceiver of a user equipment, said transceiver comprising:
a receiving stage;
a frontend channel estimator;
a frontend channel equalizer;
a backend channel estimator; and
a backend channel equalizer;
wherein the receiving stage is configured to receive an inbound signal from a Shared User Equipment-Side Distributed Antenna Component, wherein the Shared User Equipment-Side Distributed Antenna Component enables a relay communication comprising a frontend communication using extremely-high frequencies and a backend communication using ultra-high frequencies, wherein the inbound signal comprises a data portion, a backend control portion and a frontend control portion, the frontend control portion comprising a frontend evaluation signal and a configuration signal;
wherein the frontend channel estimator is configured to perform a channel estimation based on the frontend evaluation signal;
wherein the frontend channel equalizer is configured to equalize distortions, caused by using the extremely-high frequencies, based on the channel estimation of the frontend channel estimator;
wherein the backend channel estimator is configured to perform a channel estimation based on the backend control portion; and
wherein the backend channel equalizer is configured to equalize distortions, caused by using the ultra-high frequencies, based on the channel estimation of the backend channel estimator; and
a Shared User Equipment-Side Distributed Antenna Component comprising:
a backend transceiver;
a backend channel equalizer; and
a frontend transceiver;
wherein the backend transceiver is configured to receive an inbound signal from a base station using ultra-high frequencies;
wherein the backend transceiver is configured to output the inbound signal at intermediate frequencies;
wherein the backend channel equalizer is configured to reduce the inbound signal from distortions caused by using the ultra-high frequencies, using a configuration signal received from a backend channel estimator of a user equipment via the frontend transceiver;
wherein the frontend transceiver is configured to output the inbound signal using extremely-high frequencies in order to generate an outbound signal and to transmit the outbound signal to the user equipment; or
wherein the frontend transceiver is configured to receive a configuration signal from the user equipment and to forward the configuration signal to the backend channel equalizer,
wherein the Shared User Equipment-Side Distributed Antenna Component and the transceiver establish a communication link using the receiving and transmitting stages of the transceiver and the frontend transceiver of the Shared User Equipment-Side Distributed Antenna Component; and
wherein the Shared User Equipment-Side Distributed Antenna Component and/or the transceiver are configured to perform a time synchronization based on an external, common time reference or based on a signal sent by the transceiver comprising a current time reference.

* * * * *